United States Patent
Maenishi et al.

[11] Patent Number: 5,905,829
[45] Date of Patent: May 18, 1999

[54] OPTICAL FIBER CONNECTING STRUCTURE, OPTICAL SWITCH AND OPTICAL CONNECTOR

[75] Inventors: Kozo Maenishi, Nagaokakyo; Kazuo Tsuboi, Osaka, both of Japan

[73] Assignee: Omron Corporation, Kyoto, Japan

[21] Appl. No.: 08/722,219

[22] PCT Filed: Apr. 19, 1995

[86] PCT No.: PCT/JP95/00767

§ 371 Date: Oct. 22, 1996

§ 102(e) Date: Oct. 22, 1996

[87] PCT Pub. No.: WO95/29422

PCT Pub. Date: Nov. 2, 1995

[30] Foreign Application Priority Data

| Apr. 22, 1994 | [JP] | Japan | 6-107836 |
| Nov. 16, 1994 | [JP] | Japan | 6-281864 |
| Nov. 16, 1994 | [JP] | Japan | 6-281867 |

[51] Int. Cl.⁶ .................................................. G02B 6/38
[52] U.S. Cl. .............................................. 385/59; 385/71
[58] Field of Search .................. 385/59, 65, 83, 385/52, 16, 22, 54, 71, 58

[56] References Cited

U.S. PATENT DOCUMENTS

| 4,181,400 | 1/1980 | Malsot et al. | 385/83 |
| 4,252,407 | 2/1981 | Bubanko et al. | 385/59 |
| 4,318,587 | 3/1982 | Grassl | 385/22 |
| 4,322,127 | 3/1982 | Comerford et al. | 385/65 |
| 4,385,801 | 5/1983 | Bubanko | 385/59 |
| 4,666,238 | 5/1987 | Borsuk et al. | 385/83 |
| 4,911,520 | 3/1990 | Lee | 385/59 |
| 4,948,223 | 8/1990 | Anderson et al. | 385/16 |
| 5,037,176 | 8/1991 | Roberts et al. | 385/16 |
| 5,098,207 | 3/1992 | Blomgren | 385/16 |
| 5,175,776 | 12/1992 | Lee | 385/16 |
| 5,239,599 | 8/1993 | Harman | 385/16 |
| 5,339,377 | 8/1994 | Takahashi | 385/65 |
| 5,434,936 | 7/1995 | Nagaoka et al. | 385/22 |
| 5,440,657 | 8/1995 | Essert | 385/71 |
| 5,483,608 | 1/1996 | Yokomachi et al. | 385/22 |

FOREIGN PATENT DOCUMENTS

| 0073010 | 6/1980 | Japan | 385/59 |
| 0142509 | 6/1989 | Japan | 385/54 |
| 0204008 | 8/1989 | Japan | 385/59 |

*Primary Examiner*—Rodney Bovernick
*Assistant Examiner*—Ellen E. Kang
*Attorney, Agent, or Firm*—Foley & Lardner

[57] ABSTRACT

Peripheral surfaces of end portions of individual optical fibers constituting a first optical fiber array are in close contact with an optical fiber fitting surface of a base, while the peripheral surfaces of the end portions of the individual optical fibers are in close contact with one another. Peripheral surfaces of end portions of optical fibers on both sides out of the individual optical fibers constituting the first optical fiber array are in close contact with a pair of stopper members, respectively, disposed on both sides of an end portion of the first optical fiber array. A second optical fiber or optical fiber array is opposed to an end face of the end portion of the first optical fiber array. Between projecting portions of the pair of stopper members projected from the end face of the first optical fiber array, peripheral surfaces of end portions of the individual optical fibers constituting the second optical fiber or optical fiber array are in close contact with the optical fiber fitting surface of the base.

55 Claims, 50 Drawing Sheets

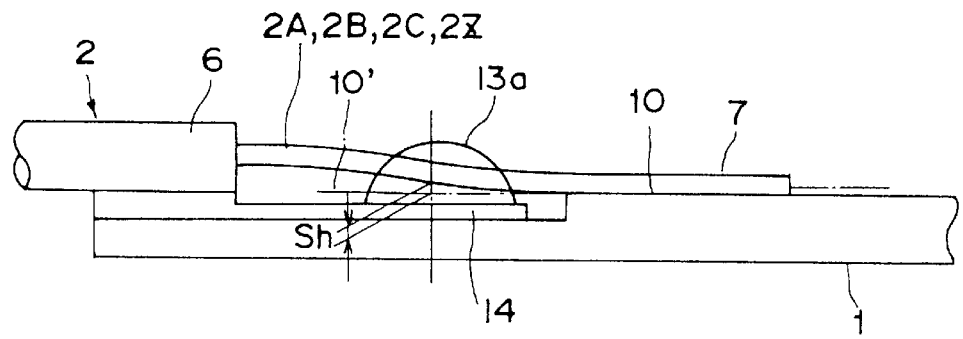
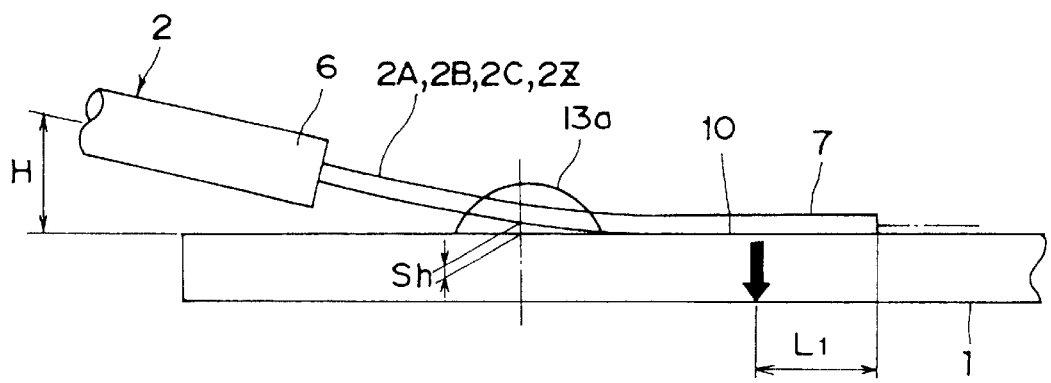
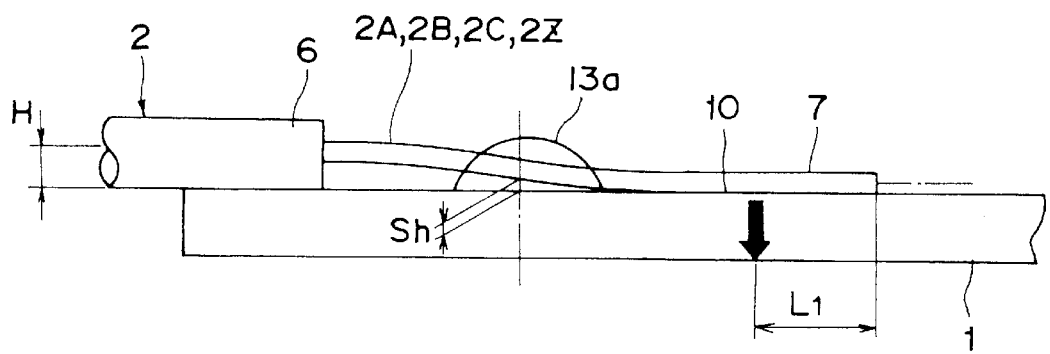

Linear Core Group | Deformation Area | Arrayed Portion

Fig. 44A
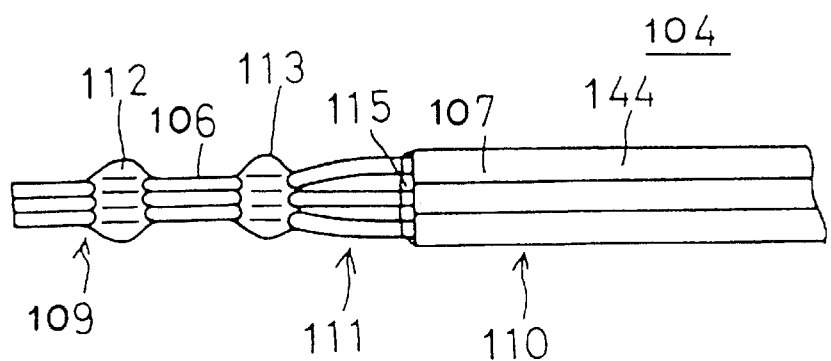
Fig. 44B
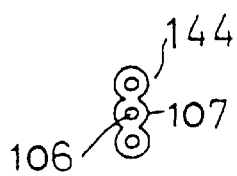
Fig. 45
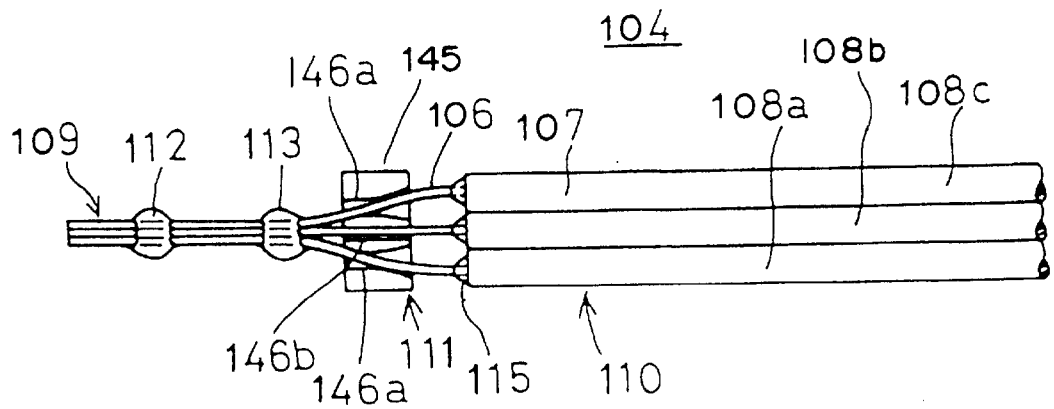
Fig. 46A  Fig. 46B
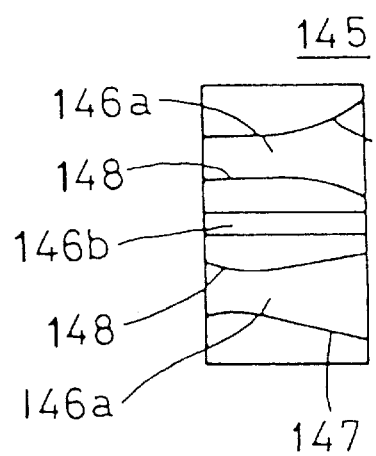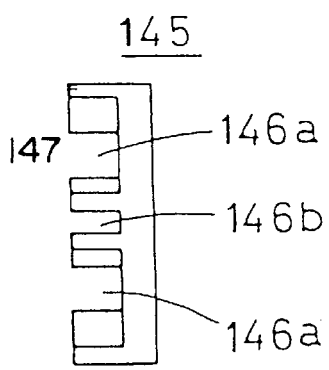

OPTICAL FIBER CONNECTING STRUCTURE, OPTICAL SWITCH AND OPTICAL CONNECTOR

TECHNICAL FIELD

The present invention relates to an optical fiber connecting structure, more specifically, to an optical fiber connecting structure for interconnecting optical fibers so that their optical axes coincide with each other, as well as optical switches and optical connectors employing the structure.

BACKGROUND ART

The optical fiber is composed of a circular-in-section core serving as an optical path, and a tubular clad surrounding the core, and its outer periphery is sheathed as required. In an optical transmission system using such optical fibers as a means for information and/or energy transmission, there are provided optical switches for switching the optical path, and optical connectors for connecting or extending the optical path. For the interconnection of two optical fibers at the optical switches or optical connectors, it is important to make the optical axis of one optical fiber coincident with the optical axis of the other optical fiber in order to maintain the optical path at good transmission characteristics, because the core that forms the optical path of the optical fiber has an extremely thin diameter.

Optical switches (switches for switching the transmission path) are commonly considered indispensable for transmission systems using optical fibers, and there have been proposed various types of optical switches. Among others, movable-fiber type optical switches that allow the optical fibers to be directly moved and switched are regarded promising by virtue of their high switching speed, low control voltage, frequency independence of characteristics, as well as low price and good miniaturizability. Further, for such movable-fiber type optical switches, there has been a demand for the realization of those capable of functioning as a two-input, two-output optical switch.

A conventionally known movable-fiber type optical switch that has realized such two-inputs and two-outputs is disclosed in Japanese Patent Laid-Open Publication No. SHO 61-272713. The construction of this prior-art optical switch is explained with reference to FIG. 73. In a casing 302 of an optical switch 301, a pair of blocks 303, 304 are disposed. The first block 303 is fixed to the casing 302 by a leg portion 305. The first and second blocks 303, 304 have through holes 306, 307 (which otherwise may be recesses), respectively, as well as side faces 308, 309 slanted at a specified angle with respect to the center axes of the through holes 306, 307. Further, a pair of plate springs 310 are fixed by screws 311 to the side faces 308, 309 of the first and second blocks 303, 304. Thus, the second block 304 is supported on the first block 303 with the plate springs 310. On both sides of the second block 304 are disposed stoppers 312, respectively. Further, on one side of the second block 304, there is disposed, for example, an electromagnetic actuator 313, which is capable of driving the second block 304 in a direction of arrow 314 against the elasticity of the plate spring 310.

Into the through holes 306, 307 of the first and second blocks 303, 304 of the optical switch 301 as described above, are inserted pin holders 317 and 318 holding three optical fibers 315a, 315b, 315c and 316a, 316b, 316c, respectively, where the pin holders 317, 318 are held so that the end faces of the pin holders 317, 318 come into in contact with each other. In these pin holders 317, 318, each three optical fibers 315a, 315b, 315c and 316a, 316b, 316c extend up to the end faces of the pin holders 317, 318, and are arranged precisely at a specified pitch at the end faces, with the end faces of the optical fibers 315a, 315b, 315c and 316a, 316b, 316c being exposed to the end faces of the pin holders 317, 318. Further, although not shown, the other end of the optical fiber 315c and the other end of the optical fiber 316a are connected to each other via an optical attenuator (not shown).

Thus, when the plate springs 310 are in a generally straight, normal state without any external force acting on the first and second blocks 303, 304, the optical fibers 315a and 316a are in an optical transmission relation, the optical fibers 315b and 316b are in an optical transmission relation, and the optical fibers 315c and 316c are in an optical transmission relation, as schematically shown in FIG. 74A. Accordingly, in this state, the optical fibers 315a and 316c have an optical transmission relation with each other via the optical fibers 316a and 315c.

On the other hand, when the actuator 313 is driven so that an external force along the arrow 314 acts on the second block 304, the plate spring 310 is elastically deformed, causing the second block 304 to be laterally displaced along the arrow 314. As a result, as shown in FIG. 74B, the optical fibers 315a and 316b are positioned in a line so as to come into an optical transmission relation, while the optical fibers 315b and 316c are also positioned in a line. Thus, an inversion switching of the optical switch 301 is effected.

However, such conventional optical switches would involve complex construction of the optical fiber array because each optical fiber array is made up by inserting three optical fibers into a pin holder, and inserting this pin holder into the through hole or recess of the first or second block. This would result in large size of the optical fiber array as well as heavy weight. Further, because of also increased size of optical switches as well as heavy weight of optical fiber arrays, it would be difficult to attain faster switching speeds.

Also, the optical fiber array would be required to have an extremely high precision for the array pitch of the optical fibers. For example, connecting two optical fibers of the graded index type with core diameter 50 $\mu$m and clad diameter 125 $\mu$m oppositely to each other would involve a tolerance of 3 $\mu$m or less, an extremely high precision. As a result, extremely high level of machining would be required for the first or second block with a through hole or recess provided, which in turn would need high molding precision also for the pin holders. This would make a factor of increase in the cost of the optical fiber array, as a disadvantage.

Even if the dimensional precision or the like for the first or second block can be obtained, it would be difficult to attain as high precision of adjustment as, for example, a tolerance of 3 $\mu$m because the standstill position of the movable-side block is restricted by adjusting the amount of projection of the stopper. As a result, it has been difficult to attain the positioning of the optical fiber array, and in turn to obtain the precision of optical axis alignment of the optical fibers.

Also, since it needs a large force to displace the second block by overcoming the inertia due to the mass of the block or the reaction force of the plate spring, the actuator for driving the second block would be large sized. As a result, the optical switch itself would be large sized, the power consumption would also be increased, and the manufacturing cost of the actuator would be increased, as further problems. Further, due to the large inertia of the second block and the reaction force of the plate spring, it would be difficult to attain faster switching speed of the switching operation.

Furthermore, since the optical fibers would make contact with jigs or the like in the assembling process of the optical fibers, foreign matters would stick to the end faces of the end portions of the optical fibers. This would cause the optical transmission characteristics to be deteriorated.

Generally, the optical fiber is formed from glass or plastics, and extremely thin diameters are employed to obtain good optical transmission characteristics. Therefore, the optical fiber would be so weak in strength and inadequate to forcedly bend. As a result, there has been a need of taking a large spacing of optical fiber array so that bends will least occur at the connecting portions of optical fibers. This would cause the whole unit to be large sized.

As described above, the disadvantages of the prior art to be solved by the present invention can be summarized as follows:

(1) Because of the difficulty in precisely positioning the optical fiber array on the movable side, it is difficult to attain a precision optical axis alignment between optical fibers;

(2) The optical fiber array is complex in construction and large in weight. Since such a heavy optical fiber array is driven, the actuator is necessarily increased in size, causing the weight to increase, so that the optical switch becomes heavy weight;

(3) Since the optical fiber array is complex in construction and large in size so that the actuator is also large sized, it is difficult to miniature the optical switch;

(4) Because of the large-sized actuator, the power consumption is increased;

(5) Since the optical fiber array of heavy weight is driven against its inertia and the reaction force of the plate spring, the switching speed of switching operation is slow;

(6) Because of the need of high-precision machined parts such as blocks and pin holders as well as the need of a large-sized actuator, the optical switch takes high manufacturing cost; and (7) Foreign matters stick to the end faces of the optical fibers such that the optical transmission characteristics are deteriorated.

DISCLOSURE OF THE INVENTION

The present invention has been accomplished to solve the aforementioned disadvantages of the prior art. A first object of the invention is therefore to provide an optical fiber connecting structure which has simple construction, light weight, high precision, and high functions.

A second object of the invention is to provide a method for bringing optical fibers into close contact with the base in the optical fiber connecting structure.

A third object of the invention is to provide a method for bringing optical fibers into close contact with one another in the optical fiber connecting structure.

A fourth object of the invention is to provide an apparatus for bringing optical fibers into close contact with the base in the optical fiber connecting structure, and for bringing the optical fibers into close contact with one another.

A fifth object of the invention is to provide an optical switch which uses the optical fiber connecting structure and which is low cost, capable of high-speed switching, and low power consumption.

A sixth object of the invention is to provide an optical connector which uses the optical fiber connecting structure and which is small size and low cost.

Invention for Achieving the First Object:

The first object is achieved by an optical fiber connecting structure characterized in that:

peripheral surfaces of end portions of individual optical fibers constituting a first optical fiber array are in close contact with an optical fiber fitting surface of a base, while the peripheral surfaces of the end portions of the individual optical fibers are in close contact with one another;

peripheral surfaces of end portions of optical fibers on both sides out of the individual optical fibers constituting the first optical fiber array are in close contact with a pair of stopper members, respectively, disposed on both sides of an end portion of the first optical fiber array;

a second optical fiber or optical fiber array is opposed to an end face of the end portion of the first optical fiber array; and that between projecting portions of the pair of stopper members projected from the end face of the first optical fiber array, peripheral surfaces of end portions of the individual optical fibers constituting the second optical fiber or optical fiber array are in close contact with the optical fiber fitting surface of the base.

The structure of this invention is intended to be applied not only to optical switches and optical relays for performing the disconnection and switching of the optical path, but also to optical connectors for performing the connection of the optical path. In the case of optical switches or optical relays, the first side is fixed while the second side is movable along a direction perpendicular to the optical axis, so that the second side is smaller in number than the first side. Accordingly, the second side can comprise either one optical fiber or an optical fiber array composed of two or more optical fibers. On the other hand, in the case of optical connectors, both the first side and the second side are an optical fiber array composed of two or more optical fibers.

With the construction of this invention, since the first optical fiber array is in close contact with the fitting surface of the base while its optical fibers are in close contact with one another, the position of each optical fiber relative to the fitting surface of the base as well as the spacing between one optical fiber and another depend on the high-precision diameter of the optical fiber itself. Also, since optical fibers on both sides out of those constituting the first optical fiber array are in close contact with a pair of stopper members, the optical fibers are maintained in close contact with one another. On the other hand, the second optical fiber or optical fiber array is in close contact with the fitting surface of the base between the projecting portions of the stopper members. Accordingly, when the second optical fiber or both-side optical fibers of the second optical fiber array are brought into close contact with the projecting portions of the stopper members, the optical axis of the second-side optical fiber coincides with the optical axis of the first-side optical fiber at high precision. Therefore, according to this invention, the optical axes can be made to coincide with each other at high precision without requiring any special members. Thus, the structure becomes simple and lightweight, so that the manufacturing cost is reduced.

In a preferred embodiment of the invention, at least any one of the first optical fiber array and the second optical fiber or optical fiber array is put into close contact with the fitting surface of the base by urging force of its own flexure. According to this embodiment, since the optical fiber is kept in close contact with the base by the urging force due to flexure, the optical fiber will recover by itself even if its end is temporarily floated up by some external factor.

In another preferred embodiment of this invention, at least any one of the first optical fiber array and the second optical fiber array has such a flexure on the fitting surface of the base that individual optical fibers constituting the optical fiber array are put into close contact with their adjacent optical fibers. According to this embodiment, since the optical fibers are kept in close contact with one another by the urging force of the flexure, the optical fibers will recover by themselves even if their ends are temporarily separated away.

In yet another preferred embodiment of this invention, at least any one of the pair of stopper members has spring property, so that the optical fibers are pressed by spring force of the stopper members. According to this embodiment, the optical fibers are maintained in close contact with one another by the urging force of the stopper members.

Invention for Achieving the Second Object:

The second object is achieved by a method for bringing an end portion of an optical fiber or optical fiber array into close contact with an optical fiber fitting surface of a base, the method comprising steps of:

holding the optical fiber or optical fiber array so that the end portion thereof is positioned away from the fitting surface of the base;

depressing the optical fiber or optical fiber array toward the fitting surface of the base by using a depressing member, between holding portion and end portion of the optical fiber or optical fiber array, so that the optical fiber or optical fiber array is flexed;

stopping the depressing member in a state that the end portion of the optical fiber or optical fiber array is in close contact with the fitting surface of the base; and fixing the optical fiber or optical fiber array to the base at at least one place between the holding portion and the end portion of the optical fiber or optical fiber array.

In this method, instead of depressing the optical fiber or optical fiber array toward the fitting surface of the base by using the depressing member, the optical fiber or optical fiber array may be pivoted so that the end portion of the optical fiber or optical fiber array approaches the fitting surface of the base.

Alternatively, the base may be bent between the fixing portion and the end portion of the optical fiber or optical fiber array so that the end portion of the optical fiber or optical fiber array approaches the fitting surface of the base.

According to this invention, since the end faces of the optical fibers make contact with nothing, there is neither a possibility that foreign matters stick to the end faces, nor a possibility that break losses occur.

Invention for Achieving the Third Object:

The third object is achieved by a method for bringing end portions of individual optical fibers constituting an optical fiber array into close contact with one another on an optical fiber fitting surface of a base, the method comprising steps of:

holding the optical fiber array so that the end portions of its individual optical fibers are arrayed in generally parallel with one another and in close contact with the fitting surface of the base;

sandwiching the optical fiber array from both sides between holding portion and end portion of the optical fiber array so that spacings between the optical fibers constituting the optical fiber array are narrowed stepwise, and maintaining the spacings with the end portions of the individual optical fibers kept in close contact with one another; and bonding the individual optical fibers constituting the optical fiber array, with one another, at at least one place between the holding portion and the end portion of the optical fiber array.

In this method, a pair of stopper members having a spring property may be disposed on both sides of the optical fiber array, so that the optical fiber array is sandwiched from both sides via the stopper members.

Instead of sandwiching the optical fiber array from both sides, the optical fibers located on both sides out of the individual optical fibers constituting the optical fiber array may be pivoted so that the end portions of the both-side optical fibers approach their adjacent optical fibers, by which the optical fibers can be brought into close contact with one another. In this method also, it is possible that a pair of stopper members having a spring property are disposed on both sides of the optical fiber array, and these stopper members are pivoted.

According to the method of this invention, since the end faces of the optical fibers make contact with nothing, there is neither a possibility that foreign matters stick to the end faces, nor a possibility that break losses occur, as in the foregoing invention.

Invention for Achieving the Fourth Object:

The fourth object is achieved by an apparatus for bringing end portions of individual optical fibers constituting an optical fiber array into close contact with an optical fiber fitting surface of a base as well as into close contact with one another, the apparatus comprising:

a base having a planar-shaped optical fiber fitting surface;

a holding portion for holding an optical fiber array by sandwiching it against the base;

a first pressing portion which extends from the holding portion and which presses the optical fiber array between the holding portion and an end portion of the optical fiber array so that a peripheral surface of the end portion of the optical fiber array is brought into close contact with the fitting surface of the base; and a second pressing portion which extends from the holding portion and which presses optical fibers located on both sides in the optical fiber array between the holding portion and the end portion of the optical fiber array so that the peripheral surfaces of the end portion of the optical fiber array are brought into close contact with one another.

According to the apparatus of this invention, when pressing members are fitted to the base, the end portion of the optical fiber array is put into close contact with the base by the first pressing member, while the end portions of its optical fibers are put into close contact with one another by the second pressing member. Therefore, the close contact of the optical fibers with the base and the close contact between one optical fiber and another can be easily accomplished.

Invention for Achieving the Fifth Object:

The fifth object is achieved by an optical switch which comprises:

a base having a planar-shaped optical fiber fitting surface;

a fixed optical fiber composed of a plurality of optical fibers, peripheral surfaces of end portions of the optical fibers being arrayed in close contact with the fitting surface of the base and in close contact with one another;

a pair of stopper members which are in close contact with peripheral surfaces of end portions of optical fibers located on both sides, respectively, out of the individual optical fibers constituting the fixed optical fiber;

a movable optical fiber composed of optical fiber with the number smaller than that of the fixed optical fiber, peripheral surface of the end portion of the movable optical fiber being in close contact with the fitting surface of the base, end face of end portion of the movable optical fiber being opposed to an end face of an end portion of the fixed optical fiber with a minute spacing; and drive means for reciprocatingly moving the movable optical fiber along a direction perpendicular to its optical axis within a range restricted by projecting portions of the pair of stopper members that are projected from the end face of the fixed optical fiber.

In the optical switch of this invention, since the fixed optical fiber is in close contact with the fitting surface of the base and in close contact of its optical fibers with one another, the position of the fixed optical fiber relative to the fitting surface of the base as well as the spacing between its optical fibers are determined by the high-precision diameter of the optical fibers themselves. Also, since both-side optical fibers out of those constituting the fixed optical fiber are in close contact with a pair of stopper members, the optical fibers are maintained in close contact with one another. Meanwhile, the movable optical fiber is in close contact with the fitting surface of the base between the projecting portions of the stopper members. Therefore, the movable optical fiber, when brought into close contact with the projecting portions of the stopper members at the time of operation and return, has its optical axis coincident with that of the fixed optical fiber at high precision.

Thus, according to this invention, since the optical axes can be made to coincide with each other at high precision without requiring any special members, the connecting portion of the fixed optical fiber and the movable optical fiber becomes simple in construction and light in weight. As a result, the driving means for driving the movable optical fiber can be reduced in size and weight. Thus, the whole optical switch results in lighter weight and smaller size while the power consumption of the optical switch is reduced, so that the optical switch comes in a power-saving type. Also, the manufacturing cost of the optical switch is reduced. Further, since the driven part of the movable optical fiber can be reduced in weight, the movable optical fiber can be displaced with smaller force so as to be changed over in the position where it is opposed to the fixed optical fiber. This allows the switching speed to be enhanced higher.

In a preferred embodiment of this invention, at least one of the individual optical fibers constituting either one of the fixed optical fiber or the movable optical fiber is a dummy fiber. In this case, by referencing the diameter of the dummy fiber provided among optical fibers on one side, the displacement amount of optical fibers on the other side can be determined with high precision.

In another preferred embodiment of this invention, the optical switch further comprises a pressing member which is fitted to the base and which holds at least one of the fixed optical fiber and the movable optical fiber and presses it to the base, the pressing member comprising:

a holding portion for sandwiching and holding an optical fiber by sandwiching it against the base;

a first pressing portion which extends from the holding portion and which presses the optical fiber between the holding portion and an end portion of the optical fibers so that a peripheral surface of the end portion of the optical fiber is brought into close contact with the fitting surface of the base; and a second pressing portion which extends from the holding portion and which presses optical fibers located on both sides in the optical fiber, between the holding portion and the end portion of the optical fiber so that peripheral surfaces of the end portion of the optical fiber are brought into close contact with one another. According to this embodiment, when the pressing portion are fitted to the base, the end portion of the optical fiber is put into close contact with the base by the first pressing portion, while their end portions are put into close contact with one another by the second pressing portion. Therefore, the close contact of the optical fibers with the base and the close contact of one optical fiber with another can be easily accomplished, allowing an easy assembly.

In yet another preferred embodiment of this invention, the drive means reciprocatingly moves the movable optical fiber via an elastic member that engages the movable optical fiber. According to this embodiment, the movable optical fiber can be prevented from rebounding at the stopper members by the elastic force of the elastic member, so that the movable optical fiber can be securely put into contact with the stopper members. Also, since the elastic member absorbs and relieves excessive movement and impact, the optical fibers are unlikely to break, having a prolonged life.

In yet another preferred embodiment of this invention, the drive means comprises magnetic field control means, and a magnetic material provided to the movable optical fiber. In this case, the magnetic material is preferably contained in a resin material that bonds the movable optical fiber integrally. According to this embodiment, the movable optical fiber can be driven in such a non-contact manner that the magnetic material provided to the movable optical fiber is attracted by the magnetic field control means.

Invention for Achieving the Sixth Object:

The sixth object is achieved by an optical connector which comprises:

a base having a planar-shaped optical fiber fitting surface;

a first optical fiber array composed of a plurality of optical fibers, peripheral surfaces of end portions of the optical fibers being arrayed in close contact with the fitting surface of the base and in close contact with one another;

a second optical fiber array composed of a plurality of optical fibers, end face of end portion of the second optical fiber array being opposed to an end face of an end portion of the first optical fiber array on the fitting surface of the base, peripheral surfaces of end portions of the optical fibers being arrayed in close contact with the fitting surface of the base in close contact with one another; and a pair of stopper members which are in close contact with peripheral surfaces of end portions of optical fibers located on both sides, out of the individual optical fibers constituting the first optical fiber array and the second optical fiber array.

In the optical connector of this invention, since the first optical fiber array and the second optical fiber array are in close contact with the fitting surface of the base and in close contact of one optical fiber with another, the position of the fixed optical fiber relative to the fitting surface of the base as well as spacings between its optical fibers are determined by high-precision diameters of the optical fibers themselves. Also, since both-side optical fibers out of those constituting the first optical fiber array and the second optical fiber array are in close contact with a pair of stopper members, the optical axis of the first optical fiber array coincides with the optical axis of the second optical fiber array at high precision.

Thus, according to this invention, since the optical axes can be made to coincide with each other at high precision without requiring any special members, the connecting portion of the first optical fiber array and the second optical fiber array becomes simple in construction and light in weight. As a result, the whole optical connector can be reduced in weight and size, while the manufacturing cost also becomes low price.

BRIEF DESCRIPTION OF THE DRAWINGS

Embodiments of the present invention are described below with reference to the accompanying drawing, in which

FIG. 4 is a front view showing a state of close contact of an optical fiber with the base, where the fixing portion of the optical fiber is lower than the fitting surface;

FIG. 5A is a front view showing a state in which an optical fiber is given a flexure so as to be put into close contact with the base;

FIG. 5B is a front view showing a state in which the optical fiber of FIG. 5A is given second flexures;

FIGS. 44A and 44B are a plan view and a sectional view, respectively, showing yet another embodiment of the movable optical fiber;

FIG. 45 is a plan view showing yet another embodiment of the movable optical fiber;

FIGS. 46A and 46B are a plan view and a rear view, respectively, showing the corrector used in the movable optical fiber;

BEST MODE FOR CARRYING OUT THE INVENTION

Figure 1:
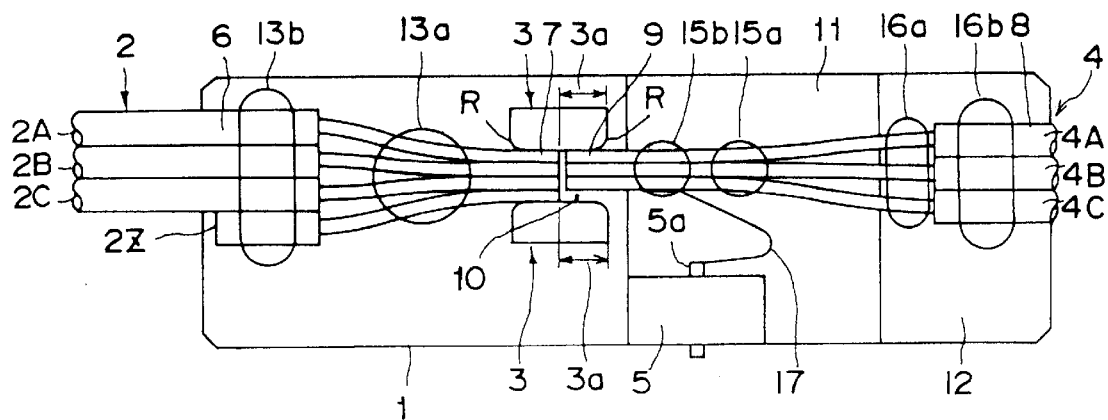
FIG. 1 is a plan view showing an embodiment of the optical fiber connecting structure for attaining a coincidence between optical axes of optical fibers in an optical switch.

Embodiments of the Invention of a Structure for Attaining Coincidence between Optical Axes of Optical Fibers:

FIG. 1 shows an embodiment of the structure for attaining a coincidence between optical axes of optical fibers in an optical switch.

Referring to FIG. 1, on a base 1 are disposed a first optical fiber array 2, a pair of stopper members 3, a second optical fiber array 4, and a drive means 5.

In a generally center of the top surface of the base 1, is formed a flat fitting surface 10 with which an end portion 7 of the first optical fiber array 2 with a sheathed portion 6 stripped off and an end portion 9 of the second optical fiber array 4 with a sheathed portion 8 stripped off make close contact. This fitting surface 10 may alternatively be a curved surface that is bent in the lateral direction (a direction perpendicular to the longitudinal direction) of the base 1. On a side of the fitting surface 10 of the base 1 on which the second optical fiber array 4 is positioned, i.e., on the right side in FIG. 1, a recess 11 is defined. On the right side of this recess 11, is formed a slanted surface 12 that has a downward gradient toward the fitting surface 10.

The first optical fiber array 2 comprises three optical fibers 2A, 2B, 2C and one dummy fiber 2Z. The dummy fiber 2Z is provided by cutting the same optical fiber as the three optical fibers 2A, 2B, 2C into a specified length. These optical fibers 2A, 2B, 2C and dummy fiber 2Z are arranged parallel to one another, and the end faces of their end portions 7 are aligned generally flush with one another. Also, the optical fibers 2A, 2B, 2C and dummy fiber 2Z are fixed to the base 1 at a first fixing portion 13a between the end face of the sheathed portions 6 and the end portions 7, by which they are given a flexure vertical to the base 1 as well as a flexure parallel to the base and vertical to the optical axis. As a result, the peripheral surfaces of their end portions 7 are brought into close contact with the fitting surface 10 of the base 1 by the urging force of their own flexures as well as into close contact with one another. The sheathed portions 6 of the optical fibers 2A, 2B, 2C and dummy fiber 2Z are fixed to the base 1 at a second fixing portion 13b in proximity to their end faces, by which the peripheral surfaces of their end portions 7 are brought into close contact with the base 1, as well as into close contact with one another.

Figure 3A:
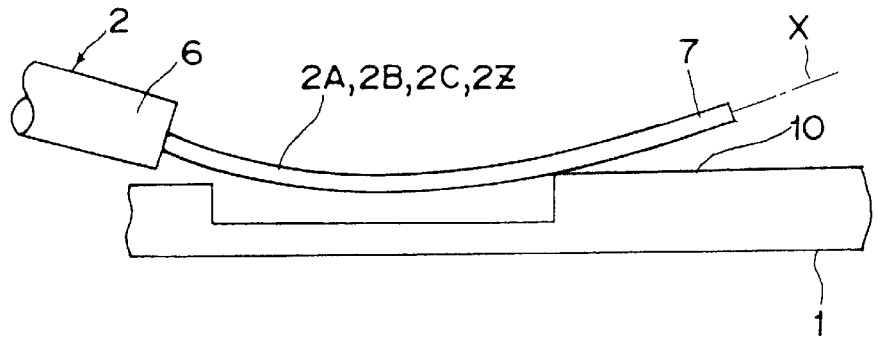
FIG. 3A is a front view showing a state in which an optical fiber is in contact with a corner of the base.
Figure 3B:
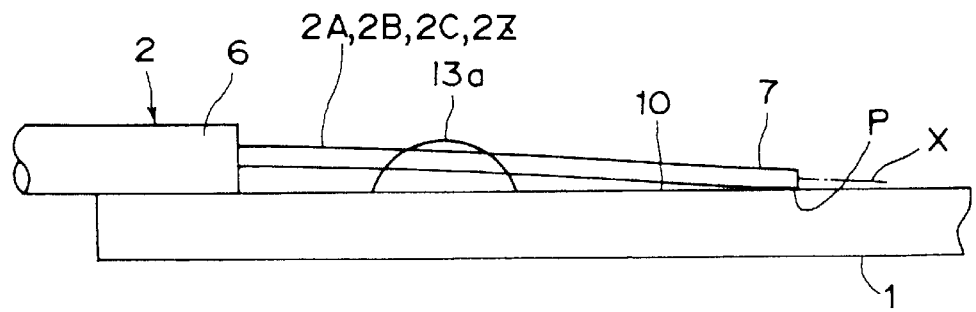
FIG. 3B is a front view showing a state in which an optical fiber is in point contact with the base.
Figure 3C:
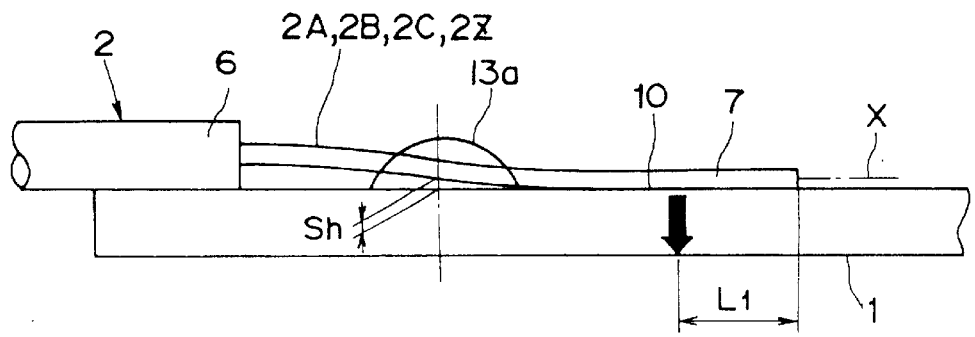
FIG. 3C is a front view showing a state in which an optical fiber is in linear close contact with the base.

Assuming that the individual optical fibers 2A, 2B, 2C and dummy fiber 2Z constituting the first optical fiber array 2 are in contact with a corner of the fitting surface 10 as shown in FIG. 3A or that their ends are in point contact with the fitting surface 10 as shown in FIG. 3B, then the optical axis X shown by one-dot chain line would no longer be parallel to the fitting surface 10, resulting in a discontinuity with the optical axis of the opposite optical fiber array, which would make a cause of light leakage. Thus, the ends of the optical fibers 2A, 2B, 2C and dummy fiber 2Z are arranged to make close contact with the fitting surface 10 over a line of some length $L_1$ as shown in FIG. 3C. With this arrangement, even if the individual optical fibers 2A, 2B, 2C and dummy fiber 2Z constituting the optical fiber array 2 have some variations in the amount of flexure between one another, such variations will be absorbed by variations in the contact length $L_1$, so that the state as shown in FIG. 3A or FIG. 3B will not result.

The individual optical fibers 2A, 2B, 2C and dummy fiber 2Z are fixed in a state that they have a spacing Sh against the fitting surface 10 of the base 1, as shown in FIG. 3C. Therefore, flexures of the individual fibers are held so that pressing force for the base 1 is continuously generated, by which the fibers are maintained in close contact with the base 1. Moreover, it is no longer necessary for the fibers to be subjected to bending process for close contact with the base 1, so that straight fibers are usable, allowing a cost reduction. In addition, as shown in FIG. 4, when the fitting surface 10 of the base 1 is higher than the fiber fixing surface, it is appropriate that there is a spacing Sh between an imaginary plane 10' extended from the fitting surface 10 and the fibers. Also, the fibers may be fixed to the base 1 via another member 14.

The optical fibers 2A, 2B, 2C and 2Z are fixed to the base 1 at the fixing portion 13a between the sheathed portions 6 and the end portions 7 in a state, as shown in FIG. 5A, that the fibers are given one flexure by putting their end portions 7 into close contact with the fitting surface 10 of the base 1 while the fibers are held oblique to the base 1. After this, the fibers are given a second flexure by bending a portion of the fibers on the opposite side (hereinafter, referred to as "draw-out side") to the end portion 7 with respect to the fixing portion 13a so that the portion become parallel to the base 1, as shown in FIG. 5B. With this arrangement, the height H of the optical fibers from the base 1 becomes lower than that in the case of FIG. 5A, as well as more compact, advantageously.

Figure 6:
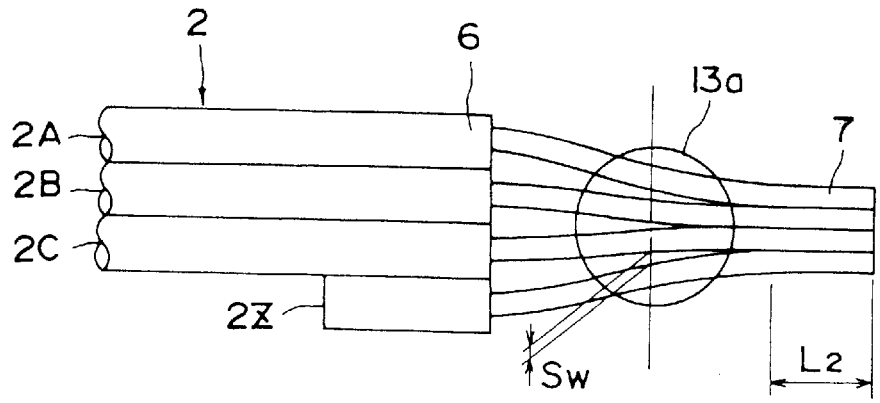
FIG. 6 is a plan view showing a state in which optical fibers are in close contact with one another.

As shown in FIG. 6, the individual optical fibers 2A, 2B, 2C and dummy fiber 2Z constituting the first optical fiber array 2 have the end portions 7 in close contact with one another over a line of some length $L_2$. Therefore, even if the individual optical fibers have some variations in flexure between one another, such variations will be absorbed by variations in the contact length $L_2$, so that the optical axes are held parallel. Also, the optical fibers 2A, 2B, 2C and dummy fiber 2Z constituting the first optical fiber array 2 are fixed in a state that there is a spacing Sw between adjacent fibers. Thus, flexures of the fibers are held so that pressing force for one another is continuously generated, by which the fibers are maintained in close contact with one another. Moreover, it is no longer necessary for the optical fibers to be subjected to bending process for close contact with one another, so that straight optical fibers are usable, allowing a cost reduction.

Figure 7:
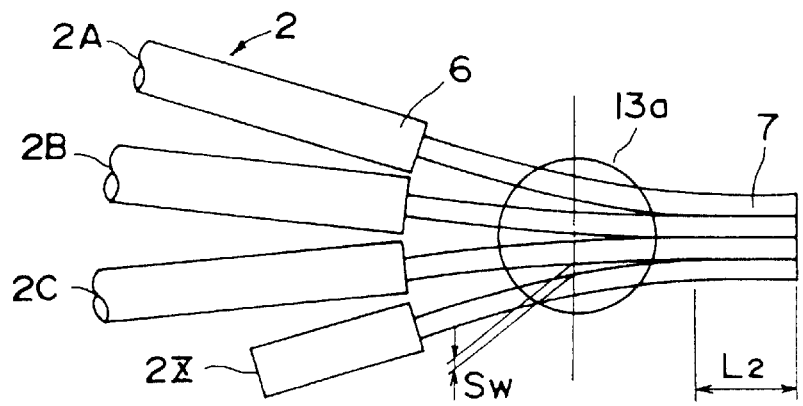
FIG. 7 is a plan view showing a state in which optical fibers have one flexure so as to be in close contact with one another.

The optical fibers 2A, 2B, 2C and dummy fiber 2Z constituting the first optical fiber array 2, as shown in FIG. 6, are given, on the draw-out side of the fixing portion 13a, such a second flexure that the fibers are bent in the opposite direction to the end-side flexure so that the individual optical fibers become parallel to one another. Instead of this, as shown in FIG. 7, the optical fibers may be fixed at the fixing portion 13a in the state that an optical fiber is given one flexure by holding the fiber oblique to its adjacent fiber and by putting its end portion 7 into close contact with the adjacent fiber. However, the arrangement as shown in FIG. 6 can be reduced in size to more extent, advantageously.

The flexure shape of the first optical fiber array 2 including the dummy fiber 2Z, as shown in FIG. 6, is line symmetrical with respect to the array center line in the direction of optical axis. Therefore, the urging forces by flexure are balanced on both sides of the center line, which gives the optical fibers higher durability to external factors.

Reverting to FIG. 1, the pair of stopper members 3, which are each formed of plate material, are fitted onto the fitting surface 10 of the base 1 so as to be located on both sides of the end portion 7 of the first optical fiber array 2. With respect to the side end faces of the stopper members 3 facing each other, the optical fiber 2A located on the outermost place of the first optical fiber array 2 makes contact with one side end face, while the dummy fiber 2Z makes contact with the other side end face. Thus, since the first optical fiber array 2 is sandwiched by the stopper members 3, the end portions of the optical fibers can be put into close contact with one another without using any special members such as jigs. Also, since the optical fiber array 2 is sandwiched by making use of the side end faces of the stopper members 3 which are of simple plate-like shape, the shape except for the side end faces may be freely changed.

Each of the stopper members 3 has a projecting portion 3a projecting from the end face of the end portion 7 of the first optical fiber array 2. In order to prevent the optical fibers from floating up from the base 1, the stopper members 3 need to have a thickness not less than the radius of the optical fibers. The side end faces of the stopper members, with which optical fibers make contact, are rounded at their corners R in the direction of optical axis, by which the optical fibers are made unlikely to be damaged or broken in the fitting process.

The second optical fiber array 4 is composed of the same three optical fibers 4A, 4B, 4C as used for the first optical fiber array 2. Whereas the first optical fiber array 2 has four fibers including the dummy fiber 2Z, the second optical fiber array 4 has three optical fibers, one smaller than the first optical fiber array 2. This is because the structure shown in FIG. 1 is an optical switch, where the second optical fiber array 4 is enabled to move in a direction perpendicular to the optical axis so as to permit the switching of the optical path. By contrast, in the case of an optical connector, the first optical fiber array 2 and the second optical fiber array 4 would be of the same number of optical fibers.

The optical fibers 4A, 4B, 4C constituting the second optical fiber array 4 have their sheathed portions 8 removed over a length ranging to some extent from the end portions 9, like the optical fibers 2A, 2B, 2C of the first optical fiber array 2. These optical fibers 4A, 4B, 4C are bonded with one another at a first bonding portion 15a generally immediate between the end portions 9 and the sheathed portions 8 in the state that the end portions 9 are located between the pair of stopper members 3 and that the end faces are opposed to the end faces of the first optical fiber array 2, by which the peripheral surfaces of the end portions 9 are brought into close contact with one another by urging force due to the optical fibers' own flexure. The optical fibers are also fixed to the slanted surface 12 of the base 1 at a first fixing portion 16a in proximity to the end faces of the sheathed portions 8, by which the optical fibers are given a flexure in a direction vertical to the base 1, with the result that the peripheral surfaces of their end portions 9 are brought into close contact with the fitting surface 10 of the base 1 by the urging force due to the optical fibers' own flexure. Further, the sheathed portions 8 of the optical fibers are fixed to the base 1 at a second fixing portion 16b in proximity to their end faces, by which the peripheral surfaces of their end portions 9 are brought into close contact with the fitting surface 10 of the base 1 and in contact with one another. Between the end face of the end portion 9 of the second optical fiber array 4 and the end face of the end portion 7 of the first optical fiber array 2, a refractive index matching agent is retained in order to reduce the loss due to light leakage.

Figure 2:
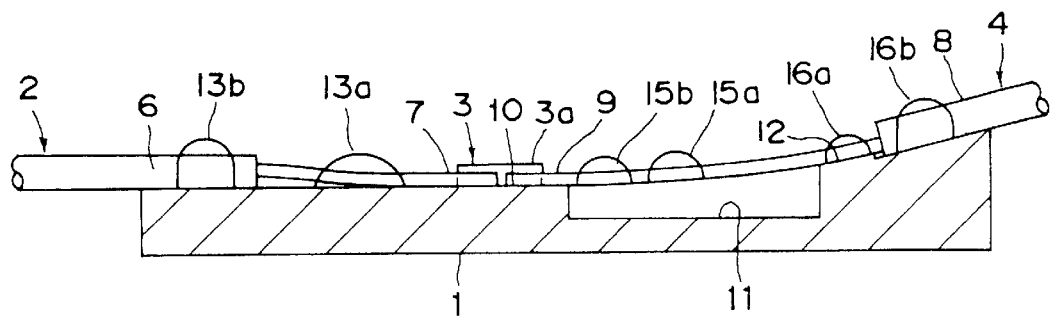
FIG. 2 is a longitudinal sectional view of FIG. 1.

The drive means 5, which is implemented, for example, by an electromagnetic actuator, piezoelectric actuator, or the like, is so designed as to move and reciprocate the end portion 9 of the second optical fiber array 4 in a direction parallel to the base and perpendicular to the optical axis, via a connecting member 17 bent in a V-shape. One end of the connecting member 17 is bonded with the second optical fiber array 4 at a second bonding portion 15b of the second optical fiber array 4 provided closer to the end than the first bonding portion 15a, while the other end is fitted to a plunger 5a which is the driving portion of the drive means 5. In addition, the first bonding portion 15a and the second bonding portion 15b of the second optical fiber array 4 are opposed to the recess 11 of the base 1 so that the optical axis will not be shifted due to contact with the base 1, as shown in FIG. 2.

Figure 8:
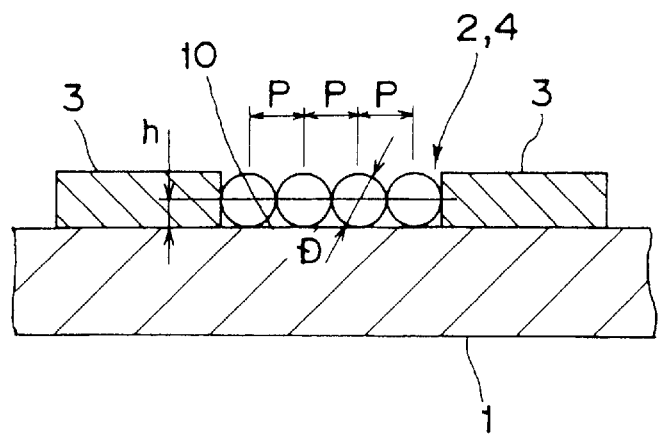
FIG. 8 is a sectional view showing a state in which optical fibers are in close contact with the base as well as in close contact with one another.

In the structure as described above, since the peripheral surfaces of the end portions 7, 9 of the optical fibers 2A, 2B, 2C and dummy fiber 2Z constituting the first optical fiber array 2 as well as the optical fibers 4A, 4B, 4C constituting the second optical fiber array 4 are in close contact with the fitting surface 10 of the base 1 without any intervenients, the distance h from the fitting surface 10 of the base 1 to the center (optical axis) of each fiber is determined by the fiber radius D/2, as shown in FIG. 8. Also, since the peripheral surfaces of the end portions 7, 9 of the optical fibers and dummy fiber are in close contact with one another without any intervenients, the pitch p between adjacent optical fibers is determined by the optical fiber diameter D as shown in FIG. 8. Accordingly, although the position of the optical axis of the optical fibers affects the dimensional accuracy of the optical fiber diameter D, the optical fibers are fabricated generally with extremely high precision so that the optical fibers can still be positioned with high accuracy. Further, since no special members are required for the positioning of the optical fibers, this optical fiber connecting structure is easy to manufacture and reduced in cost.

Since the individual optical fibers and dummy fiber are in close contact with the fitting surface 10 of the base 1, as well as in close contact with one another, by the urging force due to the optical fibers' own flexure, the optical fibers, even if having the end portions 7, 9 temporarily floated up or separated from one another due to some external factor, will be restored to the original state by the urging force due to their own flexure, in addition to the necessity of no special members, the simple construction, and the reduced cost.

In the foregoing embodiment of FIG. 1, the end portions 7 of the optical fibers 2A, 2B, 2C and dummy fiber 2Z of the first optical fiber array 2 may also be fixed integrally to the pair of stopper members 3 located outside the end portions 7, so that they can be securely maintained in their relative positional relation. In contrast to this, the end portions 9 of the individual optical fibers 4A, 4B, 4C of the second optical fiber array 4 must not be joined at least at a portion located between the projecting portions 3a of the stopper members 3 with any adhesive or the like. This is because the adhesive that has stuck to the peripheral surfaces of the optical fibers would make contact with the side end faces of the stopper members 3, resulting in a mismatch with the optical axis of the first optical fiber array 2.

Figure 9:
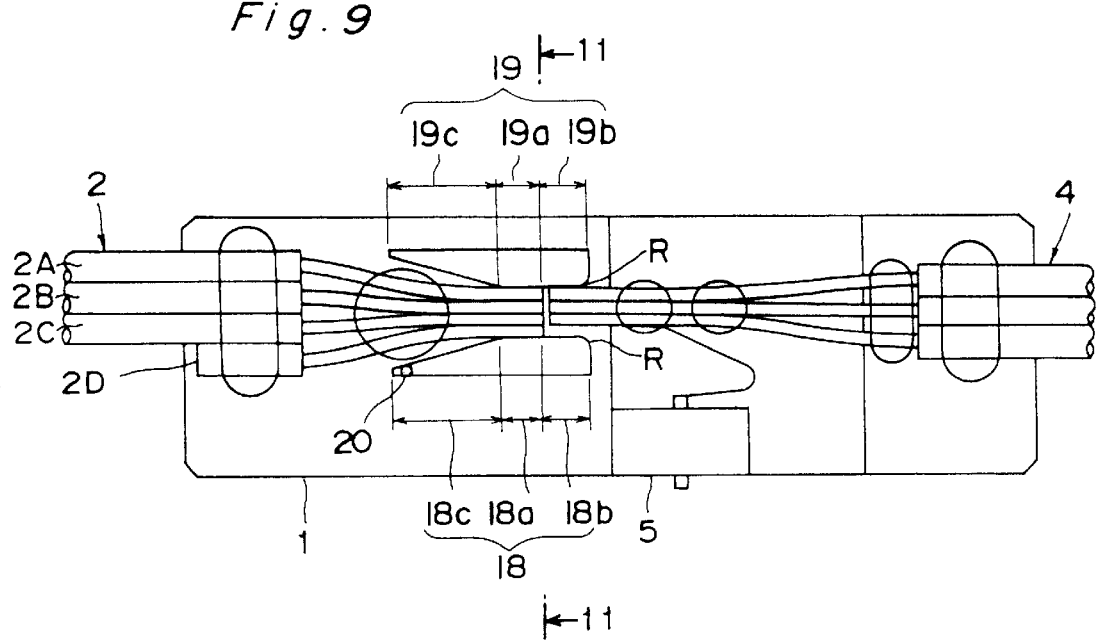
FIG. 9 is a plan view of an optical switch corresponding to FIG. 1 and equipped with stopper members of a first modification.

FIG. 9 shows a movable stopper member 18 and a fixed stopper member 19, which are a first modification for the pair of stopper members 3 of FIG. 1.

Figure 11:
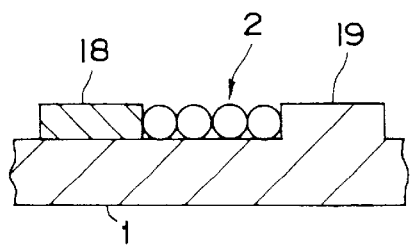
FIG. 11 is a sectional view taken along the line 11—11 of FIG. 9.

The movable stopper member 18, which is a member separated from the base 1 as shown in FIG. 11, comprises a stopper portion 18a, a projecting portion 18b projecting from the stopper portion 18a toward the second optical fiber array 4, and a guide portion 18c extending from the stopper portion 18a toward the first optical fiber array 2. The corner R of the inner side end face of the projecting portion 18b is rounded to prevent the optical fibers from damage. The side end face of the guide portion 18c is tapered along such a direction of increasing distance from the optical fiber toward the draw-out side of the first optical fiber array 2. The movable stopper member 18 is fitted to the top surface of the base 1 so as to be pivotable around a pivot 20 provided at an end portion of the guide portion 18c. The fixed stopper member 19, which is formed integrally with the base 1 as shown in FIG. 11 and shaped symmetrical to the movable stopper member 18, comprises a stopper portion 19a, a projecting portion 19b, and a guide portion 19c, like the movable stopper member 18.

Figure 10:
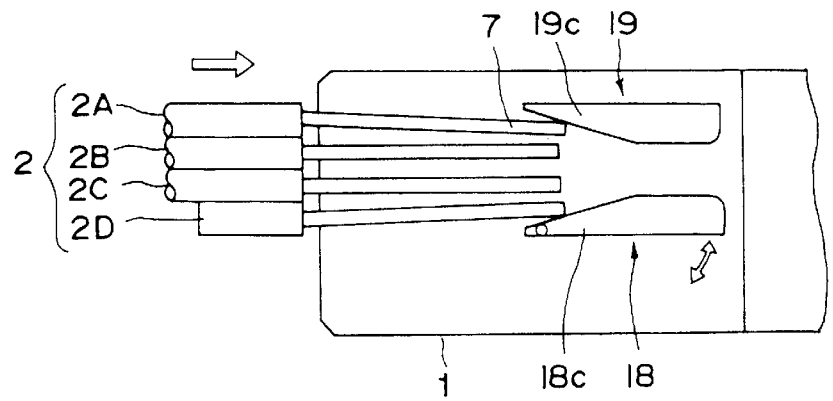
FIG. 10 is a plan view showing a state in which optical fibers are inserted toward the stopper members of FIG. 9.

In a pair of stopper members 18, 19 constructed as described above, when the first optical fiber array 2 is inserted between the pair of stopper members 18, 19 in the direction of arrow as shown in FIG. 10, the end portion 7 of the optical fiber array 2 is guided by the tapered surfaces of the guide portions 18c, 19c so that the spacing between the optical fibers 2A, 2B, 2C and dummy fiber 2Z is narrowed, with the result that the optical fibers 2A, 2B, 2C and dummy fiber 2Z come into close contact with one another as shown in FIG. 9. Thus, since no special device is required for attaining the close contact of the end portion 7 of the first optical fiber array 2, the assembly can be easily accomplished. By pivoting the movable stopper member 18 about the pivot 20 in the direction of arrow, the spacing between a pair of stopper members 18, 19 can be adjusted. Accordingly, even if the optical fibers 2A, 2B, 2C and dummy fiber 2Z have some variations in diameter, the optical fibers 2A, 2B, 2C and dummy fiber 2Z can be securely put into close contact with one another by widening or narrowing the spacing between the stopper members 18, 19. After the adjustment of spacing, the resulting spacing can be maintained by fixing the movable stopper member 18 to the base 1 with an adhesive or the like.

The movable stopper member 18 may also be provided so as to be slidable on the top surface of the base 1 in a direction vertical to the optical axis. Further, although the fixed stopper member 19 may be formed of a plate material independent of the base 1 and fixed to the base 1 with an adhesive or the like, the fixed stopper member 19 is preferably formed integrally with the base 1 as described before in terms of reduced parts count and assembling man-hours.

Figure 12:
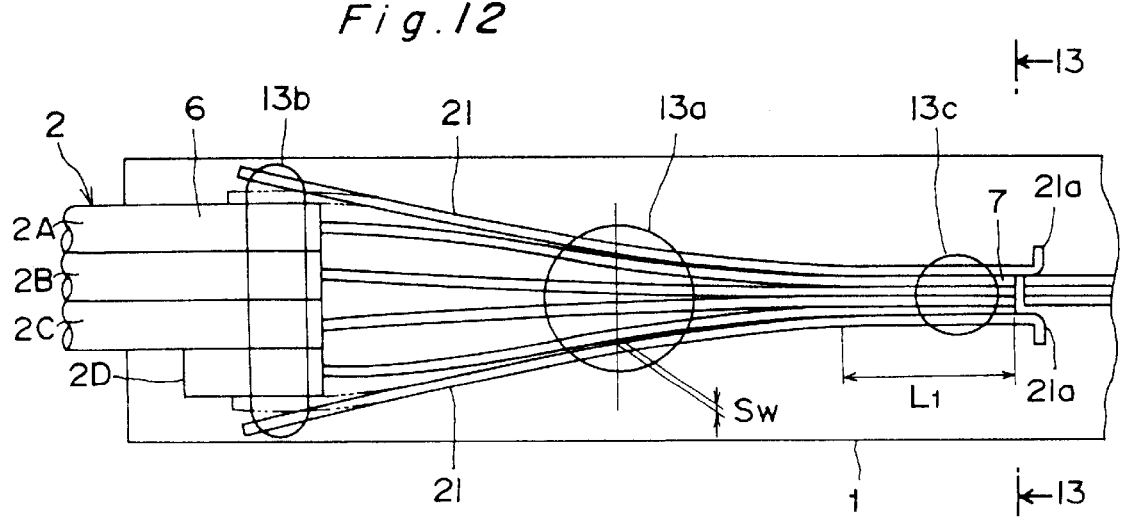
FIG. 12 is a partial plan view of an optical switch equipped with stopper members of a second modification.
Figure 13:
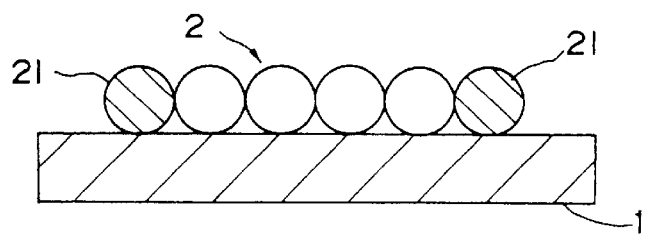
FIG. 13 is a sectional view taken along the line 13—13 of FIG. 12.
Figure 14:
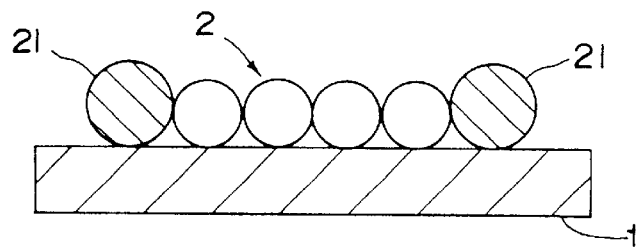
FIG. 14 is a sectional view showing a state in which optical fibers are brought into close contact with one another by using stopper members having a circular cross section larger in diameter than the optical fibers.
Figure 15:
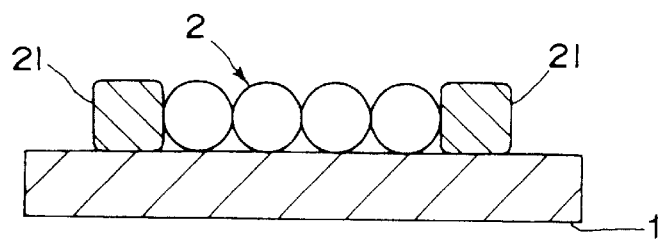
FIG. 15 is a sectional view showing a state in which optical fibers are brought into close contact with one another by using stopper members having a rectangular cross section.

FIG. 12 shows stopper members 21 which are a second embodiment for a pair of stopper members 3 of FIG. 1. The pair of stopper members 21 may be made from elongate materials having smooth surface and spring property, such as metallic wire, optical fiber and resin molding. The metallic wire is advantageous in its relatively smooth surface, assurance of some extent of strength, and the selectability of various fixing means such as adhesion, soldering and welding. However, the metallic wire would cause burrs to be generated to its cut end faces, in which case its end needs to be previously bent in a direction of increasing distance from the optical fibers as shown in FIG. 12 in order to prevent the optical fibers from being damaged by the burrs. In the case where stopper members of optical fiber are used, it is preferable to use the same optical fiber as the first optical fibers 2A, 2B, 2C or the second optical fibers 4A, 4B, 4C from the viewpoint of reduced parts count and easy parts control. Also, the cross section of the stopper members 21 is preferably circular or rectangular shaped. In order that the first optical fiber array 2 or dummy fiber 2Z is prevented from floating up from the base 1, the stopper members 21 of circular cross section preferably have a diameter not less than that of the optical fibers as shown in FIG. 14, while the stopper members 21 of rectangular cross section preferably have a height not less than the radius of the optical fibers as shown in FIG. 15.

The pair of stopper members 21 are placed outside the optical fibers 2A and 2Z located on both sides out of the individual optical fibers 2A, 2B, 2C, 2Z constituting the first optical fiber array 2, where projecting portions 21a of their ends are projected more than the end face of the end portion 7 of the first optical fiber array 2 and bent 90° toward the outside. This pair of stopper members 21 are given a flexure at the first fixing portion 13a of the first optical fiber array 2 with a spacing Sw provided between adjacent optical fibers on both sides, in such a manner that the peripheral surfaces of the end portions of the stopper members 21 are brought into close contact with the peripheral surface of the end portion 7 of the first optical fiber array 2 over a line of some length $L_1$, by which a pressing force for the optical fibers is generated at the ends. After this, the pair of stopper members 21 are fixed to the base 1 together with the first optical fiber array 2. The end portion 7 of the first optical fiber array 2 is fixed to the base 1 at a third fixing portion 13c together with the pair of stopper members 21. The draw-out side of the pair of stopper members 21 with respect to the first fixing portion 13a is fixed to the base 1 in a flexure-free, straight state. Instead of this, as shown by two-dot chain line in FIG. 12, the stopper members 21 may be fixed to the base 1 at the second fixing portion 13b together with the sheathed portion 6 of the first optical fiber array 2, in a state that the draw-out side of the stopper members 21 is given a second flexure toward the first optical fiber array 2. By so doing, the lateral breadth of the stopper members 21 is suppressed so that the unit is reduced in size.

The stopper members 21 constructed as described above, pressing the first optical fiber array 2 by their own flexure, are enhanced in the degree of close contact.

Also, since the first optical fiber array 2 is fixed to the base 1 at three places of the first fixing portion 13a, the second fixing portion 13b, and the third fixing portion 13c, the first optical fiber array 2 can be securely fixed. In this case, the third fixing portion 13c on the end side is to temporarily fix the first optical fiber array 2 by first fixing it to the base 1, while the first fixing portion 13a and the second fixing portion 13b, which are on the draw-out side more than the third fixing portion 13c, are to finally fix the first optical fiber array 2 to the base. Accordingly, the adhesive to be used for the third fixing portion 13c should have faster drying and more instant effect properties than the adhesive for the first fixing portion 13a and the second fixing portion 13b. Thus, when the first optical fiber array 2 is fixed to the base 1 at a plurality of fixing portions 13a, 13b, 13c, any differences in thermal expansion between the optical fibers and the base will be absorbed by the flexures of the optical fibers.

Figure 16:
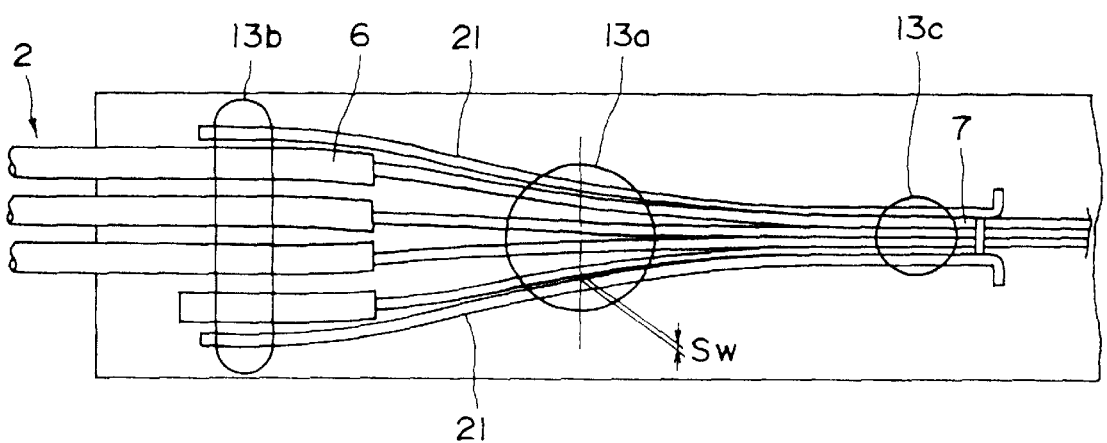
FIG. 16 is a plan view showing a state in which optical fibers including sheathed portions are given two flexures.

The sheathed portions 6 of the optical fibers are fixed to the base 1 integrally in close contact with one another as shown in FIG. 12. Therefore, it is no longer necessary to restrict the positions of the individual sheathed portions 6, and moreover the strength of the base 1 is enhanced. Instead of this, the sheathed portions 6 of the optical fibers may be fixed onto the base 1 with a spacing between one another as shown in FIG. 16, in which case it is preferable to give flexure also to the sheathed portions 6. In this case, any differences in thermal expansion between the optical fibers 2A, 2B, 2C and the sheathed portions 6 over a range between the first fixing portion 13a and the second fixing portion 13b will be absorbed. Use of an optical fiber array into which a plurality of optical fibers are previously integrated in a tape-like state allows an easy assembly of the unit because there are no needs of restricting the positions of the individual optical fibers or integrating the optical fibers in a close contact state. Furthermore, as to the optical fiber array, the individual sheathed portions and optical fibers may be integrated with one another by means of fusion without using adhesive.

As shown in FIGS. 12 and 16, when the optical fiber array 2 has a plurality of fixing portions 13a, 13b, 13c, it should be noted that at least one fixing portion 13b be positioned at the sheathed portions 6 while another fixing portion 13a be positioned at the optical fibers (core portions). By so doing, it can be prevented that the optical fibers 2A, 2B, 2C may be popped out of or pulled into the sheathed portions 6 due to some difference in thermal expansion between the sheathed portions 6 and the optical fibers 2A, 2B, 2C. This can also be accomplished by bonding the end faces of the sheathed portions 6 with the optical fibers.

Figure 17:
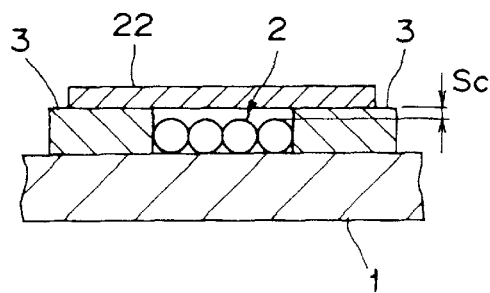
FIG. 17 is a sectional view showing a state in which a cover plate for preventing the optical fibers from popping out is provided upward of the stopper members.

FIG. 17 shows a modification of FIG. 1, where a cover plate 22 is provided so as to be extended across a pair of stopper members 3. This cover plate 22 is to prevent the end portions of the optical fibers from popping out upward. The spacing Sc between the optical fibers and the cover plate 22 needs to be less than the diameter of the optical fibers.

Embodiment of the Method for Bringing End Portions of Optical Fibers into Close Contact with Base:

FIGS. 18A to 18D show a first method for bringing the end portion 7 of the first optical fiber array 2 or the end portion 9 of the second optical fiber array 4 in the structure of FIG. 1 as described above, into close contact with the fitting surface 10 of the base 1. The method is explained below with respect to the first optical fiber array 2 by way of example.

Figure 18A:
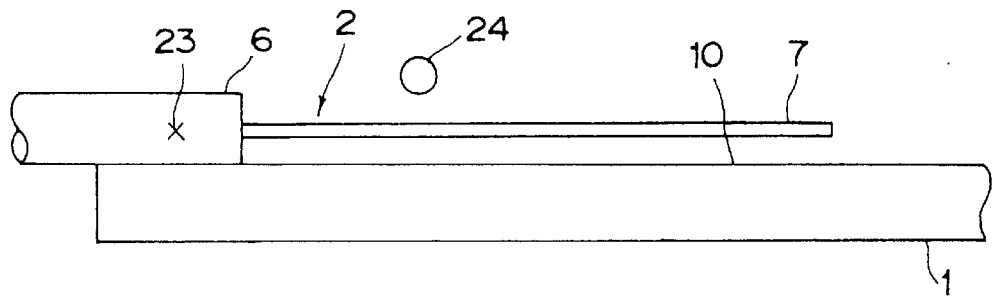
FIGS. 18A, 18B, 18C and 18D are plan views showing the steps of a first embodiment of the method for bringing optical fibers into close contact with the base.
Figure 18B:
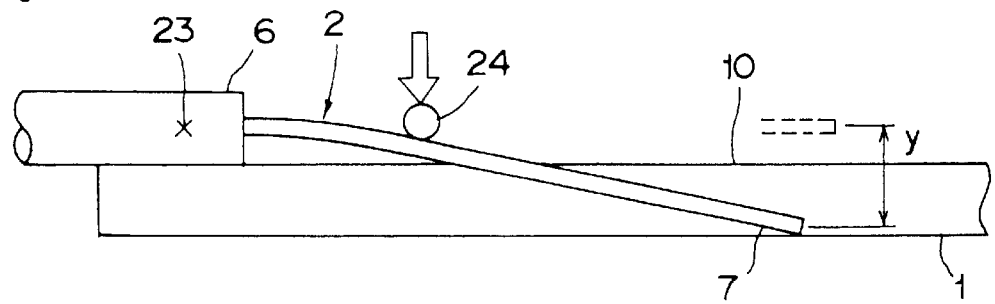
Figure 18C:
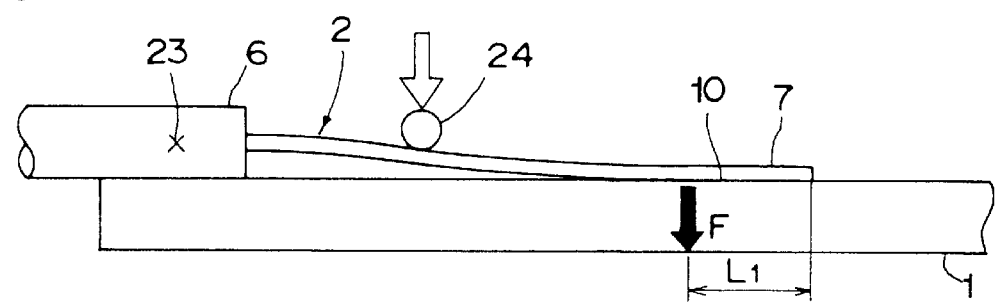
Figure 18D:
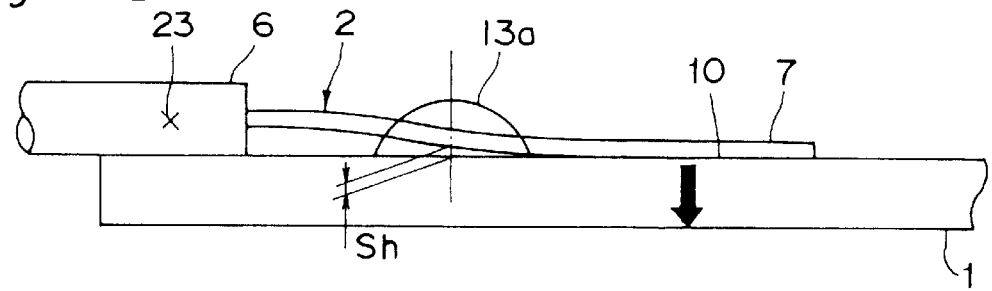

First, as shown in FIG. 18A, the sheathed portion 6 of the optical fiber array 2 is placed on the base 1, and the sheathed portion 6 is held at a holding position 23 so that the end portion 7 of the optical fiber array 2 is separated from the fitting surface 10 of the base 1 in a free state. Next, the optical fiber array 2 between the holding position 23 and the end portion 7 is depressed toward the base 1 by using a pressing member 24 such as a press bar. In this process, the optical fiber array is given such a flexure amount y that, without the base 1, the end of the first optical fiber array 2 would come to a position lower than the fitting surface 10, as shown in FIG. 18B. As a result, as shown in FIG. 18C, the end portion 7 of the optical fiber array 2 is brought into close contact with the fitting surface 10 of the base 1 over a line of some length $L_1$ in parallel therewith, so that a pressing force F for the base 1 is generated. Then, in this state, with the depression of the pressing member 24 stopped, the optical fiber array 2 is fixed to the base 1 at at least one place between the holding position 23 and the end portion 7, as shown in FIG. 18D. In this process, in order to maintain the pressing force F, the fixing portion 13a is located at a position where a spacing Sh is provided between the optical fiber array 2 and the base 1.

FIGS. 19A to 19D show a second method for bringing the end portion 7 of the optical fiber array 2 into close contact with the fitting surface 10 of the base 1.

Figure 19A:
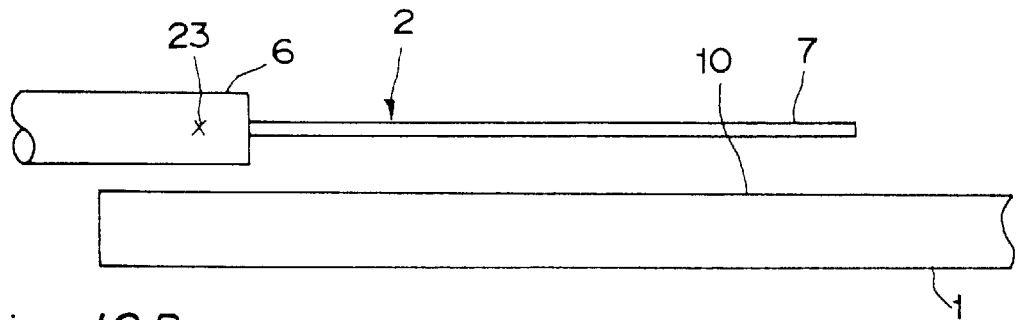
FIGS. 19A, 19B, 19C and 19D are plan views showing the steps of a second embodiment of the method for bringing optical fibers into close contact with the base.
Figure 19B:
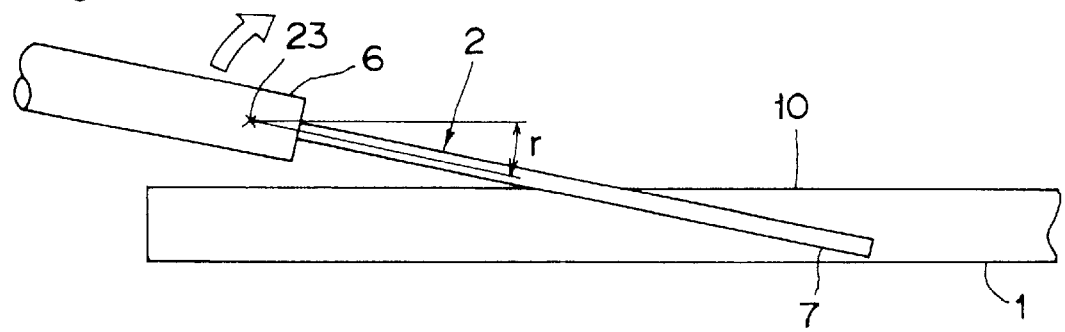
Figure 19C:
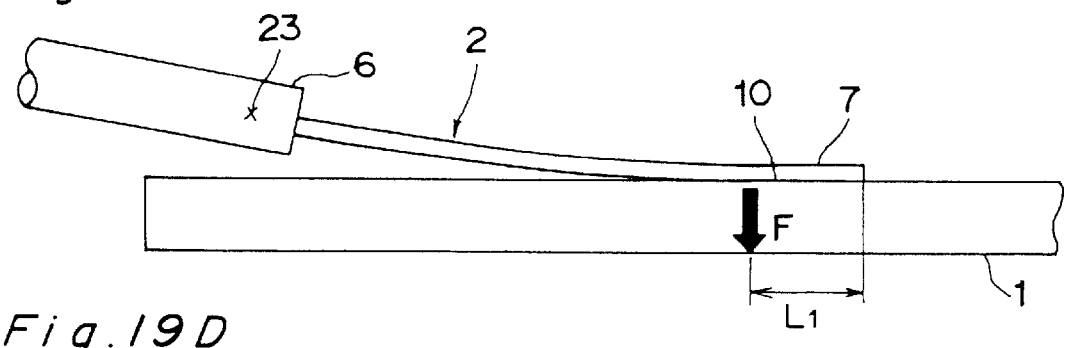
Figure 19D:
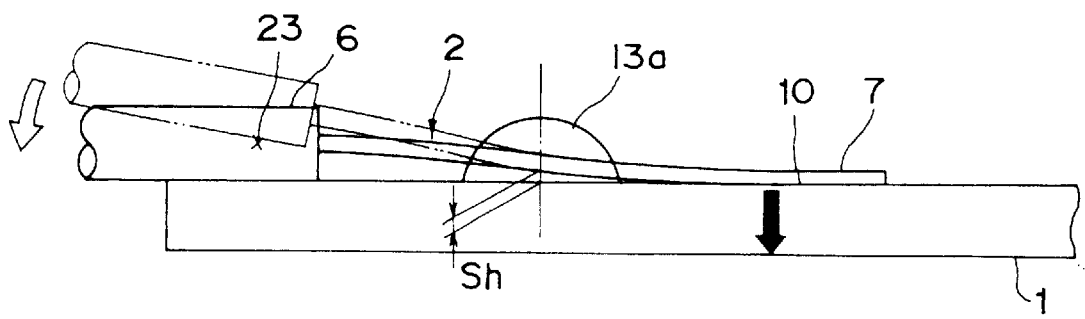

First, as shown in FIG. 19A, with the end portion 7 of the optical fiber array 2 kept separated away from the fitting surface 10 of the base 1 in a free state, the sheathed portion 6 is held at the holding position 23. Next, the optical fiber array 2 is pivoted about the holding position 23 within a plane vertical to the base 1 so that the end portion 7 of the optical fiber array 2 is lowered toward the base 1. In this process, such a pivoting amount r is given that, without the base 1, the end of the optical fiber array 2 would come to a position lower than the fitting surface 10, as shown in FIG. 19B. As a result, as shown in FIG. 19C, the end portion 7 of the optical fiber array 2 is brought into close contact with the fitting surface 10 of the base 1 over a line of some length $L_1$ in parallel therewith, so that a pressing force F for the base 1 is generated. Then, in this state, with the pivoting about the holding position 23 stopped, the optical fiber array 2 is fixed to the base 1 at at least one place between the holding position 23 and the end portion 7, as shown in FIG. 19D. In this process, in order to maintain the pressing force F, the fixing portion 13a is located at a position where a spacing Sh is provided between the optical fiber array 2 and the base 1.

In addition, after the optical fiber array 2 is fixed, the holding position 23 may be pivoted toward the base 1 so as to be parallel to the base 1, preferably in close contact with the base 1. With such an arrangement, the holding position 23 is lowered in height from the base 1, allowing a further miniaturization.

FIGS. 20A to 20D show a third method for bringing the end portion 7 of the optical fiber array 2 into close contact with the fitting surface 10 of the base 1.

Figure 20A:
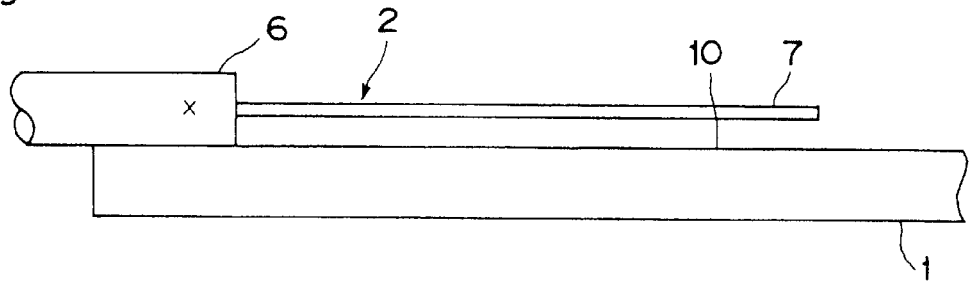
FIGS. 20A, 20B, 20C and 20D are plan views showing the steps of a third embodiment of the method for bringing optical fibers into close contact with the base.
Figure 20B:
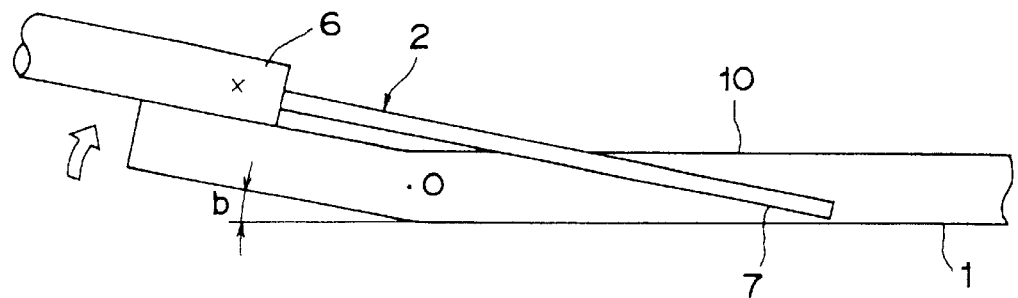
Figure 20C:
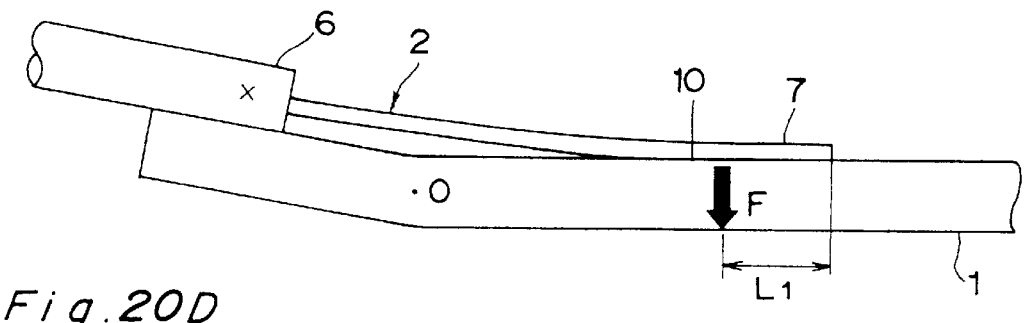
Figure 20D:
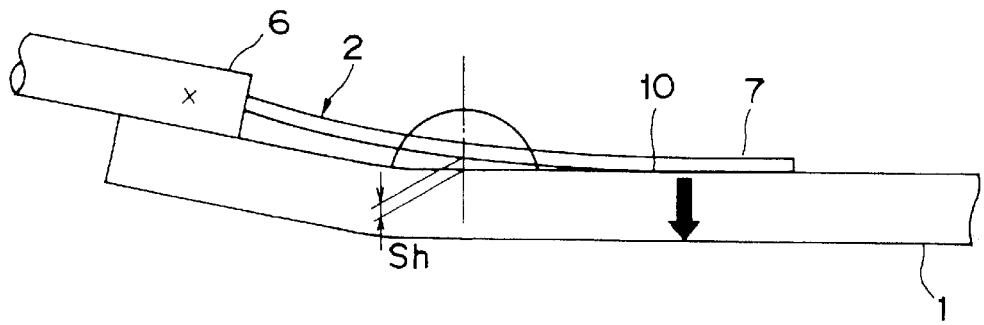

First, as shown in FIG. 20A, with the end portion 7 of the optical fiber array 2 kept separated away from the fitting surface 10 of the base 1 in a free state, the sheathed portion 6 is fixed to the base 1 at the fixing portion 13b. Next, part of the base 1 including the fixing portion 13b is bent upward about a point O located between the fixing portion 13b and the end portion 7 so that the end portion 7 of the optical fiber array 2 is lowered toward the base 1. In this process, such a bend amount b is given that, without the base 1, the end of the optical fiber array 2 would come to a position lower than the fitting surface 10, as shown in FIG. 20B. As a result, as shown in FIG. 20C, the end portion 7 of the optical fiber array 2 is brought into close contact with the fitting surface 10 of the base 1 over a line of some length $L_1$ in parallel therewith, so that a pressing force F for the base 1 is generated. Then, in this state, with the bending of the base 1 stopped, the optical fiber array 2 is fixed to the base 1 at at least one place between the fixing portion 13b of the sheathed portion 6 and the end portion 7, as shown in FIG. 20D. In this process, in order to maintain the pressing force F, the fixing portion 13a is located at a position where a spacing Sh is provided between the optical fibers 2A, 2B, 2C and the base 1.

According to this method, the sheathed portion 6 of the optical fiber array 2 is fixed in the flat state prior to the bending of the base 1, allowing an easy assembly.

Embodiment of the Method for Bringing End Portions of Optical Fibers into Close Contact with One Another:

FIGS. 21A to 21D show a first method for bringing the end portion 7 of the first optical fiber array 2 or the end portion 9 of the second optical fiber array 4 in the foregoing structure of FIG. 1, into close contact with one another on the fitting surface 10 of the base 1. This is explained below with respect to the optical fibers 2A, 2B, 2C of the first optical fiber array 2 by way of example.

Figure 21A:
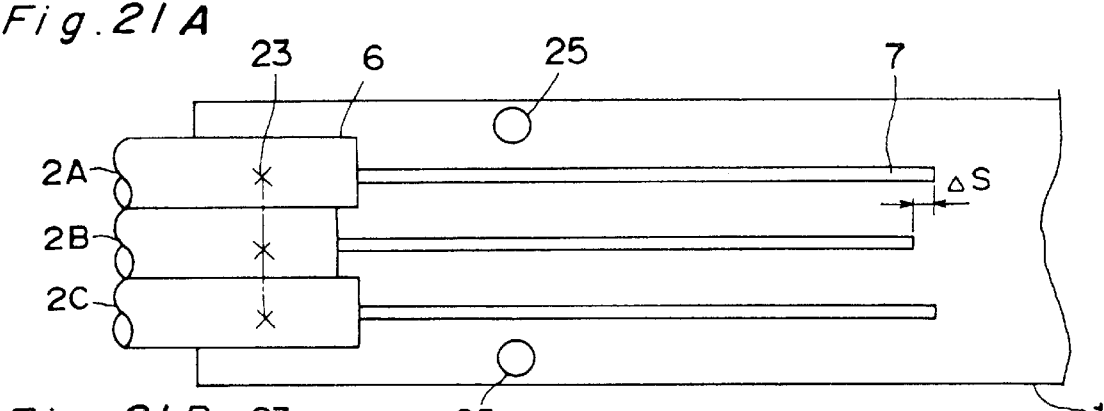
FIGS. 21A, 21B, 21C and 21D are plan views showing the steps of a first embodiment of the method for bringing optical fibers into close contact with one another on the base.
Figure 21B:
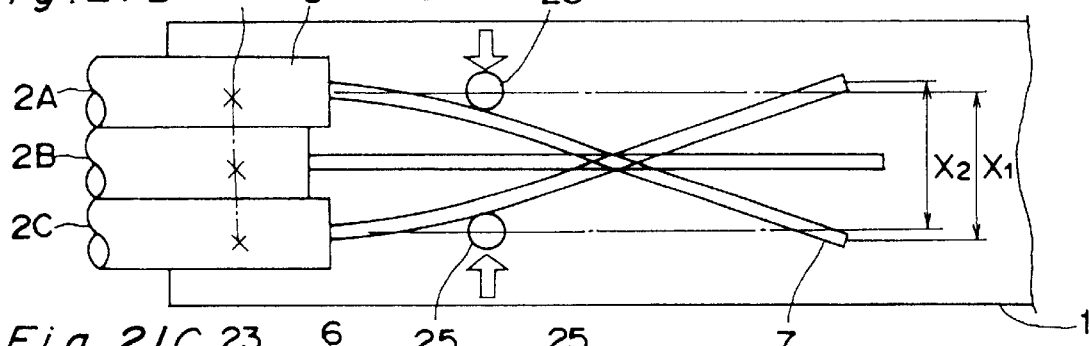
Figure 21C:
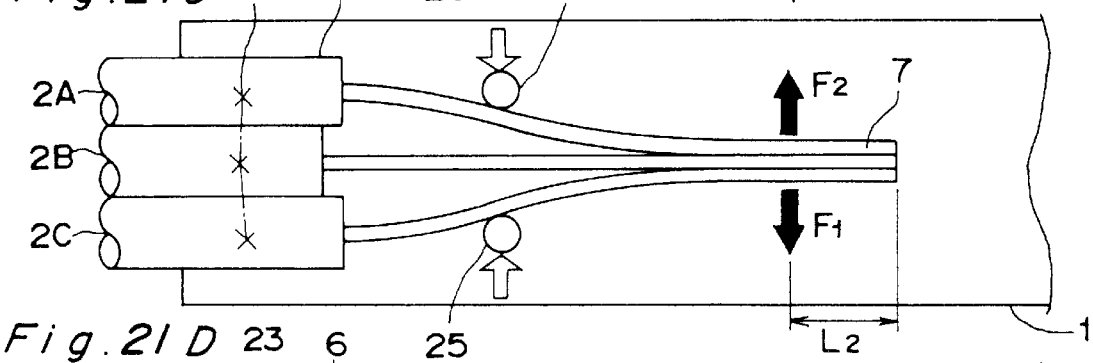
Figure 21D:
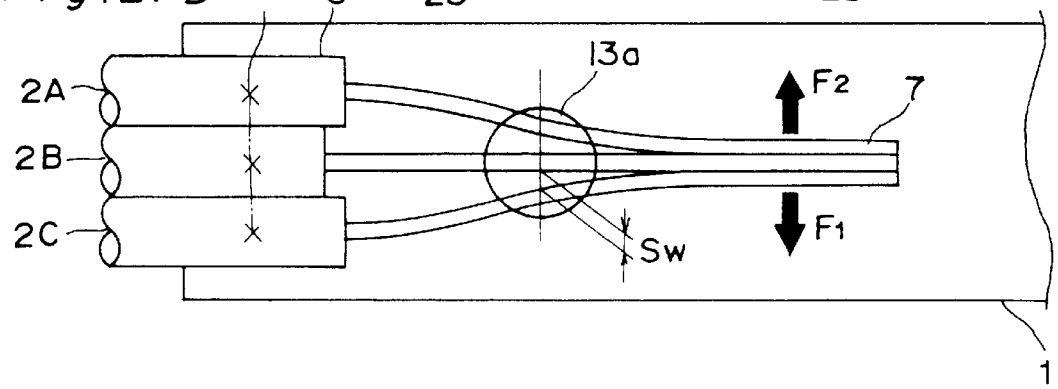

First, as shown in FIG. 21A, the sheathed portions 6 of the optical fibers 2A, 2B, 2C are placed on the base 1, and the sheathed portions 6 are held at a holding position 23 so that the end portions 7 of the optical fibers 2A, 2B, 2C make contact with the fitting surface 10 of the base 1 in a free state (preferably, in line contact by any one of the aforementioned manners as shown in FIGS. 18 to 20). In this process, the end portions 7 are previously shifted slightly by ΔS in the direction of optical axis so that the end faces of the end portions 7 of the individual optical fibers 2A, 2B, 2C are finally aligned flush with one another. Next, the optical fibers 2A, 2C located on both sides out of the individual optical fibers 2A, 2B, 2C are pinched at a portion between the holding position 23 and the end portion 7 by using a pinching member 25 such as a pair of press bars, in which state the individual optical fibers 2A, 2B, 2C are put close to one another into smaller spacings. In this state, the optical fibers are given such flexure amounts $x_1$, $x_2$ that, without the adjacent optical fibers, the ends of the optical fibers 2A, 2C would intersect the center line of the array, as shown in FIG. 21B. As a result, as shown in FIG. 21C, the end portions 7 of the optical fibers 2A, 2C on both sides are brought into close contact with the adjacent optical fiber 2B over a line of some length $L_2$ in parallel with the center line of the array, so that pressing forces $F_1$, $F_2$ for the adjacent optical fiber 2B are generated. In this case, when the flexure amounts $x_1$, $X_2$ of the both-side optical fibers 2A, 2C are equal to each other, the flexure curves of the both-side optical fibers 2A, 2C are symmetrical to each other with respect to the center line of the array, so that the pressing forces $F_1$, $F_2$ are equal to each other. Then, in this state, with the optical fibers 2A, 2B, 2C stopped from being put close to one another by the pinching member 25, the optical fibers 2A, 2B, 2C are fixed to the base 1 at at least one place between the holding position 23 and the end portion 7, as shown in FIG. 21D. In this process, in order to maintain the pressing forces $F_1$, $F_2$, the fixing portion 13a is located at a position where a spacing Sw is provided against the adjacent optical fibers.

Figure 22A:
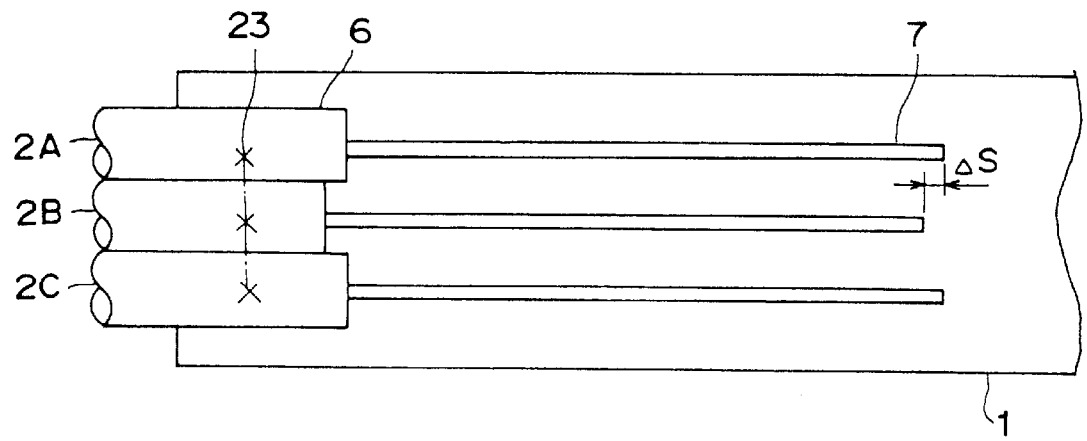
FIGS. 22A, 22B and 22C are plan views showing the steps of a second embodiment of the method for bringing optical fibers into close contact with one another on the base.
Figure 22B:
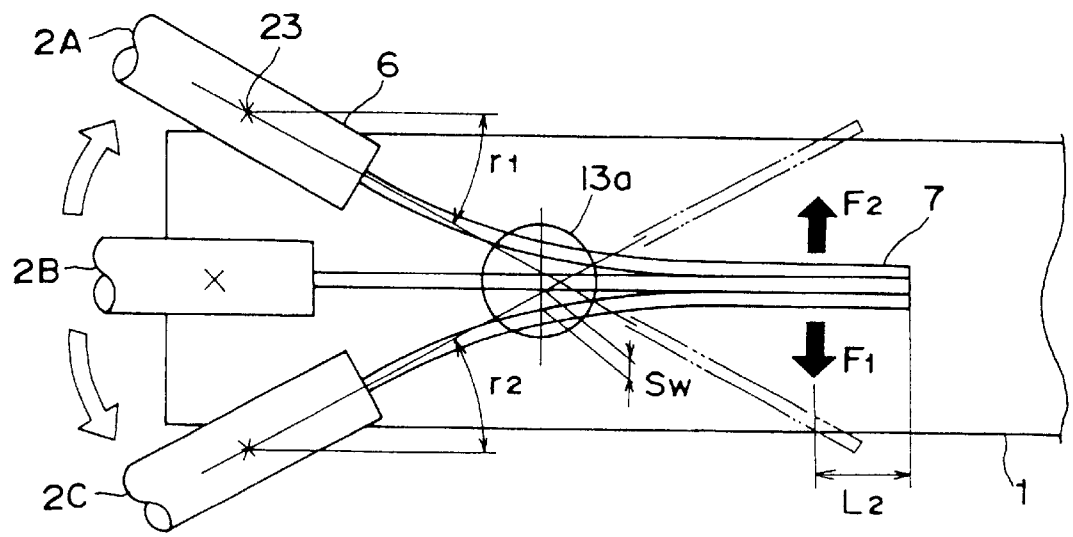
Figure 22C:
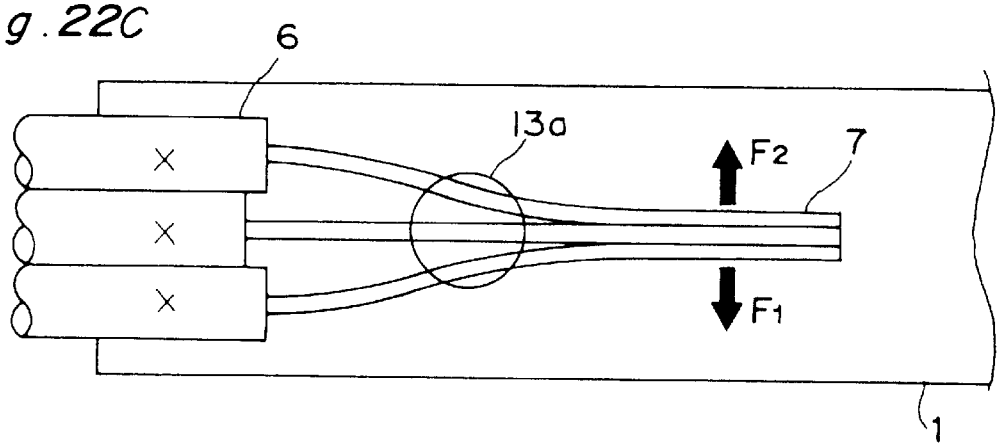

FIGS. 22A to 22C show a second method for bringing the end portions 7 of the optical fibers 2A, 2B, 2C into close contact with one another.

First, as shown in FIG. 22A, the individual optical fibers 2A, 2B, 2C are placed on the base 1, and the sheathed portions 6 are held at the holding position 23 so that the end portions 7 of the optical fibers 2A, 2B, 2C are brought into contact with the fitting surface 10 of the base 1 in a free state (preferably, in line contact) and shifted axially by ΔS. Next, the holding positions 23 of the optical fibers 2A, 2C located on both sides out of the individual optical fibers 2A, 2B, 2C are pivoted in such a direction that their end portions 7 approach each other. In this state, the optical fibers are given such pivoting amounts $r_1$, $r_2$ that, without the adjacent optical fibers, the ends of the optical fibers 2A, 2C would intersect the center line of the array, as shown by two-dot chain line in FIG. 22B. As a result, as shown by solid line in FIG. 22B, the end portions 7 of the optical fibers 2A, 2C on both sides are brought into close contact with the adjacent optical fiber 2B over a line of some length $L_2$ in parallel with the center line of the array, so that pressing forces $F_1$, $F_2$ are generated. Then, in this state, with the both-side optical fibers 2A, 2C stopped from being pivoted, the optical fibers 2A, 2B, 2C are fixed to the base 1 at at least one place between the holding position 23 and the end portion 7. In this process, in order to maintain the pressing forces $F_1$, $F_2$, the fixing portion 13a is located at a position where a spacing Sw is provided against the adjacent optical fibers.

The optical fibers 2A, 2C on both sides may be fixed to the base 1 while being pivoted as shown in FIGS. 22B. Alternatively, for reduction in size widthwise, the sheathed portions 6 are put into close contact with one another by turning back the both-side optical fibers 2A, 2C until they become parallel to the central optical fiber 2B as shown in FIG. 22C, in which state the sheathed portions 6 may be fixed to the base 1.

Figure 23:
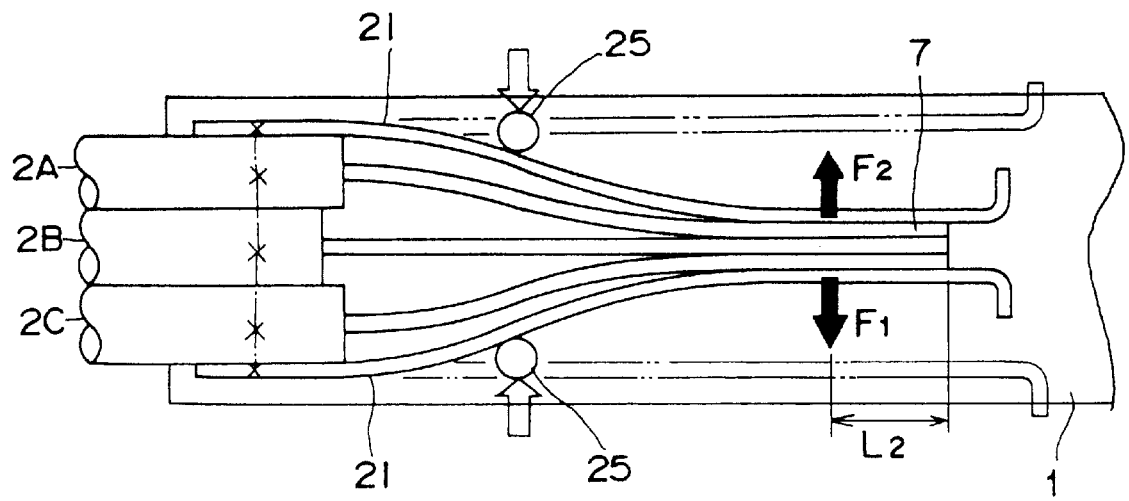
FIG. 23 is a plan view showing a third embodiment of the method for bringing optical fibers into close contact with one another on the base.
Figure 24:
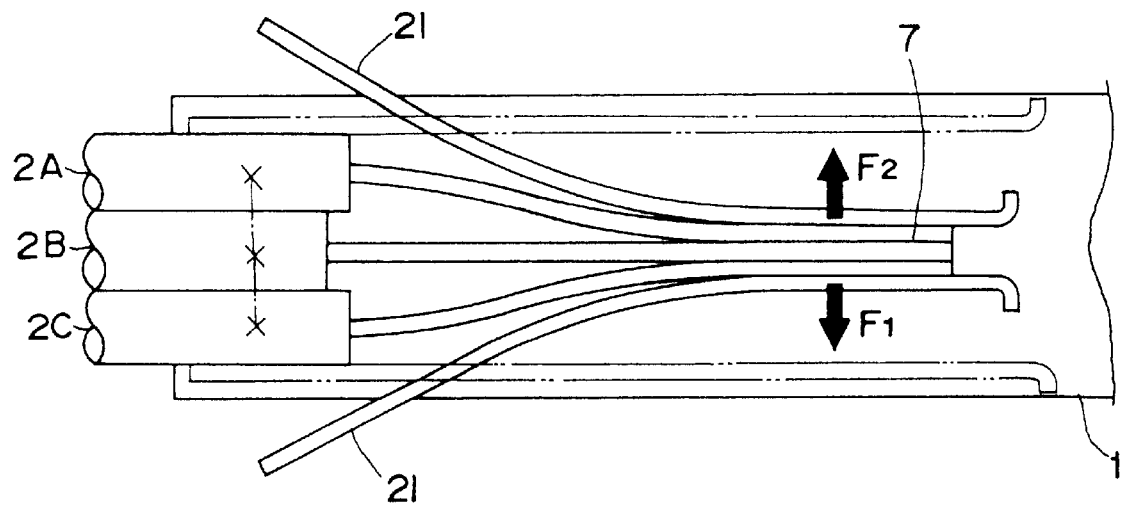
FIG. 24 is a plan view showing a fourth embodiment of the method for bringing optical fibers into close contact with one another on the base.

FIG. 23 and FIG. 24 show fourth and fifth methods for bringing the end portions 7 of the optical fibers 2A, 2B, 2C into close contact with one another.

These methods are ones in which a pair of stopper members 21 made from metal wire or optical fiber are provided in parallel to the optical fibers 2A, 2B, 2C at further outside of the both-side optical fibers 2A, 2C, where the same method as the first and second method respectively, is carried out with the stopper members 21 regarded as both-side optical fibers. According to these methods, since the close contact of the optical fibers 2A, 2B, 2C with one another and the close contact of the optical fibers 2A, 2C with the stopper members 21 are attained concurrently, the assembly becomes easy.

In addition, by performing any one of the methods of FIGS. 18 to 20 and any one of the methods of FIGS. 21 to 24 in a sequential order, the end portion 7 of the optical fiber array 2 can be brought into close contact with the base 1 and into close contact with one another.

According to the methods as described above, the end faces of the end portions of the optical fibers 2A, 2B, 2C make contact with nothing in any step during the process of bringing the optical fibers 2A, 2B, 2C into close contact with the base 1 or into close contact with one another. Therefore, there is no possibility that the optical fibers may have foreign matters stick thereto or undergo breaks. Further, the end portions of the optical fibers 2A, 2B, 2C can be securely brought into close contact with the base 1 or into close contact with one another, without using any additional member.

Figure 25:
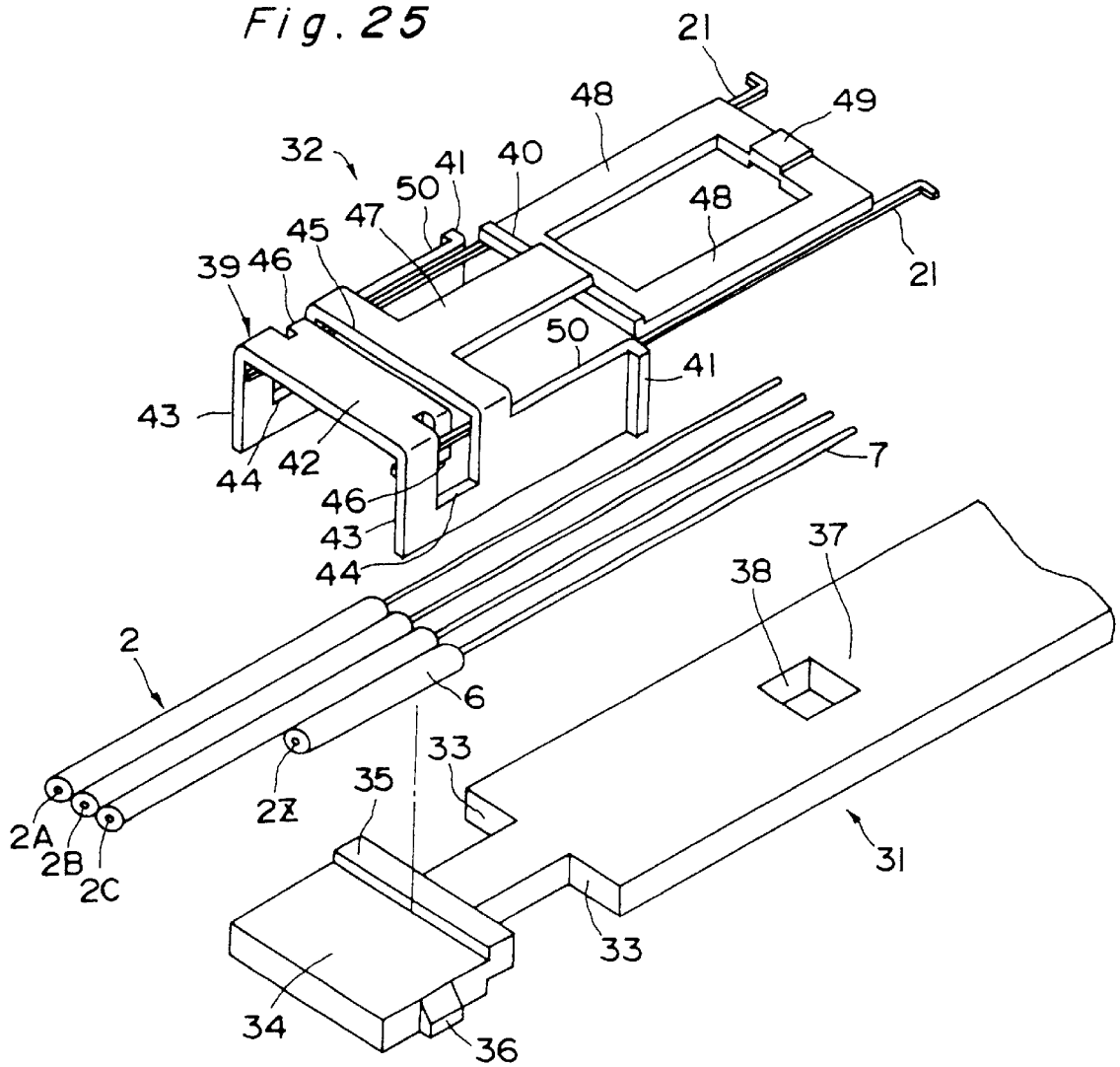
FIG. 25 is an exploded perspective view of an apparatus for bringing optical fibers into close contact with the base as well as into close contact with one another.

Apparatus for Bringing End Portion of Optical Fiber into Close Contact with Base and into Close Contact with One Another:

FIG. 25 shows an apparatus for bringing the end portion of the first optical fiber array 2 or the end portion 9 of the second optical fiber array 4 into close contact with the fitting surface 10 of the base 1 as well as into close contact with one another, in the structure of FIG. 1 as described before.

This apparatus comprises a base 31 and a pressing member 32. The base 31 is formed of an elongate plate, having rectangular cutout portions 33 defined on both side edges of its end portion. A top surface of the base 1 on the draw-out side of the optical fiber array 2 (left side in the figure) with respect to these cutout portions 33 is formed into a fitting surface 34 for the sheathed portion 6 of the optical fiber array 2. In the fitting surface 34, a projecting portion 35 is provided so as to extend laterally so that the optical fiber array 2 will be positioned by the end face of its sheathed portion 6 making contact with the projecting portion 35. On both side end faces of the base 31 located on both sides of the sheathed portion fitting surface 34, protrusions 36 (shown by only one) for fitting the pressing member 32 are formed. A top surface of the base 31 at a place a little away from the cutout portions 33 on the end side of the optical fiber array 2 (right side in the figure) is formed into a fitting portion 37 for the optical fiber array 2. In proximity to the optical fiber fitting portion 37, is formed a rectangular hole 38 for letting out the adhesive of a later-described third fixing portion 13c of the optical fiber array 2.

The pressing member 32 comprises a holding portion 39, a first pressing portion 40, and a pair of second pressing portions 41. The holding portion 39 is formed into an inverted U shape comprising a top portion 42 and side portions 43 on both sides thereof. The spacing between the side portions 43, 43 on both sides of the holding portion 39 is set generally equal to the width of the base 31 so that the base 31 fits thereto. In the side portions 43 of the holding portion 39, there are defined engaging holes 44, respectively, with which the protrusions 36 of the base 31 engage. These engaging holes 44 are contiguous to a narrow window 45 that ranges from one side portion 43 to the other side portion 43 via the top portion 42. On both sides of the lower face of the top portion 42 of the holding portion 39, elastic protruding pieces 46 are protrudingly provided so as to suspend parallel to the side portions 43. The spacing between each elastic protruding piece 46 and its opposite side portion 43 is set generally equal to the width or diameter of the stopper members 21 so that the stopper members 21 can be pinched therebetween. Also, the size of each elastic protruding piece 46 from the lower surface of the top portion 42 is equal to the diameter of the sheathed portion 6 of the optical fiber array 2.

Figure 26:
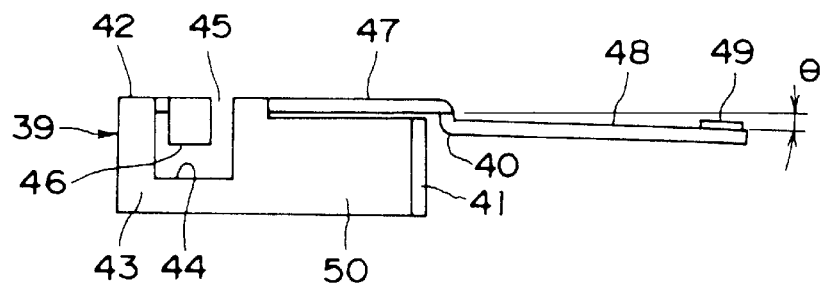
FIG. 26 is a front view of a pressing member shown in FIG. 25.

The first pressing portion 40 is formed at an end of an elastic piece 47 extending from the top portion 42 of the holding portion 39 toward the end side of the optical fiber array 2. Two elastic tongue pieces 48 are further extended from both sides of the first pressing portion 40 toward the end side of the optical fiber array 2, the ends of the elastic tongue pieces 48 being connected to each other by a bridge 49. The two elastic tongue pieces 48 are slanted downward at an angle θ with respect to an extended line of the top portion 42 and the elastic piece 47 of the holding portion 39 as shown in FIG. 26.

The second pressing portions 41 are formed by bending outward end portions of elastic pieces 50 extending from both side portions 43, respectively, of the holding portion 39 toward the end side of the optical fiber array 2.

With the apparatus of the above construction, the procedure for bringing the first optical fiber array 2 into close contact with the base 31 as well as into close contact of one optical fiber with another is described below.

Figure 27A:
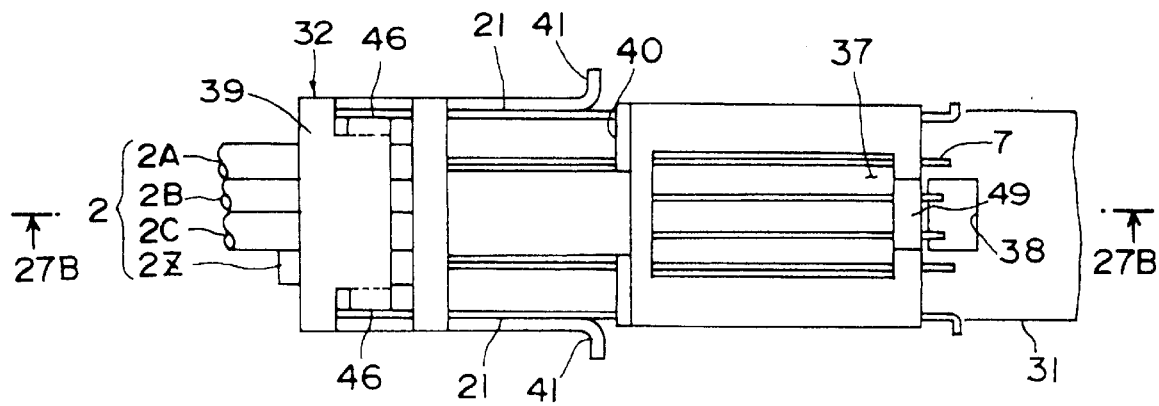
FIG. 27A is a plan view showing a state in which a pressing member is fitted to the base to hold optical fibers.
Figure 27B:
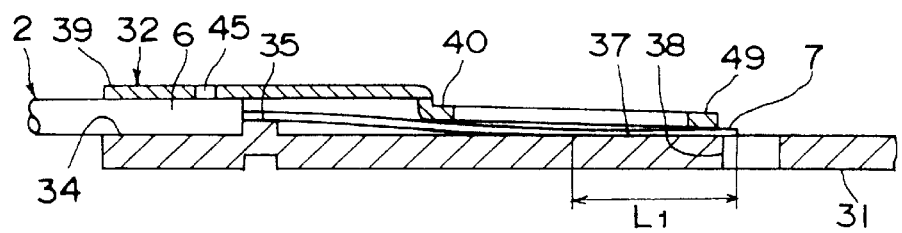
FIG. 27B is a sectional view taken along the line 27B—27B of FIG. 27A.

First, as shown in FIG. 25, the pair of stopper members 21 are pinched at their rear ends between the two elastic protruding pieces 46 and their opposite side portions 43 of the holding portion 39 of the pressing member 32, so that the stopper members 21 run along the second pressing portions 41. Next, the optical fibers 2A, 2B, 2C and 2Z whose cores are exposed by removing the sheathed portions from the end to some length are aligned parallel and placed on the sheathed portion fitting surface 34 of the base 31, so that the end faces of the sheathed portions 6 come into contact with the projecting portion 35 of the base 31. In this process, the ends of the optical fibers 2A, 2B, 2C and 2Z have previously been adjusted in the length of their cores so that the ends of both-side optical fibers 2A, 2Z are projected slightly farther than the central optical fiber 2B, 2C. Then, with the optical fiber array 2 held in this state, the holding portion 39 of the pressing member 32 is overlaid on the sheathed portion fitting surface 34 of the base 31. As a result, the protrusions 36 of the base 31 are engaged with the engaging holes 44 of the pressing member 32, by which the pressing member 32 is fitted to the base 31 as shown in FIGS. 27A and 27B.

In this state, the sheathed portions 6 of the optical fiber array 2 are pressed by the lower surface of the top portion 42 of the holding portion 39 of the pressing member 32 so as to be in close contact with the sheathed portion fitting surface 34 of the base 31, while the sheathed portions 6 are restricted in lateral movement by both-side elastic protruding pieces 46 so as to be in close contact with one another. The optical fiber array 2 is pressed between their end portions 7 and the holding portion 39 by the first pressing portion 40 toward the base 31. Likewise, the stopper members 21 are also pressed by the first pressing portion 40 toward the base 31. As a result, the end portion of the optical fiber array 2 and the end portions of the stopper members 21 are put into close contact with the optical fiber fitting portion 37 of the base 31 from its end over a line of some length $L_1$.

Figure 27C:
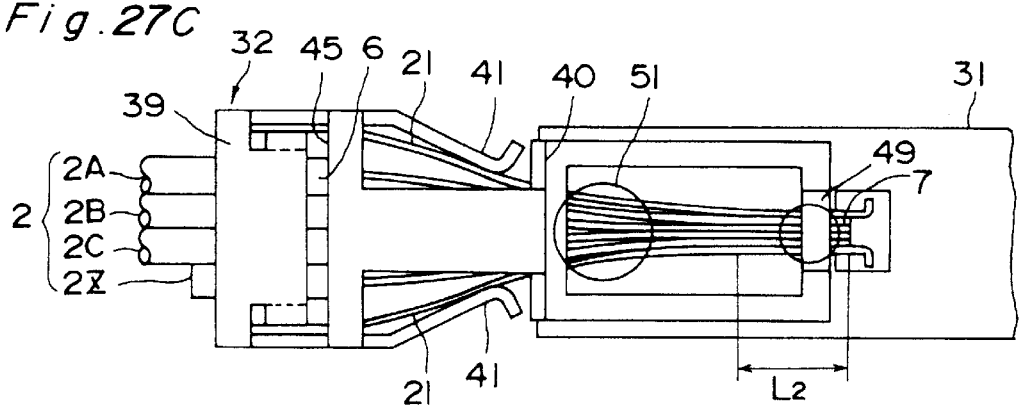
FIG. 27C is a plan view showing a state in which the second pressing portion of the pressing member is plastically deformed so that the stopper members and optical fibers are flexed.
Figure 27D:
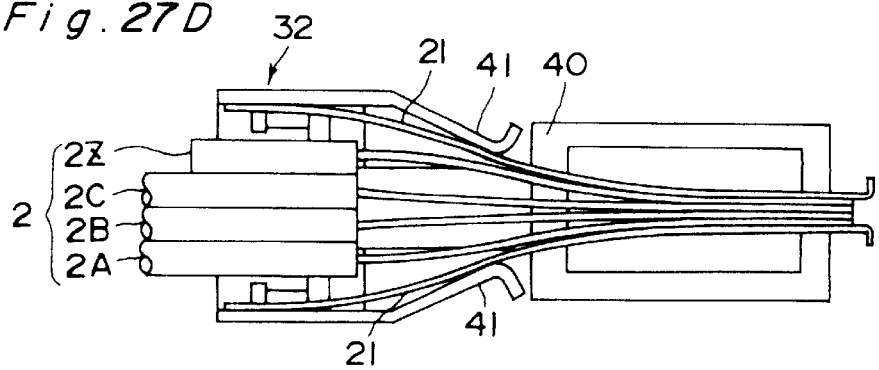
FIG. 27D is a bottom view of FIG. 27C, as viewed with the base removed.

Next, the second pressing portions 41 of the pressing member 32 are pinched from outside by using a tool, so as to be plastically deformed inward as shown in FIG. 27C. Thus, the stopper members 21 are pressed by the second pressing portions 41 so as to be flexed inward, thereby pressing the adjacent optical fibers 2A, 2Z and their inner optical fibers 2B, 2C, one by one. As a result of this, the optical fibers 2A, 2B, 2C, 2Z are flexed sequentially from outside, so as to be narrowed in their spacings until they are brought into close contact with one another over a line of some length $L_2$ from the ends.

Thus, in the state that the end portions of the optical fiber array 2 and the stopper members 21 are in close contact with the base 1 as well as in close contact of one optical fiber with another, the optical fiber array 2 and the stopper members 21 are fixed to the base 31 with an adhesive first at a portion 51 which is between the end portions 7 of the individual optical fibers of the optical fiber array 2 and the holding portion 39 and which has a spacing between one optical fiber and another. Subsequently, an adhesive is injected through the window 45 of the holding portion 39 of the pressing member 32 so that the sheathed portions 6 of the optical fiber array 2 together with the stopper members 21 are fixed to the base 31. Further, the end portions 7 of the optical fiber array 2 and the stopper members 21 are bonded to one another by using an adhesive. In this process, even if the adhesive has overflowed to the base 31 side along the peripheral surfaces of the optical fiber array 2 or the stopper members 21, the let-out hole 38, which is provided in the base 31 opposite to the bonding portion, prevents the end portions 7 from being floated up from the fitting portion 37 of the base 31 and from loosing the close contact.

In addition, it is also possible that the end portions of the individual optical fibers 4A, 4B, 4C constituting the second optical fiber array 4 are brought into contact with the fitting portion 37 of the base 31 as well as into close contact with one another in an optical switch having the construction as shown in FIG. 1 by using the above apparatus. In this case, the stopper members 21 are unnecessary.

Figure 28:
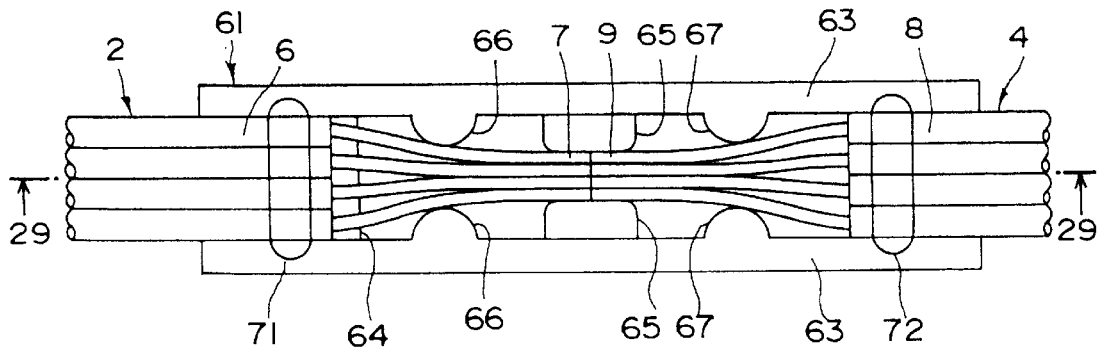
FIG. 28 is a plan view showing an embodiment of the optical connector of the present invention.
Figure 29:
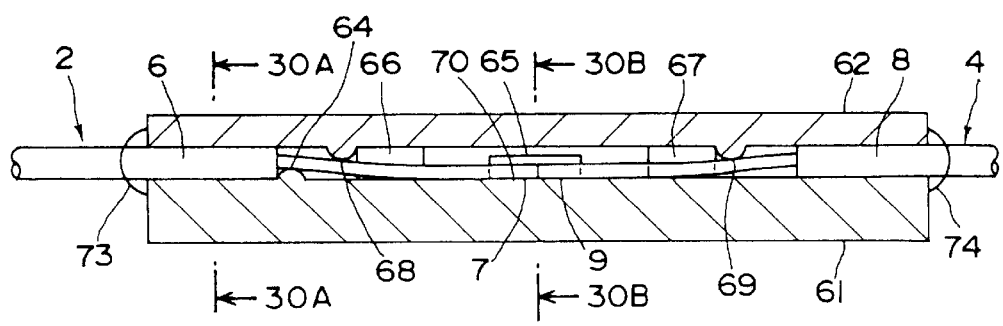
FIG. 29 is a sectional view taken along the line 28—28 of FIG. 28.

Embodiments of Optical Connector:

FIGS. 28 and 29 show an optical connector that connects the first optical fiber array 2 and the second optical fiber array 4 with each other.

Figure 30A:
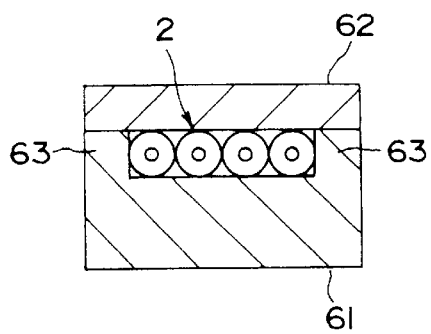
FIG. 30A is a sectional view taken along the line 30A—30A of FIG. 29.
Figure 30B:
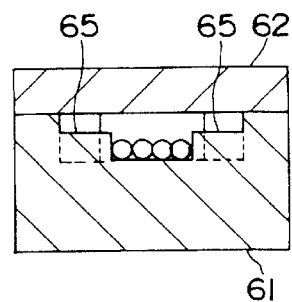
FIG. 30B is a sectional view taken along the line 30B—30B of FIG. 29.

This optical connector comprises a base 61 and a cover 62. The base 61 has side wall portions 63 extending longitudinally on both side end portions of an elongate rectangular plate. The height of the side wall portions 63 is generally equal to the diameter of the sheathed portions 6, 8 of the optical fiber arrays 2, 4 as shown in FIG. 30A. Also, the spacing between the side wall portions 63 on both sides is generally equal to the product of the diameter of the sheathed portions 6, 8 and their counts as shown in FIG. 30B. In proximity to an end portion of the top surface of the base 61 on the first optical fiber array 2 side, a projecting portion 64 extending laterally is provided to align the end faces of the sheathed portions 6 of the first optical fiber array 2. In a center of the top surface of the base 61, a pair of stopper members 65 are protrudingly provided. The height of the stopper members 65 is not less than ½ of the diameter of the optical fibers. Also, the spacing between the opposing side faces of the stopper members 65 is generally equal to the product of the diameter of the optical fibers and their counts. On the inner side faces of the side wall portions 63, a first pressing portions 66 projecting inward are defined on the first optical fiber array 2 side, while second pressing portions 67 projecting inward are defined on the second optical fiber array 4 side likewise. The spacing between the first pressing portions 66 and the spacing between the second pressing portions 67 are greater than the spacing between the stopper members 65.

The cover 62 is formed of a flat plate that covers the base 61. On the lower surface of the cover 62, a third pressing portion 68 extending laterally is defined on the first optical fiber array 2 side, while a fourth pressing portion 69 extending laterally is defined on the second optical fiber array 4 side likewise. These third pressing portion 68 and fourth pressing portion 69 are defined between the end portions 7 and the sheathed portions 6 of the first optical fiber array 2, and between the end portions 9 and the sheathed portions 8 of the second optical fiber array 4, respectively. Also, the projecting height of the third pressing portion 68 and the fourth pressing portion 69 is of such a size that when the optical fiber arrays 2, 4 are pressed by them, the end portions 7, 9 of the optical fiber arrays 2, 4 will be brought into contact with a fitting surface 70 of the base 61 over a line.

The process of connecting the first optical fiber array 2 and the second optical fiber array 4 with each other by using the optical connector of the above construction comprising the base 61 and the cover 62 is described below.

First, the end portions 7 of the first optical fiber array 2 with the optical fibers exposed to a specified length by removing the sheathed portions 6 at their ends are bundled and held in an array. Further, with the sheathed portions 6 held aligned, the end portion 7 of the optical fiber array 2 is inserted between the pair of stopper members 65 of the base 61 and the sheathed portions 6 are inserted between the side wall portions 63. In this process, the optical fiber array 2 between the end portions 7 and the sheathed portions 6 is inserted between the pair of first pressing portions 66 of the base 61. Then, the end faces of the sheathed portions 6 of the first optical fiber array 2 are brought into contact with the projecting portion 64 of the base 61, in which state the end faces of the optical fiber array 2 are aligned. Subsequently, the second optical fiber array 4 is fitted to the base 61 in the same manner as the first optical fiber array 2, where the end face of the second optical fiber array 4 is put into contact with the end face of the first optical fiber array 2 or opposed thereto with a slight gap given therebetween.

Next, the cover 62 is fitted to the base 61. By so doing, the third pressing portion 68 and the fourth pressing portion 69 on the lower surface of the cover 62 give presses between the sheathed portions 6, 8 and the end portions 7, 9 of the first optical fiber array 2 and the second optical fiber array 4. Thus, the end portions 7, 9 of the first optical fiber array 2 and the second optical fiber array 4 are brought into contact with the fitting surface 70 of the base 61 between the pair of stopper members 65 as well as into close contact of one optical fiber with another. As a result, the first optical fiber array 2 and the second optical fiber array 4 become coincident in optical axis with high precision.

The base 61 and the cover 62 are fixed by adhesive or secured by screws. In order that the first optical fiber array 2 and the second optical fiber array 4 are prevented from being pulled out of the optical connector, the sheathed portions 6, 8 are firmly fixed at firmly fixing portions 71, 72 to the base 61 with an adhesive before the cover 62 is fitted as shown in FIG. 28, or otherwise the sheathed portions 6, 8 of portions 73, 74 protruding from the base 61 are firmly fixed to the base 61 and the cover 62 with an adhesive after the cover 62 is fitted as shown in FIG. 29.

In the optical connector as described above, the optical axes of the optical fiber arrays 2, 4 can be made coincident with each other without using any special member by a simple process of incorporating the optical fiber arrays 2, 4 to the base 61 and attaching the cover 62.

Figure 31:
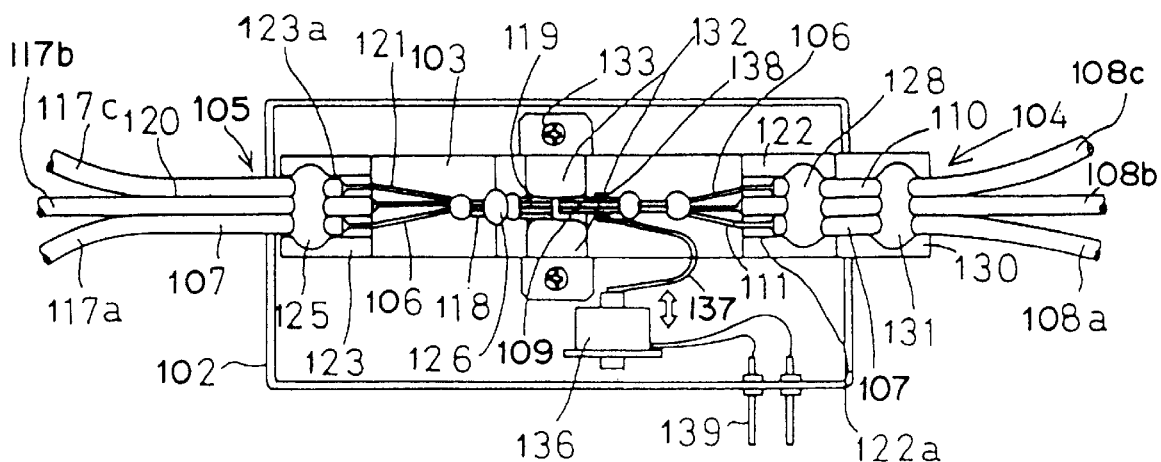
FIG. 31 is a plan view showing a first embodiment of the optical switch of the present invention.

First Embodiment of Optical Switch:

FIG. 31 is a plan view showing an outlined construction of an optical switch 101 of the present invention. This optical switch 101 has a casing 102 made of plastics or metal or the like, the casing 102 having a base block 103 disposed therein. On the top surface of the base block 103, are fixed a movable optical fiber 104 and a fixed optical fiber 105.

Figure 32:
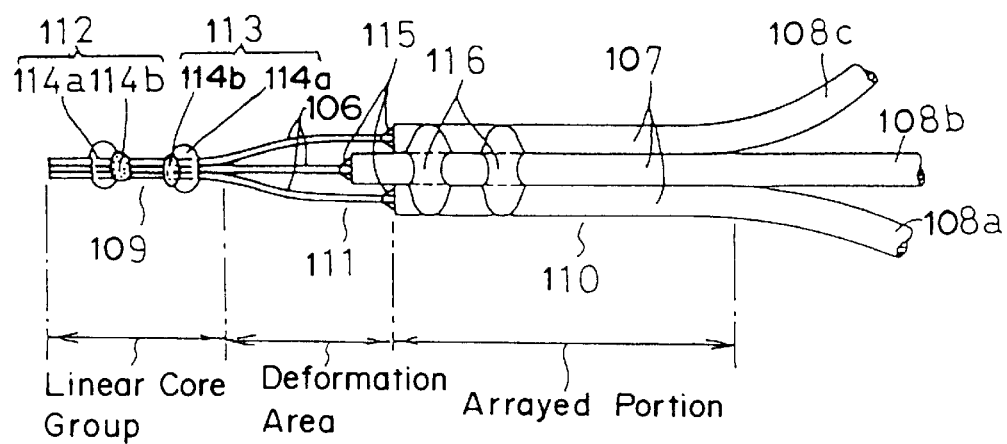
FIG. 32 is a plan view showing the structure of the movable optical fiber of the optical switch shown in FIG. 31.

The construction of the movable optical fiber 104 is shown in FIG. 32. The movable optical fiber 104 is formed at an end portion of an optical fiber array in which a plurality of optical fibers (single-core sheathed fibers) 108a, 108b, 108c each having a sheathed portion 107 around a core (core alone, or core and clad) 106 are arrayed in a plural number. The optical fibers 108a, 108b, 108c each having the sheathed portion 107 may be selected freely, but preferably from among UV core, nylon core, tape core, optical fiber code, and the like. Among others, in particular, nylon core is preferable by virtue of its easy handlability and miniaturizability. With the use of the UV core, since the spacing between the optical fibers 108a, 108b, 108c can be narrowed, an deformation area 111 of the cores 106 can be designed short so that the movable optical fiber 104 can be miniaturized to a large extent, whereas the optical fibers 108a, 108b, 108c tend to become difficult to handle. With the use of the optical fiber code, the strength of the sheathed portions 107 is increased with a leap so that an enough strength for handling outdoors is obtained, whereas the spacing between fibers becomes large so that the movable optical fiber 104 tends to be increased in size.

At least one end of the sheathed portion 107 of each optical fiber 108a, 108b, 108c to be used for the movable optical fiber 104 is removed to expose the core 106 to such a specified length as necessary to form the movable optical fiber 104. The plurality of optical fibers 108a, 108b, 108c are arranged in an array in a state that near end portions of the cores 106 and near end portions of the sheathed portions 107 are respectively in close contact with each other. The near end portions of the cores 106 are firmly fixed and integrated with one another in a linear close contact state so as to be formed into a linear core group 109 of the cores 106. Also, the terminal end portions of the sheathed portions 107 of the individual movable optical fibers 104 are firmly fixed with one another similarly in a linear close contact state so as to be formed into an arrayed portion 110. Further, a deformation area 111 of the cores 106 is provided between the linear core group 109 and the arrayed portion 110, where any dimensional differences in the width of the linear core group 109 and in the width of the arrayed portion 110 will be absorbed by deformation of the cores 106. It is noted that the cores 106 is curved smoothly at the deformation area 111 in order that optical signals will not be leaked outside at the deformation area 111. The deformation area 111 is set to such a length that the maximum stress applied to the curved portions of the cores 106 will be not more than the tensile stress applied in the screening process, preferably set to not more than a half, particularly preferably a quarter, of the tensile stress for the screening process. This makes it possible to largely reduce the probability that the optical fibers 108a, 108b, 108c may break at the deformation area 111 where the cores 106 are curved.

Thus, in the movable optical fiber 104, at end portions of the cores 106 extended from the arrayed portion 110 where the sheathed portions 107 are arranged in an array, is formed the linear core group 109 where the cores 106 are also arranged in an array. That is, at an end of the movable optical fiber 104, is formed the linear core group 109 that is extremely lightweight and small size as compared with the arrayed portion 110. This movable optical fiber 104 is so designed that the linear core group 109 is displaced widthwise (in the direction of array of the cores 106) by deforming the cores 106 at the deformation area 111 with the arrayed portion 110 fixed. Since the linear core group 109, which is the portion of the above displacement, is formed of the cores 106 alone, the linear core group 109 can be reduced to so lightweight and small size that the linear core group 109 can be moved at high speed by a miniature actuator 136. Further, since the construction is simple and no precision machined parts are required, the movable optical fiber 104 can be provided as small size, lightweight, and low price.

The linear core group 109 at the terminal end of the cores 106 and the arrayed portion 110 at the terminal end of the sheathed portions 107 are both formed generally parallel to the direction in which the optical fibers 108a, 108b, 108c are arrayed. Therefore, by fixing the movable optical fiber 104 to a level site in the arrayed portion 110, the terminal end portion of the movable optical fiber 104 can be easily positioned horizontal.

Next, the method of firmly fixing the cores 106 to one another in the linear core group 109, and the method of firmly fixing the sheathed portions 107 to one another in the arrayed portion 110 are described in detail. In the linear core group 109, the cores 106 are fixed to one another at two places of a first fixing portion 112 on the end side and a second fixing portion 113 adjacent to the deformation area 111. This first fixing portion 112 has a function of holding the plurality of cores 106 aligned in line, while the second fixing portion 113 has a function of preventing any load generated in the deformation area 111 from applying to the first fixing portion 112. That is, any load that is generated by the cores 106 going to turn back from a curved state in the deformation area 111, as well as any external force that acts on the movable optical fiber 104, will act in such a direction as to disturb the dimensional precision of the linear core group 109 at the end of the movable optical fiber 104, causing the dimensional precision of the linear core group 109 to be deteriorated with time. However, by providing the second fixing portion 113 with a view to the absorption of loads, the first fixing portion 112 purposed to maintain the dimensions of the linear core group 109 located at the end can be kept away from any loads and external forces. Thus, the dimensional precision of the linear core group 109 can be maintained stable with time.

The first fixing portion 112 is formed so as not to extend to the end portion of the linear core group 109. Therefore, the side face of the end portion of the linear core group 109 can be positioned by being hit directly against positioning references (later-described stopper members 132), allowing a high-precision positioning to be accomplished.

In addition, the first fixing portion 112 and the second fixing portion 113 may also be formed integrally and continuously, or otherwise formed separately and individually as shown in FIG. 32. When the first and second fixing portions 112, 113 are formed integrally, it becomes possible to miniaturize the linear core group 109. When they are formed separately, it becomes possible to flexibly deform the intermediate area between the first fixing portion 112 and the second fixing portion 113 with respect to external force. This lessens the transfer or generation of stresses to the other portions of the movable optical fiber 104, so that the movable optical fiber 104 can be improved in its life.

Figure 33A:
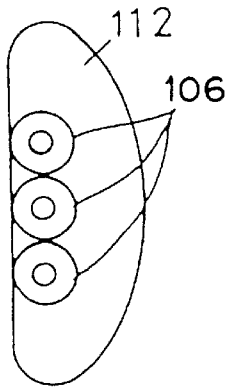
FIGS. 33A and 33B are an enlarged view of the movable optical fiber of FIG. 32, as viewed from an end, and an enlarged plan view of an end portion, respectively.
Figure 33B:
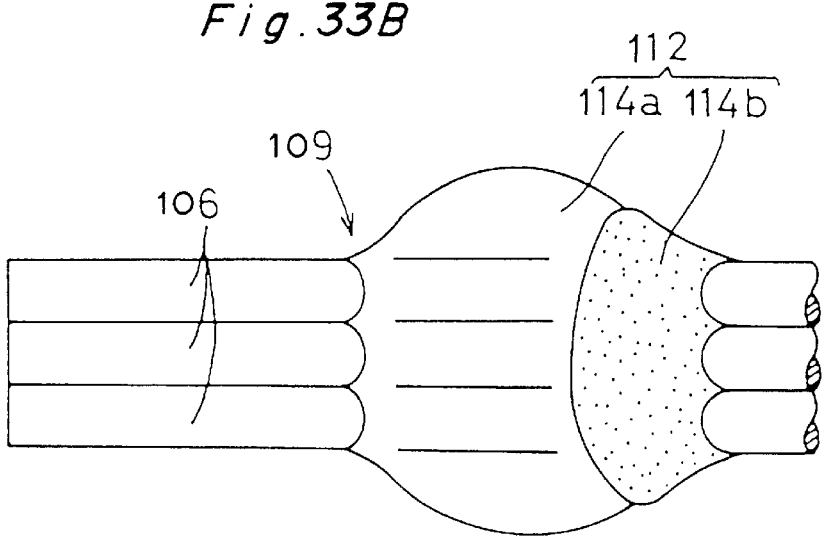

As to the fixing means for the first and second fixing portions 112, 113, the cores 106 may be bonded to one another by adhesion, welding, tightening with screws, fitting, or other means, where the means of adhesion is preferable in particular. The means of adhesion involves neither high-precision machined parts nor molded parts, so that no stress will be generated at the bonding of the cores 106. The adhesive to be used for this process is preferably an adhesive of short curing time and an adhesive of high stability with time, where it is particularly preferable to use an adhesive of short curing time for temporary fitting and to use an adhesive of high stability with time (generally, adhesives of high stability with time tend to involve long curing time) for final fitting. In more detail, as shown in FIGS. 32, 33A, and 33B, the linear core group 109 is secured first at two points with a temporary-fixing adhesive 114a of short curing time, and then secured at respective insides of the two bonding portions by temporary-fixing adhesive 114a with a final-fixing adhesive 114b of high stability with time. More specifically, the temporary-fixing process comprises steps of applying the temporary-fixing adhesive 114a to a plurality of cores 106 that have been aligned together at their ends in widthwise close contact with one another on a jig (not shown), curing the temporary-fixing adhesive 114a, and thereafter releasing the fixed cores 106 from the jig. The surface of the jig with which the cores 106 make contact is preferably made of a material good at releasability from the adhesive, for example, Teflon, polyacetal resins, and metal foil tape. Metal foil tape is most preferable by virtue of its capability of easily obtaining a surface small in surface roughness and good at releasability, as well as of its superiority in hardness. The metal foil tape used for the surface of the jig for contact with the cores 106 is made of a metal foil rolled out into a thickness of not more than a few hundreds μm, preferably not more than 550 μm, more preferably not more than 30 μm, with one side of the metal foil applied with an adhesive. The metal foil may be iron foil tape, copper foil tape, aluminum foil tape, and the like, where aluminum foil tape is preferable in particular. The iron foil tape is superior in strength to the aluminum foil and the copper foil, but tends to be difficult to form into a thin foil. The copper foil tape, although easy to form into a thin foil, is inferior in strength and tends to cause the adhesive to chemically react. Next, after the temporary-fixing adhesion process is ended, the finally-fixing adhesive 114b is applied to the cores 106 temporarily fixed by using or not using the same jig, and then cured.

The adhesive of short curing time (temporary-fixing adhesive 114a) may be, for example, ultraviolet-curing adhesives, cyano-acrylate instant adhesives, or the like, where ultraviolet-curing adhesives are preferable by virtue of their good releasability from jigs and the capability of easily controlling the curing timing. Also, the adhesive of high stability with time (finally-fixing adhesive 114b) may be, for example, epoxy adhesives and silicone adhesives, where epoxy adhesives are preferable in terms of hardness and stability with time, and moreover one-liquid thermosetting type epoxy adhesives are preferable in terms of long pot life and easy control of the curing time.

Thus, by firmly fixing the cores 106 in this way, because of the short curing time of the temporary-fixing adhesive 114a that temporarily fixes the cores 106 with one another, the adhesive can be prevented from overflowing to the end area used for the positioning of the linear core group 109 or from overflowing to the deformation area 111. Further, by bonding the linear core group 109 with the finally-fixing adhesive 114b in the state that the linear core group 109 has been temporarily fixed with the temporary-fixing adhesive 114a, the linear core group 109 can be firmly fixed with reliability. In this process, by applying the finally-fixing adhesive 114b to the inside of the finally-fixing adhesive 114b, the finally-fixing adhesive 114b can be prevented from overflowing to the end area of the linear core group 109 or the deformation area 111. Further, the finally-fixing adhesive 114b, being an adhesive of high stability with time, improves the durability of the movable optical fiber 104.

Similarly, at the terminal end portions of the sheathed portions 107, the sheathed portions 107 are fixed and integrated with one another by a fixing method of adhesion, fusion, or the like at a plurality of sheath fixing portions 116. Although the sheathed portions 107 do not necessarily need to be fixed with one another at the terminal end portions of the sheathed portions 107, it is preferable to fix the sheathed portions 107 with one another, and most preferable to fix the terminal end portions with the sheathed portions 107 bundled together. With the sheathed portions 107 fixed with one another, even if external force is applied to the other ends of the optical fibers 108a, 108b, 108c constituting the movable optical fiber 104, the load will not be applied to the linear core group 109 at the end, so that a high operation precision can be maintained. The handling of the movable optical fiber 104 becomes also easy.

The terminal end positions of the fixed sheathed portions 107 are not necessarily coincident with the axial direction of the optical fibers 108a, 108b, 108c. Preferably, the terminal end of the sheathed portion 107 of the central optical fiber 108b is protruded beyond the terminal end of the sheathed portions 107 of the adjacent both-side optical fibers. This allows the deformation area 111 of the movable optical fiber 104 to be shortened without increasing the amount of displacement of the cores 106 of the both-side optical fibers, so that the movable optical fiber 104 can be reduced in size.

Preferably, the cores 106 protruding beyond the terminal end faces of the sheathed portions 107 are kept fixed to the terminal end faces of the sheathed portions 107. For example, when the removal work of the sheathed portions 107 is done at the optical fiber end portions on a side opposite to the side on which the movable optical fiber 104 is formed for the purpose of connection or the like, tensile force is applied to the cores 106 on the movable optical fiber 104 side, causing linear core group 109 of the end of the movable optical fiber 104 to be deteriorated in dimensional precision. This is because, as in nylon cores, a cushioning material may be filled between the sheathed portions 107 and the cores 106, in which case the bonding between the sheathed portions 107 and the cores 106 is not firm. For this reason, in the embodiment of FIG. 32, the base ends of the protruding portions of the cores 106 are fixed to the terminal end faces of the sheathed portions 107 with an adhesive 115. The adhesive for this use may be ultraviolet curing adhesives, epoxy adhesives, silicone adhesives, and the like, where ultraviolet curing adhesives are preferable, and ultraviolet curing adhesives having elasticity after curing are preferable in particular. Thus, even if the removal and other work of the sheathed portions 107 is done at the other ends of the optical fibers 108a, 108b, 108c, the dimensional precision of the linear core group 109 can be maintained at high precision. Also, in the deformation area 111 of the movable optical fiber 104, the position where the maximum bending stress is applied to the cores 106 is near the terminal ends of the sheathed portions 107, whereas the stress applied to the cores 106 can be lessened by fixing the base portions of the cores 106 with the adhesive 115 having elasticity, so that the reality of the deformation area 111 with time can be improved.

Figure 34:
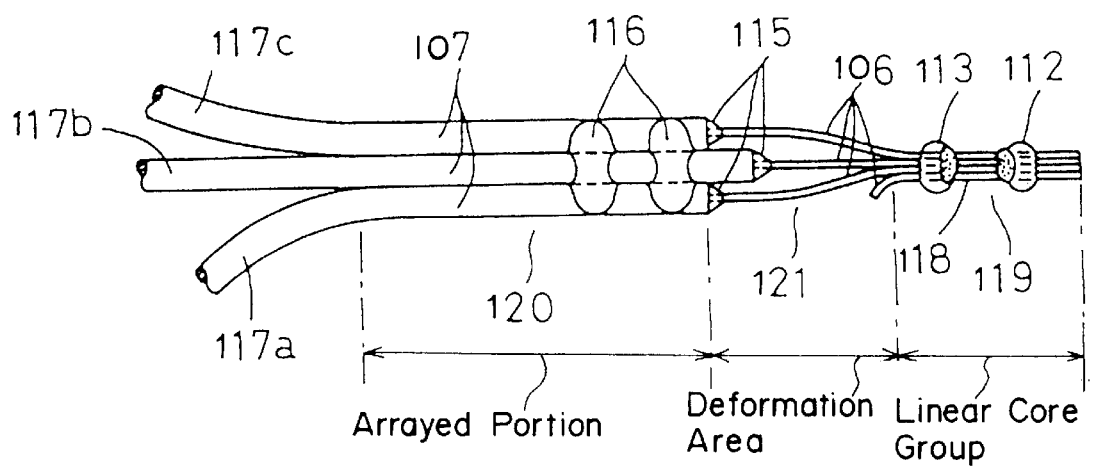
FIG. 34 is a plan view showing the structure of the fixed optical fiber of the optical switch shown in FIG. 31.

The fixed optical fiber 105 has a dummy fiber 118 for setting the lateral displacement of the movable optical fiber 104, as well as optical fibers 117a, 117b, 117c for the transmission of optical signals. The dummy fiber 118 is fixed integrally with the cores 106 of the optical fibers 117a, 117b, 117c for optical signal transmission use. FIG. 34 shows a plan view of a concrete example of the fixed optical fiber 105. This fixed optical fiber 105, which is constructed generally in the same way as the movable optical fiber 104, comprises an arrayed portion 120 having sheathed portions 107, a linear core group 119 comprising cores 106 fixed and integrated with each other, and a deformation area 121 of the cores 106. The fixed optical fiber 105 has one more core 106 (dummy fiber 118) than the movable optical fiber 104, so that the width of the linear core group 109 of the fixed optical fiber 105 is wider than the width of the linear core group 109 of the movable optical fiber 104 by the diameter of one core 106. The dummy fiber 118 is preferably an optical fiber with the sheathed portion removed, i.e., a core, and is particularly preferably an optical fiber manufactured in the same lot as the optical fibers 117a, 117b, 117c constituting the fixed optical fiber 105. Using the optical fiber (dummy fiber 118) to set the displacement amount of the movable optical fiber 104 makes it possible to obtain a high-precision, low-price spacer member and to reduce the member cost to a large extent. Also, assembling the dummy fiber 118 concurrently in the assembling process of the fixed optical fiber 105 without providing an additional process makes it possible to set the displacement amount with high precision without increasing the manufacturing process. The actual assembly of the dummy fiber 118 is carried out, for example, through the steps of preparing an excess optical fiber longer than the actual necessary length used as the dummy fiber 118, incorporating it into the fixed optical fiber 105 like the other optical fibers 117a, 117b, 117c, breaking off its unnecessary portions that are not used as the dummy fiber 118. However, since the fixed optical fiber 105 is not intended to displace the linear core group 119 by deforming the deformation area 121, as is done with the movable optical fiber 104, the fixed optical fiber 105 may be simplified in construction more than the movable optical fiber 104. For example, the fixing portion of the arrayed portion 120 may be provided in only one place. Otherwise, the fixing portion of the linear core group 119 may also be provided in one place, or the length of the deformation area 121 may be shortened. As an alternative construction, the fixed optical fiber 105 may also comprise a number (e.g., 4) of optical fibers 117a, 117b, 117c, only one larger than the number (e.g., 3) of optical fibers of the movable optical fiber 104, whereas the fixed optical fiber 105 can be simplified in construction by using the dummy fiber 118 as shown above.

Figure 35:
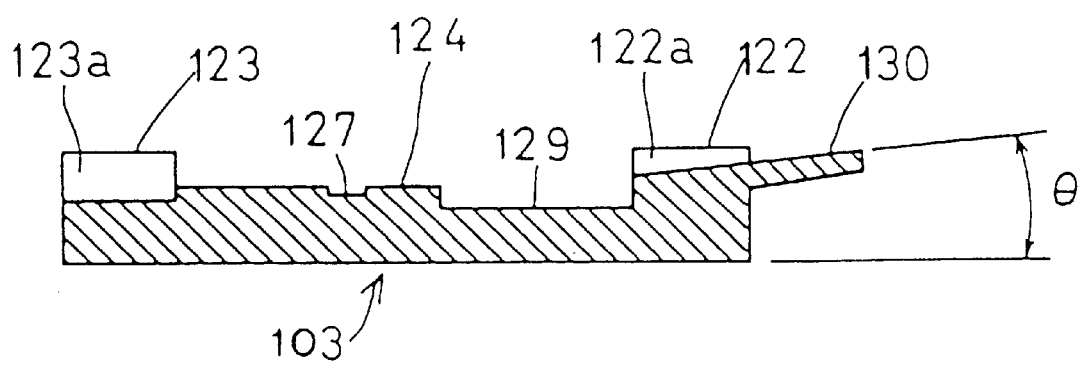
FIG. 35 is a sectional view of the base block of the optical switch shown in FIG. 31.

Next, reverting to FIG. 31, the construction of the base block 103 is explained. A sectional view of the base block 103 along the longitudinal direction is shown in FIG. 35. The base block 103 comprises a movable-optical-fiber fixing portion 122, a fixed-optical-fiber fixing portion 123, and a guide portion 124 for guiding, and opposing to each other, the linear core group 109 of the movable optical fiber 104 and the linear core group 119 of the fixed optical fiber 105. The material of the base block 103, although not particularly limited, is preferably glass material, ceramic material, metal material, or plastic material. Among others, ceramic material is preferable by virtue of the fact that it has a coefficient of thermal expansion close to that of glass optical fibers and that, when used as a sliding guide for the movable optical fiber 104 composed of glass optical fiber, it becomes less wear compared with sliding contact between the same glass members. The metal material is preferably an iron-related material by virtue of its coefficient of thermal expansion close to that of glass as well as good processibility. The plastic material is preferably an epoxy material by virtue of its coefficient of thermal expansion close to that of glass and superior environmental resistance, and in particular, preferably a powder compressed molded material of epoxy resin by virtue of its capability of easily obtaining dimensional precision after molding. Also, needless to say, the base block 103 may be made of the quartz glass material composing the cores 106 of the optical fibers. In this case, preferably the surface of the base block 103 made of glass is coated with a film of a hard material, different in composition from the glass, for example, magnesium fluoride, by deposition or other means, in terms of enhancement in wear resistance.

Figure 36:
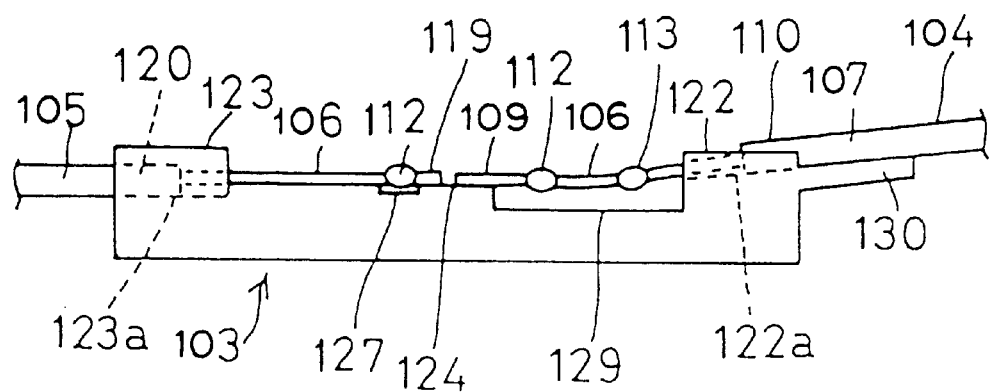
FIG. 36 is a side view showing a state in which the movable optical fiber and the fixed optical fiber are fitted to the base block of FIG. 35.

A groove 123a equal in width to the arrayed portion 120 of the fixed optical fiber 105 is defined at the fixed-optical-fiber fixing portion 123 defined on one end top surface of the base block 103. The bottom surface of the groove 123a is formed parallel to the lower surface of the base block 103. The arrayed portion 120 of the fixed optical fiber 105 is fitted to the groove 123a as shown in FIG. 36, and is fixed with an adhesive 125, while the linear core group 119 is fixed with an adhesive 126 with its end in close contact with the surface of the guide portion 124. In addition, denoted by a numeral 127 is a recess for letting some swell of the fixing portion 112 of the fixed optical fiber 105. The method of fixing the fixed optical fiber 105, although not limited to adhesion, is preferably an adhesion method, particularly a process comprising a temporarily fixing step with an ultraviolet curing adhesive and subsequently a finally fixing step with an epoxy adhesive, in which case advantages of workability and stability with time are offered. The fixing is done at at least two places, one fixing position being, for example, near the end of the linear core group 119 as described above (particularly, a position sided to the sheathed portion 107 from the end of the linear core group 119 without the guide portion 124 stretched over). This is intended to prevent the possibility that the adhesive 126 may invade between the cores 106 of linear core group 119 and the surface of the guide portion 124, causing a gap between the cores 106 and the guide portion 124, so that the positioning precision of the end of the linear core group 119 may be deteriorated. As a result, an advantage that the end of the fixed optical fiber 105 can be positioned with precision is offered. The other fixing position is, for example, near the sheathed portion 107 of the fixed optical fiber 105 as described above. This is intended to prevent the possibility that, when some external force acts on the other ends of the optical fibers 117a, 117b, 117c constituting the fixed optical fiber 105, the load may act on the end of the fixed optical fiber 105 so that the positioning precision of the end of the linear core group 119 may be deteriorated. In this case, there is an advantage that the positioning precision of the end of the fixed optical fiber 105 will not be deteriorated by leading and setting the outside optical fibers 117a, 117b, 117c.

At the movable-optical-fiber fixing portion 122 defined on the other end top surface of the base block 103, is defined a groove 122a equal in width to the arrayed portion 110 of the movable optical fiber 104, the bottom surface of the groove 122a being slanted at an angle θ with respect to the lower surface of the base block 103. The arrayed portion 110 of the movable optical fiber 104 is fitted to the groove 122a and is fixed with an adhesive 128, while the linear core group 109 is placed with the end in close contact with the surface of the guide portion 124, where the end face of the linear core group 109 is opposed to the end face of the linear core group 119 of the fixed optical fiber 105. In addition, denoted by a numeral 129 is a recess for letting out some swells of the fixing portions 112, 113 of the movable optical fiber 104. As a result, the movable optical fiber 104 is supported at two points of the movable-optical-fiber fixing portion 122 and the guide portion 124, so that the end portion of the linear core group 109 is held slidable by the guide portion 124. Thus, when the arrayed portion 110 of the movable optical fiber 104 is fixed by adhesion or other means to the movable-optical-fiber fixing portion 122 that is slanted at an angle θ, there occurs a flexure to the movable optical fiber 104 so that such an urging force is generated as will press the end of the linear core group 109 against the guide portion 124 by elastic restoring force of the cores 106. By making use of the restoring force of the curved cores 106 for the urging against the guide portion 124 of the linear core group 109, the linear core group 109 can be brought into close contact with surface of the guide portion 124 without additionally providing any special urging member. As a result, the construction of the optical switch 101 can be simplified, and moreover the linear core group 109 and the guide portion 124 can be maintained in the close contact state even against any vibration impact that acts from external, so that stable operation can be attained. It is noted that the angle θ of the bottom surface of the groove 122a and the height of the movable-optical-fiber fixing portion 122 are so designed that the end portions of the cores 106 curved at the deformation area 111 will be generally parallel to and in close contact with the guide portion 124. As a result, the end of the linear core group 109 of the movable optical fiber 104 can be opposed to the end of the linear core group 119 of the fixed optical fiber 105 without any angular error in the heightwise direction. The fixing method for the movable optical fiber 104 is preferably an adhesion method, and in particular, a method comprising in combination a temporary fixing step with an ultraviolet curing adhesive and a final fixing step with an epoxy adhesive. The movable-optical-fiber fixing portion 122 has a projecting portion 130 projecting toward the opposite direction to the guide portion 124, i.e., outward. Thus, part of the sheathed portion 107 of the movable optical fiber 104 is supported by the projecting portion 130 while the sheathed portion 107 is fixed to the projecting portion 130 with an adhesive 131. This is intended to prevent the possibility that with some load acting on the end of the linear core group 109, the positioning precision of the end may be deteriorated. As a result, the positioning precision of the end of the linear core group 109 can be prevented from being deteriorated by leading and setting the outside movable optical fiber 104.

In addition, various modifications may be made with respect to relationship between the movable and fixed optical fibers 104, 105 and the base block 103 as shown in FIGS. 32 and 34. In the above embodiment, the sheathed portions 107 have been fixed to one another so that the arrayed portions 110, 120 are integrated, prior to the stage of the mounting to the base block 103. However, it is also possible that, without fixing the sheathed portions 107 to one another prior to the mounting to the base block 103, the sheathed portions 107 are fitted to the grooves 122a and 123a of the movable-optical-fiber fixing portion 122 and the fixed-optical-fiber fixing portion 123, respectively, of the base block 103 so that the arrayed sheathed portions 107 are brought into close contact with one another, and further the sheathed portions 107 are fixed to one another as well as to the base block 103 with an adhesive. Otherwise, it is also possible that the movable-optical-fiber and fixed-optical-fiber fixing portions 122, 123 and the base block 103 are provided independently of each other, and the fixed-optical-fiber fixing portion 123 is previously bonded to the arrayed portion 120 of the fixed optical fiber 105 while the movable-optical-fiber fixing portion 122 is previously bonded to the arrayed portion 110 of the movable optical fiber 104, in which arrangement the fixed optical fiber 105 is mounted to the base block 103 by bonding the fixed-optical-fiber fixing portion 123 to the top surface of the base block 103, while the movable optical fiber 104 is fixed to the base block 103 by bonding the movable-optical-fiber fixing portion 122 to the base block 103.

The end of the linear core group 119 of the fixed optical fiber 105 and the end of the linear core group 109 of the movable optical fiber 104 are opposed to each other on the top surface of the guide portion 124, where stopper members 132 are arranged on both sides of the linear core group 119 of the fixed optical fiber 105. The linear core group 109 of the movable optical fiber 104 is displaceable laterally on the top surface of the guide portion 124. When the linear core group 109 is displaced laterally, a portion of the end of the linear core group 109 where the fixing portion 112 is absent comes into direct contact with the stopper members 132, by which the displacement limit of the linear core group 109 is restricted. In this case, since there are no intermediates between the movable optical fiber 104 and the stopper members 132, the displacement limit position of the linear core group 109 of the movable optical fiber 104 is restricted only by the mounting position of the stopper members 132, allowing a correct positioning to be accomplished.

The stopper members 132 are adjustable in position in the widthwise direction of the base block 103. The stopper members 132 can be moved in the widthwise direction of the base block 103 by loosening screws 133 that secures the stopper members 132, and thereafter re-fixed by tightening the screws 133. For the positioning of the stopper members 132, are used side faces of a portion near the end of the linear core group 119 of the fixed optical fiber 105 where the fixing portion 112 is absent. That is, after the fixed optical fiber 105 is mounted to the base block 103 and its linear core group 119 is set onto the guide portion 124, the stopper members 132 are moved so as to be pushed against both side faces of the linear core group 119, by which the spacing between the stopper members 132 can be correctly and easily made coincident with the width of the linear core group 119 of the fixed optical fiber 105. Thus, the linear core group 109 of the movable optical fiber 104 is shiftable to an extent corresponding to one (diameter) of the cores 106 of the optical fibers. The linear core group 109 of the movable optical fiber 104 that is positioned by the side faces of the linear core group 109 being put into contact with the stopper members 132 is resultantly opposed precisely to the linear core group 119 of the fixed optical fiber 105 kept in contact with the stopper members 132. Thus, the linear core groups 119, 109 of the fixed and movable optical fibers 105, 104 can be positioned relatively to each other with high precision.

The stopper members 132 have at least one curved, preferably arc-shaped corner 132a at a portion where they make contact with the cores 106. This is intended to prevent such a possibility that when the cores 106 of the fixed and movable optical fibers 105, 104 make contact with the stopper members 132, a stress concentration may be generated to the cores 106 by the edges of the stopper members 132. As a result, the cores 106 of the two optical fibers 105, 104 can be prevented from damage, so that the durability for repeated use can be enhanced.

The stopper members 132 are preferably made from a material lower in hardness than the glass material composing the cores 106, and more preferably a material having elasticity, further preferably a vibration-damping material. By so doing, the cores 106 that make contact with the stopper members 132 can be prevented from damage, and moreover the damping phenomenon that the linear core group 109 bounds until it comes to a standstill at a specified position at the time of changing the position of the linear core group 109 can be improved, enabling a high speed switching operation. The material of the stopper members 132 is exemplified by metal materials of low hardness such as aluminum, rubber materials, and the like, and laminates in which metal material and rubber material are stacked alternately may be used with views to maintaining the positional precision and improving the damping characteristic. Also when the stopper members 132 made from metal material are fixed with an adhesive having elasticity, similar effects can be obtained.

Figure 37A:
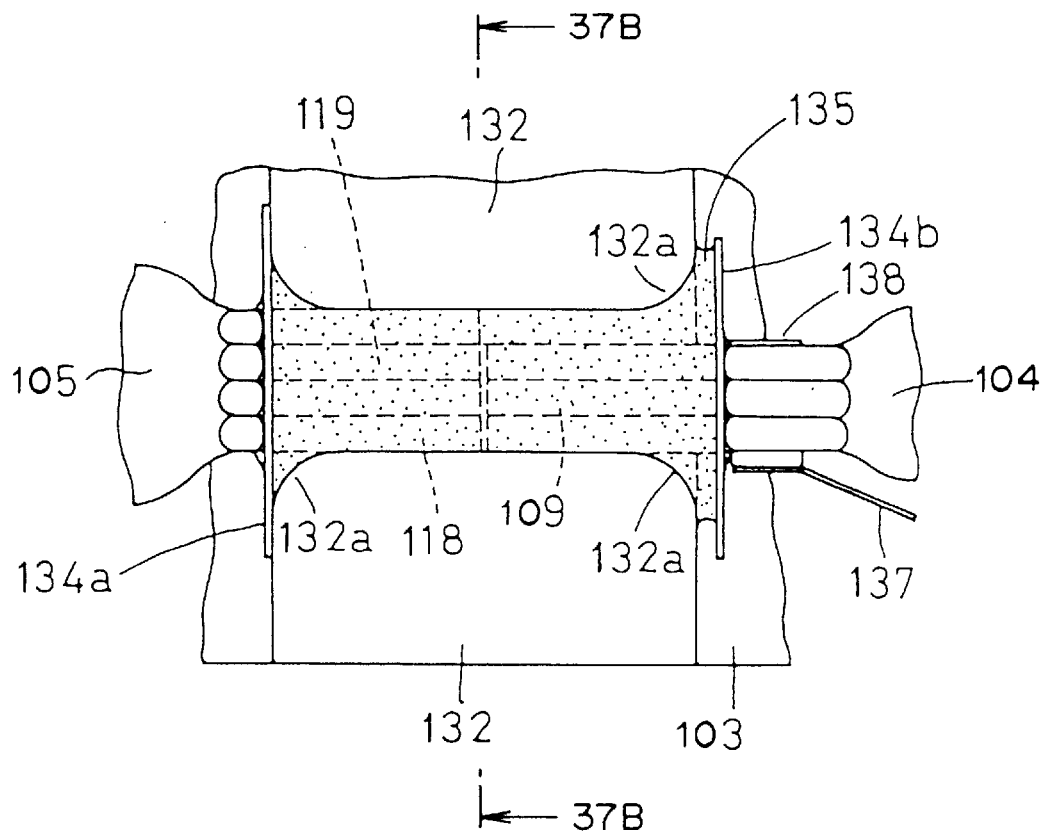
FIG. 37A is a plan view showing a state in which linear core groups of optical fibers are opposed to each other.
Figure 37B:
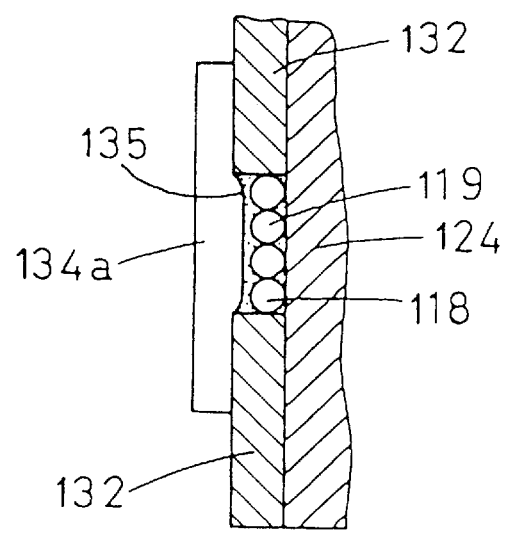
FIG. 37B is a sectional view taken along the line 37B—37B of FIG. 37A.

FIG. 37A is an enlarged view showing the details of near ends of the fixed and movable optical fibers 105, 104 located between the stopper members 132. The end face of the linear core group 119 of the fixed optical fiber 105 and the end face of the linear core group 109 of the movable optical fiber 104 are opposed to each other with a gap of around 10 to 30 $\mu$m therebetween. The linear core group 119 of the fixed optical fiber 105 has a leak stopper 134a provided at some distance from the end, the leak stopper 134a being generally in contact with one side face of the stopper members 132. The linear core group 109 of the movable optical fiber 104 also has a leak stopper 134b provided at some distance from the end, the leak stopper 134b being a little distanced from the other side face of the stopper members 132. Between this pair of leak stoppers 134a, 134b, a refractive index matching member 135 is held so as to be filled in the gap portion between the two linear core groups 109, 119. The refractive index matching member 135 has a refractive index generally equal to that of the cores of the optical fibers 108a, 108b, 108c and 117a, 117b, 117c, and is exemplified by silicone oil. These leak stoppers 134a, 134b prevent the refractive index matching member 135 from leaking from between the stopper members 132 by make use of capillarity. As a result, as shown in FIGS. 37A, 37B, the refractive index matching member 135 is held between the guide portion 124, the stopper members 132, and the leak stoppers 134a, 134b by surface tension, so that the refractive index matching member 135 can be filled between the end portions of the linear core groups 109, 119 without additionally providing a seal mechanism for sealing the refractive index matching member 135. Still, as shown in FIG. 37B, since the side opposite to the guide portion 124 is open with no members present, the linear core group 109 of the movable optical fiber 104 will not be pinched by the guide portion 124 and its opposing member, so that the displacement of the linear core group 109 on the movable side will not be prevented. Further, since the refractive index matching member 135 generally equal in refractive index to the cores is filled between the fixed and movable optical fibers 105, 104, a beam of light that has outgone from one group of optical fibers 117a, 117b, 117c, when incident on the optical fibers 108a, 108b, 108c, result in less reflected components, so that the optical transmission efficiency can be improved.

An actuator 136 is disposed below the guide portion 124 as shown in FIG. 31. The actuator 136 may be a miniature actuator such as an electromagnetic actuator or a piezoelectric actuator, where the electromagnetic actuator is preferable in particular. The stroke of the actuator 136 is set larger than the displacement amount of the linear core group 109 of the movable optical fiber 104 (i.e., a displacement amount equal to the diameter of the cores 106) so that the linear core group 109 of the movable optical fiber 104 is securely brought into contact with the stopper members 132 located on both sides. Also, the linear core group 109 being not driven directly by the actuator 136, the linear core group 109 of the movable optical fiber 104 is driven via a cushioning mechanism so that any excessive load will not be applied to the cores 106 of the movable optical fiber 104 that are in contact with the stopper members 132. In the embodiment of FIG. 31, a spring member 137 in the form of a curved plate spring is used as the cushioning mechanism, where the base end of the spring member 137 is secured to the actuator 136. Also, a holder portion 138 formed into a U shape or square shape is provided at the end of the spring member 137 that transfers the displacement of the actuator 136 to the linear core group 109 of the movable optical fiber 104, where the linear core group 109 is accommodated in the recess of the U-shaped holder portion 138 or in the space surrounded by the square-shaped holder portion 138. The holder portion 138 to which the linear core group 109 is accommodated is sized a little larger than the width of the linear core group 109, with a clearance formed between the linear core group 109 and the holder portion 138. Therefore, when the linear core group 109 of the movable optical fiber 104 is driven, only lateral displacements are transferable without giving any load to the movable optical fiber 104 even if the spring member 137 has shifted to a slight amount in the axial direction of the linear core group 109. Thus, with the actuator 136 driven, the holder portion 138 is shifted via the spring member 137, so that the linear core group 109 is displaced laterally by the holder portion 138. Consequently, the spring member 137 has both functions as a driving force transfer mechanism and a cushioning mechanism.

In addition, the spring member 137 may be made from metals, plastics, or the like, where metals are preferable in terms of durability. As the cushioning mechanism, it may be made from bulk rubber material, or be a composite member of the spring member 137 and rubber, in which case also similar effects can be obtained of course. Also, in the case of the electromagnetic actuator 136, it is needless to say that the driving direction may be switched either by switching the direction of current given from a terminal 139 or by turning current on and off.

Assuming that one optical fiber out of the fixed optical fiber 105 (e.g., assumed 117c) and one optical fiber out of the movable optical fiber 104 (e.g., assumed 108a) are connected to each other via a feedback optical transmission path 140, and that the fixed optical fiber 105 is on the input side and the movable optical fiber 104 is on the output side, then an optical signal incident from the fixed optical fiber 105 on the movable-side optical fiber 108a turns back to the fixed-side optical fiber 117c via the feedback optical transmission path 140, and emitted from the fixed-side optical fiber 117c toward the movable optical fiber 104. This feedback optical transmission path 140, although implemented by a loopback fiber (common optical fiber) in FIG. 37A, may be provided with an optical attenuator or the like.

Figure 38A:
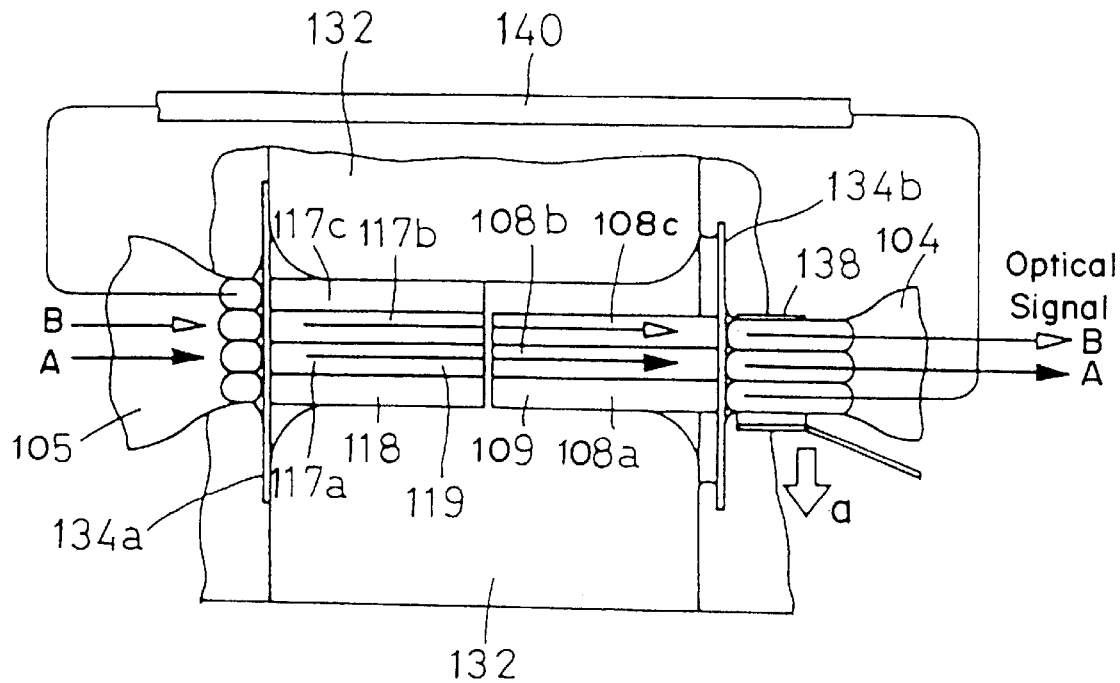
FIGS. 38A and 38B are operation explanatory views of the optical switch shown in FIG. 31.
Figure 38B:
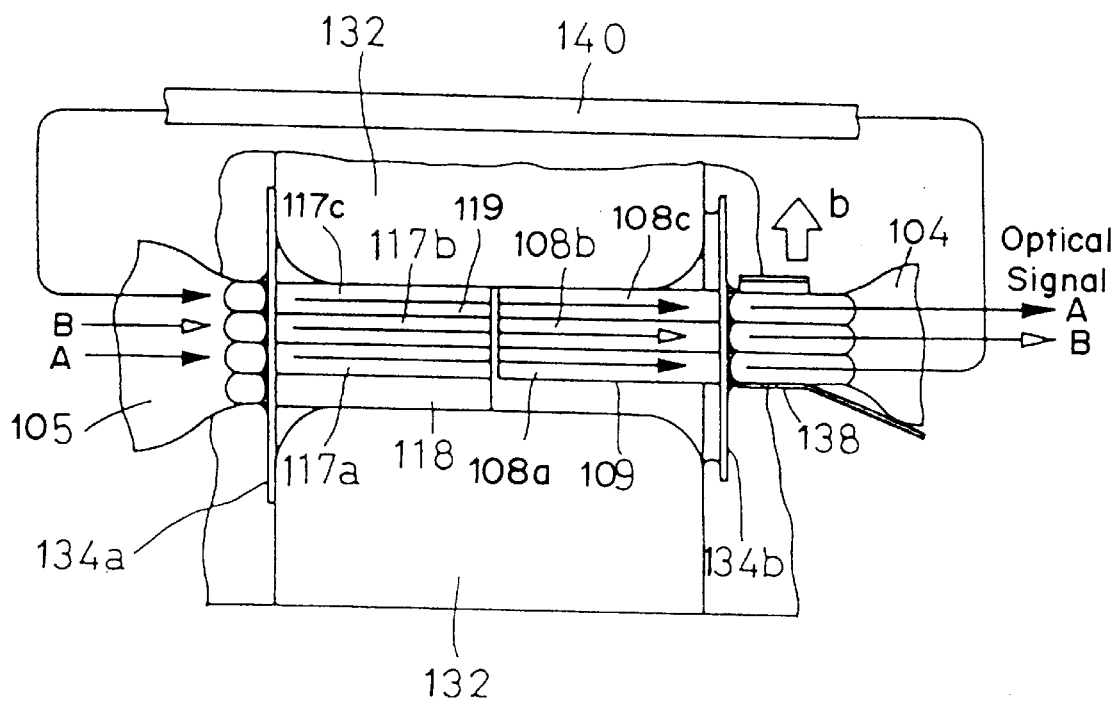

Next, referring to FIGS. 38A and 38B, the switching operation of the optical switch 101 of the present invention is explained.

It is assumed that an optical signal A has been inputted to the optical fiber 117a of the fixed optical fiber 105, and that an optical signal B has been inputted to the optical fiber 117b. Now assume that the linear core group 109 of the movable optical fiber 104 is being driven in the direction of arrow "a" of FIG. 38A by the actuator 136. In this case, the optical signal A outgoing from the optical fiber 117a and the optical signal B outgoing from the optical fiber 117b passes through the gap portion, being incident on the opposing optical fibers 108b, 108c of the movable optical fiber 104, respectively, where the optical signal A is outputted from the optical fiber 108b and the optical signal B is outputted from the optical fiber 108c.

Also, assume that the linear core group 109 of the movable optical fiber 104 is driven in the direction of arrow "b" of FIG. 38B by the actuator 136. In this case, the optical signal B outgoing from the optical fiber 117b becomes incident on the opposite optical fiber 108b of the movable optical fiber 104, and outputted, as it is, from the optical fiber 108b. By contrast, the optical signal A outgoing from the optical fiber 117a passes through the gap portion, being incident on the optical fiber 108a of the movable optical fiber 104, and returns to the optical fiber 117c of the fixed optical fiber 105 via the feedback optical transmission path 140. Meanwhile, the optical signal B outgoing from the optical fiber 117c passes through the gap portion again, being incident on the optical fiber 108c of the movable optical fiber 104, and is outputted from the optical fiber 108c.

Therefore, by switching the direction in which the linear core group 109 of the movable optical fiber 104 is driven by the actuator 136, the optical signals A, B that have entered the optical fibers 117a, 117b on the input side can be switched over as to whether they are led to the optical fibers 108b and 108c, respectively, on the output side, or to the optical fiber 108c and 108b, respectively, on the output side.

Various embodiments of the movable optical fiber 104 to be used for the optical switch 101 of the present invention are described below. Although the following description will be made only on the movable optical fiber 104, and not on the fixed optical fiber 105, the fixed optical fiber 105 can be substituted for the counterpart by adding a dummy fiber 118 to the linear core group 109 in all the following description.

Figure 39:
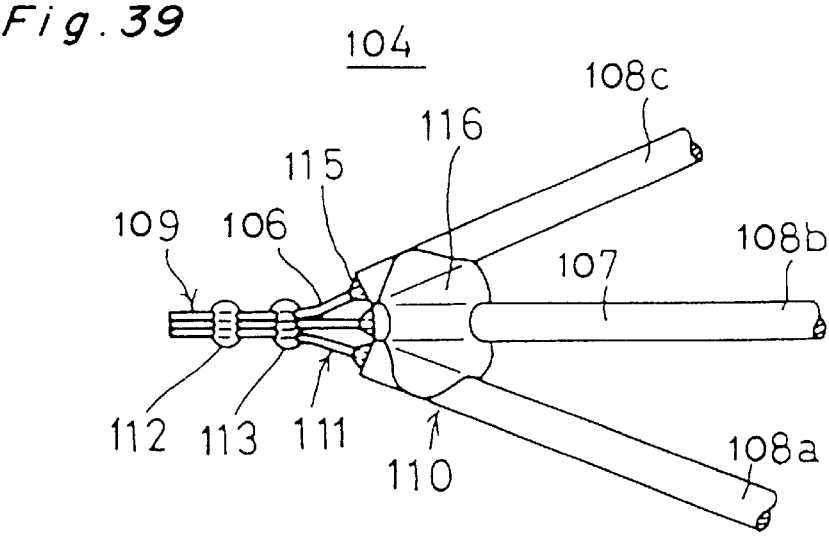
FIG. 39 is a plan view showing another embodiment of the movable optical fiber.

FIG. 39 is a schematic arrangement view showing another embodiment of the movable optical fiber 104. This movable optical fiber 104 is characterized in that the terminal end portions of the sheathed portions 107 of the optical fibers 108a, 108b, 108c are not aligned parallel to one another. Preferably, in particular, the optical fibers are fixed at a sheath fixing portion 116 with an adhesive or the like in a state that the end portions of the sheathed portions 107 are arranged radially. By so doing, the displacement amount of the cores 106 at the deformation area 111 of the movable optical fiber 104 can be suppressed small, so that the deformation area 111 can be shortened. Thus, the movable optical fiber 104 can be miniaturized.

Figure 40:
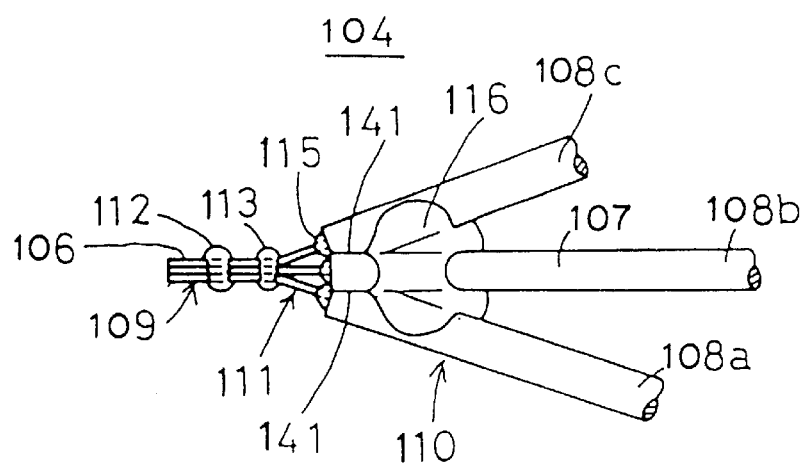
FIG. 40 is a plan view showing yet another embodiment of the movable optical fiber.
Figure 41:
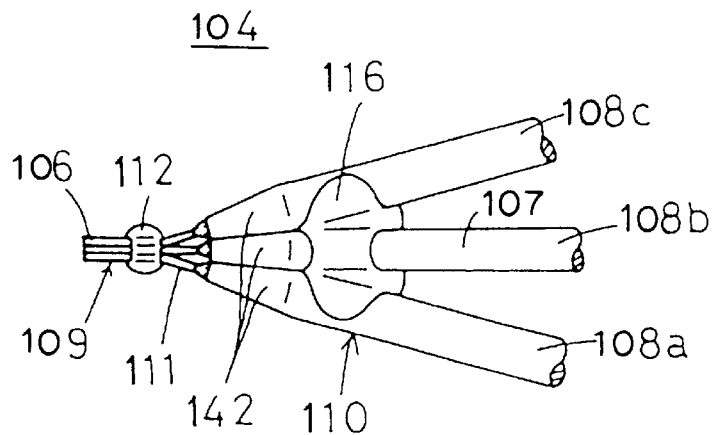
FIG. 41 is a plan view showing yet another embodiment of the movable optical fiber.

FIG. 40 is a schematic arrangement view showing yet another embodiment of the movable optical fiber 104. In this movable optical fiber 104, at least one of the plurality of optical fibers 108a, 108b, 108c is so formed that a one-side surface of an end portion 141 of the sheathed portion 107 is slanted. FIG. 41 is a schematic arrangement view showing yet another embodiment of the movable optical fiber 104, where at least one of the plurality of optical fibers 108a, 108b, 108c is so formed that an end portion 142 of the sheathed portion 107 is tapered or conical shaped. According to these movable optical fibers 104, the optical fibers 108a, 108b, 108c can be fixed with close spacing between the sheathed portions 107 of adjacent optical fibers 108a, 108b, 108c, so that the displacement amount of the cores 106 of the optical fibers 108a, 108b, 108c at the deformation area 111 of the movable optical fiber 104 can be suppressed small. Thus, the movable optical fiber 104 can be further miniaturized.

Figure 42A:
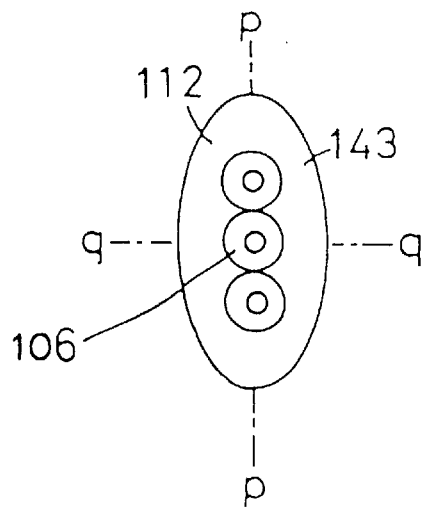
FIGS. 42A and 42B are an enlarged view of the movable optical fiber of another embodiment, as viewed from an end, and an enlarged plan view of an end portion, respectively.
Figure 42B:
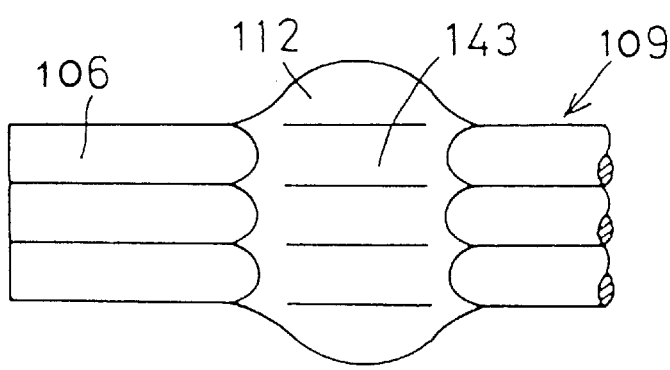

FIGS. 42A and 42B are schematic arrangement views showing still another embodiment of the movable optical fiber 104. This movable optical fiber 104 is characterized in that an adhesive 143 applied as the fixing portions 112, 113 of the linear core group 109 is formed into a shape generally symmetrical with respect to a center plane p—p in the direction in which the cores 106 are arrayed. Generally, the resin used as the adhesive 143 has a coefficient of linear expansion far greater than that of glass (cores 106). For this reason, if the fixing portions 112, 113 of the linear core group 109 have a difference in the vertical thickness of the adhesive 143, the dimensional precision of the optical fibers 108a, 108b, 108c in the direction in which they are arrayed would be deteriorated. By contrast, in the present embodiment in which the adhesive 143 is formed generally symmetrical with respect to the center plane p—p in the direction in which the cores 106 are arrayed, a movable optical fiber 104 stable in dimensional precision even against heating and cooling can be obtained.

Figure 43A:
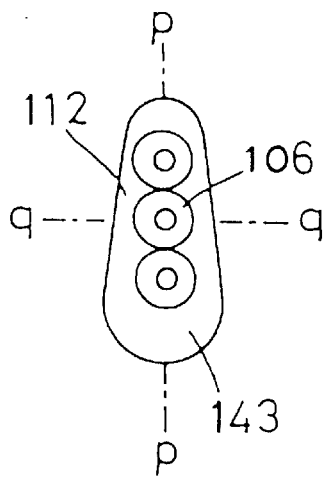
FIGS. 43A and 43B are an enlarged view of the movable optical fiber of yet another embodiment, as viewed from an end, and an enlarged plan view of an end portion, respectively.
Figure 43B:
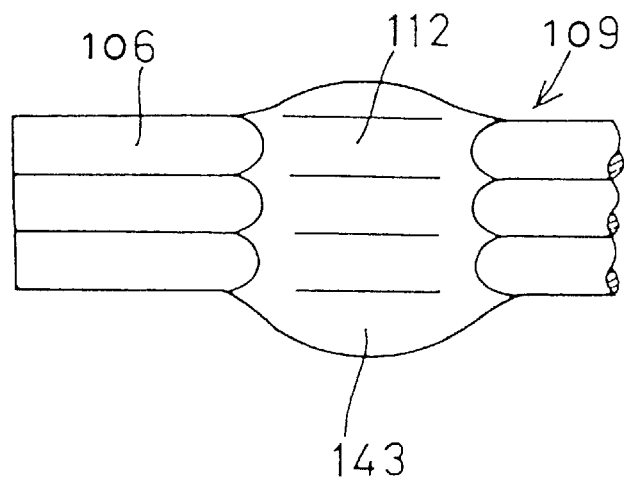

Also in the movable optical fiber 104 as shown in FIGS. 43A and 43B, the adhesive 143 forming the fixing portions 112, 113 of the linear core group 109 is formed generally symmetrical with respect to the center plane p—p in the direction in which the cores 106 are arrayed, so that a movable optical fiber 104 stable in dimensional precision even against heating and cooling can be obtained. However, in the embodiment of FIGS. 42A and 42B, the adhesive portion has been symmetrical also with respect to another center plane q—q, perpendicular to the foregoing center plane, whereas in the embodiment of FIGS. 43A and 43B, they are asymmetrical with respect to the center plane q—q. In the embodiment of FIGS. 43A and 43B, in the process of forming the movable optical fiber 104, by applying the adhesive 143 from above of the cores 106 with the cores 106 of the optical fibers 108a, 108b, 108c arrayed vertically, the fixing portions 112, 113 generally symmetrical with respect to the center plane p—p in the direction in which the cores 106 are arrayed can be formed. As a result, a sag occurs due to the weight of the adhesive 143 so that the fixing portions 112, 113 become thicker at their lower part as shown in FIGS. 43A, 43B. Thus, fixing portion 112, 113 generally symmetrical with respect to the center plane p—p in the direction in which the cores 106 are arrayed can be formed by a simple method. Such a method indeed would result in an asymmetrical shape with respect to the plane q—q perpendicular to the direction in which the cores 106 are arrayed, but a movable optical fiber 104 stable in dimensional precision against temperature variations can be obtained because stresses generated at the fixing portions 112, 113 due to temperature variations will not act in such a direction as to disturb the dimensional precision in the direction in which the cores 106 are arrayed.

FIGS. 44A and 44B are schematic arrangement views showing yet another embodiment of the movable optical fiber 104. This movable optical fiber 104 is made by using a tape-like optical fiber 144 in which sheathed portions 107 are integrally molded with a plurality of parallel cores 106.

In this movable optical fiber 104, the optical fibers are enhanced in strength, compared with single-core optical fibers, so that the movable optical fiber 104 becomes easy to handle. Also, there is provided an advantage that the removal of the sheathed portions 107, the cleaning of the surfaces of the cores 106 after removal of the sheathed portions 107, the cutting of end faces of the cores 106, and other processes can be carried out collectively at a time. That is, in the process of cutting the end faces, they may be cut and aligned after the cores 106 are bundled and their end portions are formed into an array, where the method of cutting and aligning the cores 106 may be, for example, cutting them all at a time with a dicing saw, or giving the surface of the optical fiber 144 with a small flaw and cleaving them to form the end faces. The method of cutting with a dicing saw allows the fiber end faces to be processed simultaneously by one process, offering an advantage that the process time can be reduced. The method of forming the end faces by cleavage has an advantage that no large-scale tools are required. The latter method by cleavage is preferable in that the end faces of the cores 106 of the optical fiber 144 can be reduced in surface roughness. Also, the embodiment of FIGS. 44A and 44B has an effect that the working time can be reduced because the process of integrally fixing the sheathed portions 107 by a fixing method such as adhesion is no longer necessary.

FIG. 45 is a schematic arrangement view showing yet another embodiment of the movable optical fiber 104. This movable optical fiber 104 has a corrector 145 for holding the shape of the cores 106 to a desired shape in the deformation area 111 and thereby relieving loads applied to the fixing portions 112, 113 due to the cores 106 present in the deformation area 111. The corrector 145, as shown in FIGS. 46A and 46B, has groove lines 146a, 146b to let the cores 106 through. At the edges of the groove line 146a, are defined an edge face 147 having a function for narrowing the spacing between the cores 106 and an edge surface 148 having a function for widening the narrowed spacing between the cores 106. The function of narrowing the spacing between the cores 106 is intended to reduce the loads applied to the fixing portions 112, 113 by the corrector 145 receiving a load that causes the cores 106 present in the deformation area 111 to expand widthwise. Thus, even in use of the movable optical fiber 104 under severe environments, there can be produced an effect that the dimensional precision of the end of the linear core group 109 can be maintained. The function of widening the narrowed spacing of the cores 106 is intended to widen the narrowed spacing of the cores 106 to an appropriate one for alignment. This produces an effect that the ends of the linear core group 109 become easy to align in the assembly process of the movable optical fiber 104.

Figure 47:
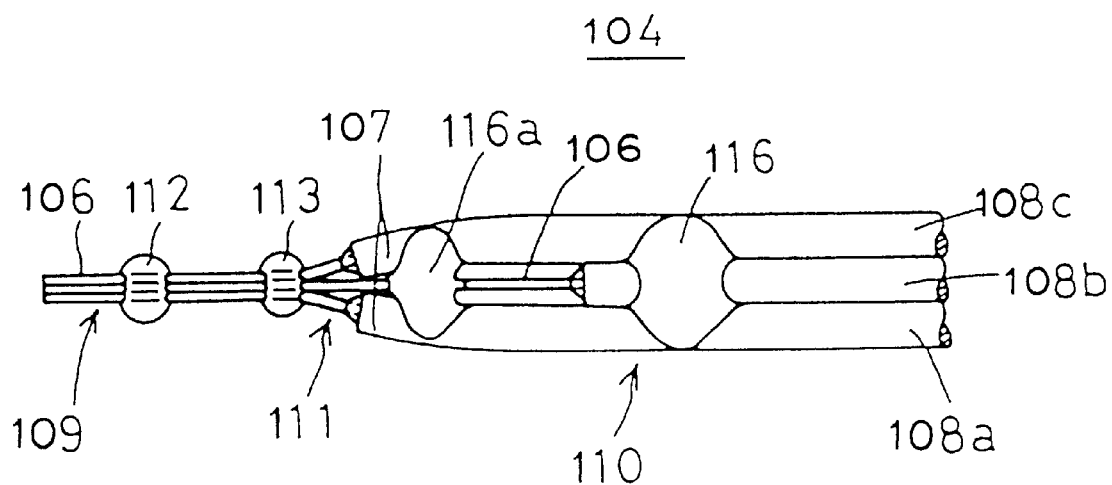
FIG. 47 is a plan view showing yet another embodiment of the movable optical fiber.

FIG. 47 is a schematic arrangement view showing yet another embodiment of the movable optical fiber 104. This movable optical fiber 104 is characterized in that the sheathed portions 107 of all the optical fibers 108a, 108b, 108c are not removed in the deformation area 111. By leaving the sheathed portions 107 in the deformation area 111 where internal stresses are likely to occur, the cores 106 can be prevented from rupturing due to minute flaws in the deformation area 111 where stress concentration likely to occur. However, in the central optical fiber 108b, the sheathed portion 107 is removed at the deformation area 111 so that the cores 106 of the optical fibers 108a, 108c having the sheathed portions 107 at the deformation area 111 can be smoothly deformed from the deformation area 111 to the linear core group 109. Also, at the deformation area 111, the optical fibers 108a, 10b, 108c are fixed integrally with an adhesive 116a.

Figure 48:
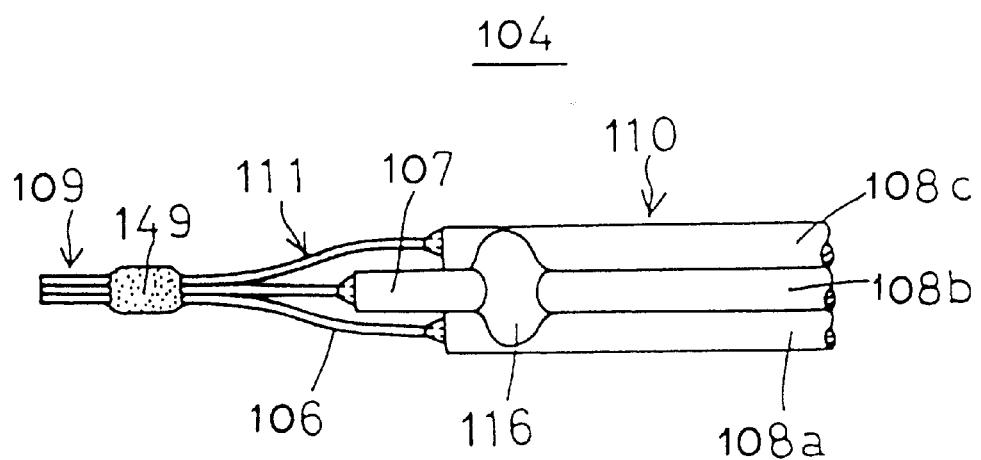
FIG. 48 is a plan view showing yet another embodiment of the movable optical fiber.

FIG. 48 is a schematic arrangement view showing yet another embodiment of the movable optical fiber 104. In this movable optical fiber 104, a magnetic material (ferromagnet), preferably powder of a magnetic material, is mixed in an adhesive 149 for integrally fixing the linear core group 109. Thus, the movable optical fiber 104 can be formed into part of a magnetic actuator, so that the movable optical fiber 104 can be driven in a direct, non-contact manner.

Figure 49A:
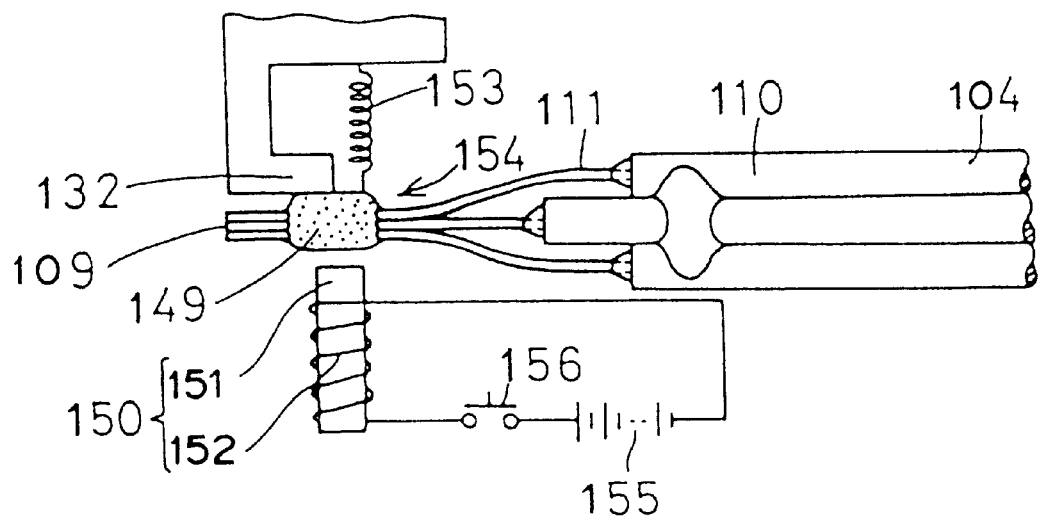
FIGS. 49A and 49B are plan views showing another drive mechanism for driving the linear core group of the movable optical fiber as well as its operation.
Figure 49B:
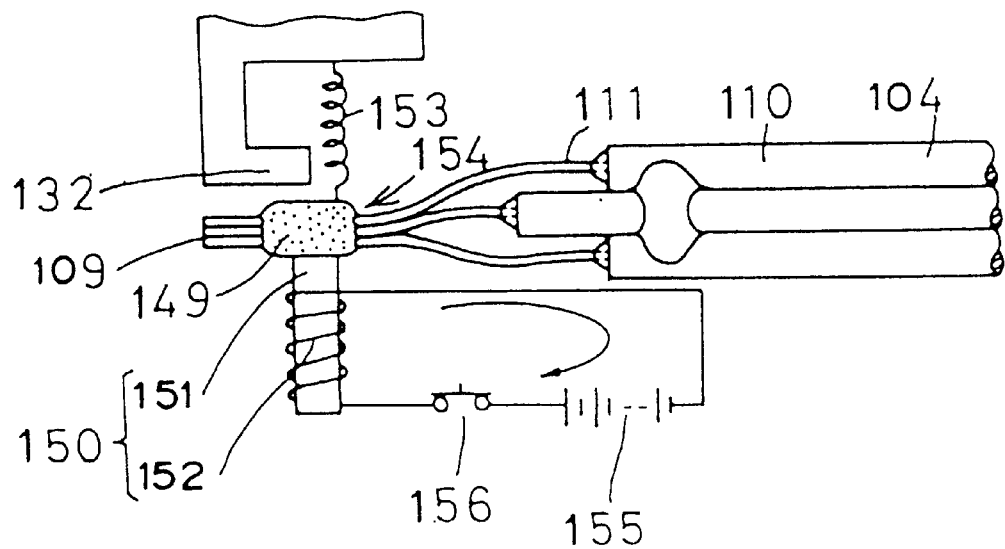

FIGS. 49A and 49B are views showing another drive mechanism, as well as its operation, of the movable optical fiber 104 to be used in the optical switch 101 of the present invention. The movable optical fiber 104 used here is the same as the movable optical fiber 104 described in FIG. 48, and is used as part of a magnetic actuator. The adhesive 149 with a magnetic material mixed is applied to the linear core group 109 at the end of the movable optical fiber 104, and the linear core group 109 is placed between the stopper member 132 and an electromagnet 150. In particular, an end face of an iron core 151 of the electromagnet 150, which is composed of the iron core 151 and a coil 152, is opposed to the adhesive 149. Further, to the linear core group 109, is connected a pressurized spring 153 for separating the linear core group 109 from the electromagnet 150 and urging it against the stopper member 132 promptly the moment that the electromagnet 150 is turned off. Thus, the adhesive 149 with a magnetic material mixed, the electromagnet 150, and the pressurized spring 153 constitute a magnetic actuator 154. Then, when a switch 156 between power supply 155 and the electromagnet 150 is turned on so that the coil 152 of the electromagnet 150 is energized to generate magnetic flux, the adhesive 149 part is attracted by the electromagnet 150, causing the linear core group 109 to be displaced, by which the movable optical fiber 104 is driven as part of the magnetic actuator 154, as shown in FIG. 49B. When the switch 156 is turned off so that the magnetic flux is dissipated, the linear core group 109 is pulled back to the original position by the pressurized spring 153 as shown in FIG. 49A.

In addition, in FIGS. 49A and 49B, the stopper member 132 makes contact with the adhesive 149 part so as to position the linear core group 109. However, the stopper member 132 may also make contact with a place of the linear core group 109 where the adhesive 149 is not applied, so as to attain the positioning. Further, although the positioning of the linear core group 109 on the side opposite to the stopper member 132 is achieved by the iron core 151 of the electromagnet 150, it is also possible to provide a stopper member, other than the electromagnet 150, so that the linear core group 109 is positioned on the electromagnet 150 side by the stopper member. Furthermore, the magnetic material, although mixed in the adhesive in the above embodiment, may be applied to the linear core group 109 by deposition or other methods, independently of the adhesive.

Figure 50:
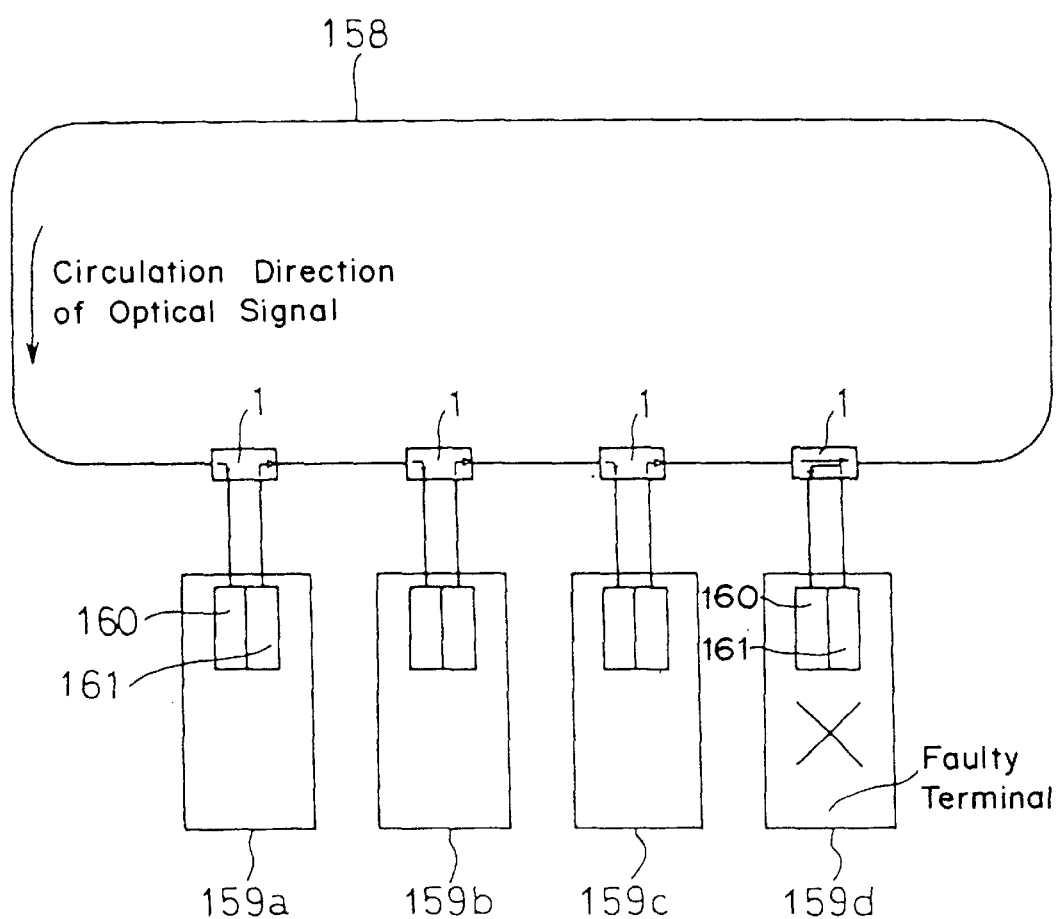
FIG. 50 is a schematic view showing an optical LAN system according to the present invention.

FIG. 50 is a view showing the construction of an optical LAN system 157 according to the present invention using the optical switch 101 of the present invention. The optical LAN system 157 comprises a looped optical fiber 158 and a plurality of terminals 159a, 159b, . . . , where the terminals 159a, 159b, . . . are connected to the looped optical fiber 158 via the optical switches 101. The plurality of terminals 159a, 159b, . . . perform transmission and reception of optical signals to one another via the looped optical fiber 158. Each terminal 159a, 159b, . . . comprises a reception section 160 for receiving an optical signal and converting it into an electric signal, and a transmission section 161 for converting the electric signal into an optical signal and transmitting it, where they are connected in series as shown in the figure.

In such an optical LAN system 157, when one terminal, for example, 159d has been disabled to transmit the optical signal due to any fault, the optical signal that has circulated along the looped optical fiber 158 is stopped at the faulty terminal 159d, requiring the optical LAN system 157 to bypassing the faulty terminal. When the optical switch 101 of the present invention is applied to such an optical LAN system 157, it may well be arranged that the optical fiber 117b on the input side and the optical fiber 108b on the output side are both connected to the looped optical fiber 158, where the optical fiber 117a on the input side is connected to the transmission section 161 of the terminals 159a, 159b, . . . , while the optical fiber 108c on the output side is connected to the reception section 160 of the terminals 159a, 159b, . . . The optical switches 101 of the normal terminals 159a, 159b, 159c, if set into the state of FIG. 38A, allow the normal terminals 159a, 159b, 159c to perform the transmission and reception with the looped optical fiber 158. Meanwhile, the optical switch 101 of the faulty terminal 159d, if having been switched to the state of FIG. 38B, allows the optical signal to bypass the faulty terminal 159d.

Figure 51:
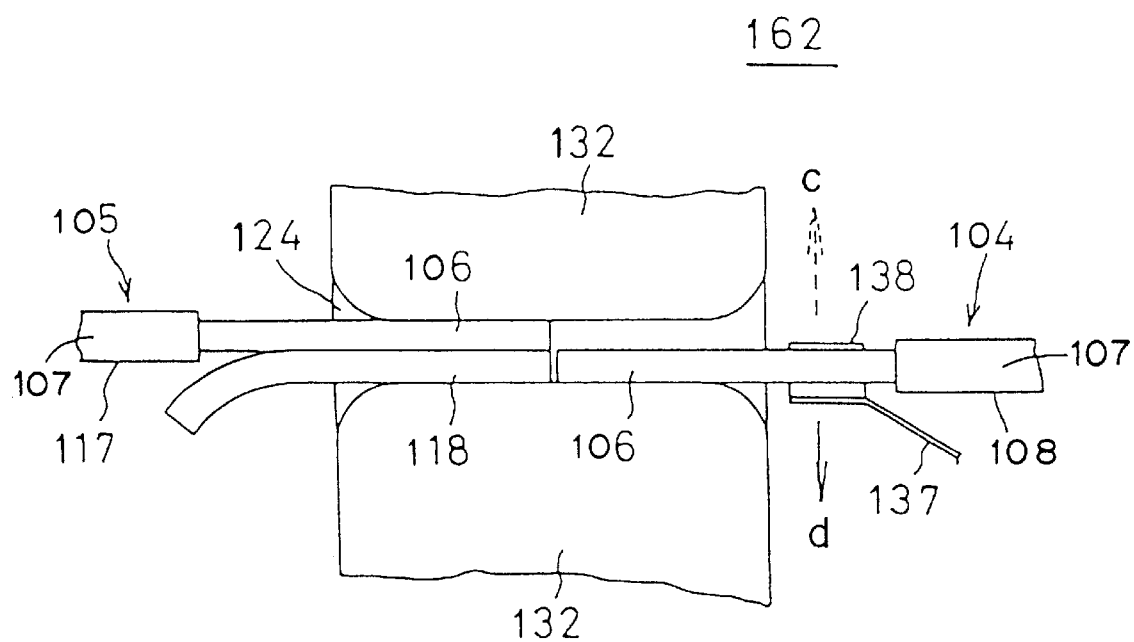
FIG. 51 is a partly broken plan view showing an optical switch according to another embodiment of the invention.
Figure 52:
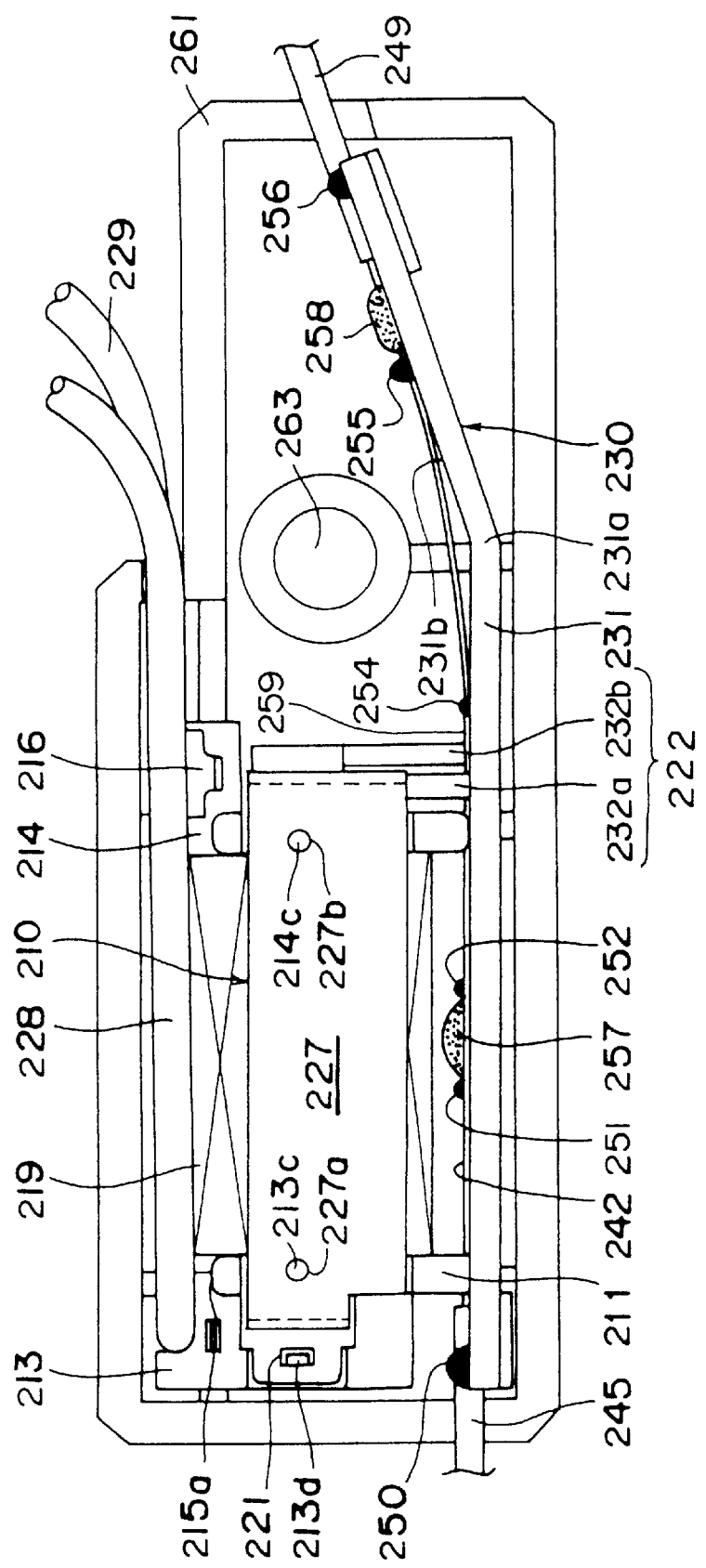
FIG. 52 is a front view showing a second embodiment of the optical switch of the invention.
Figure 53:
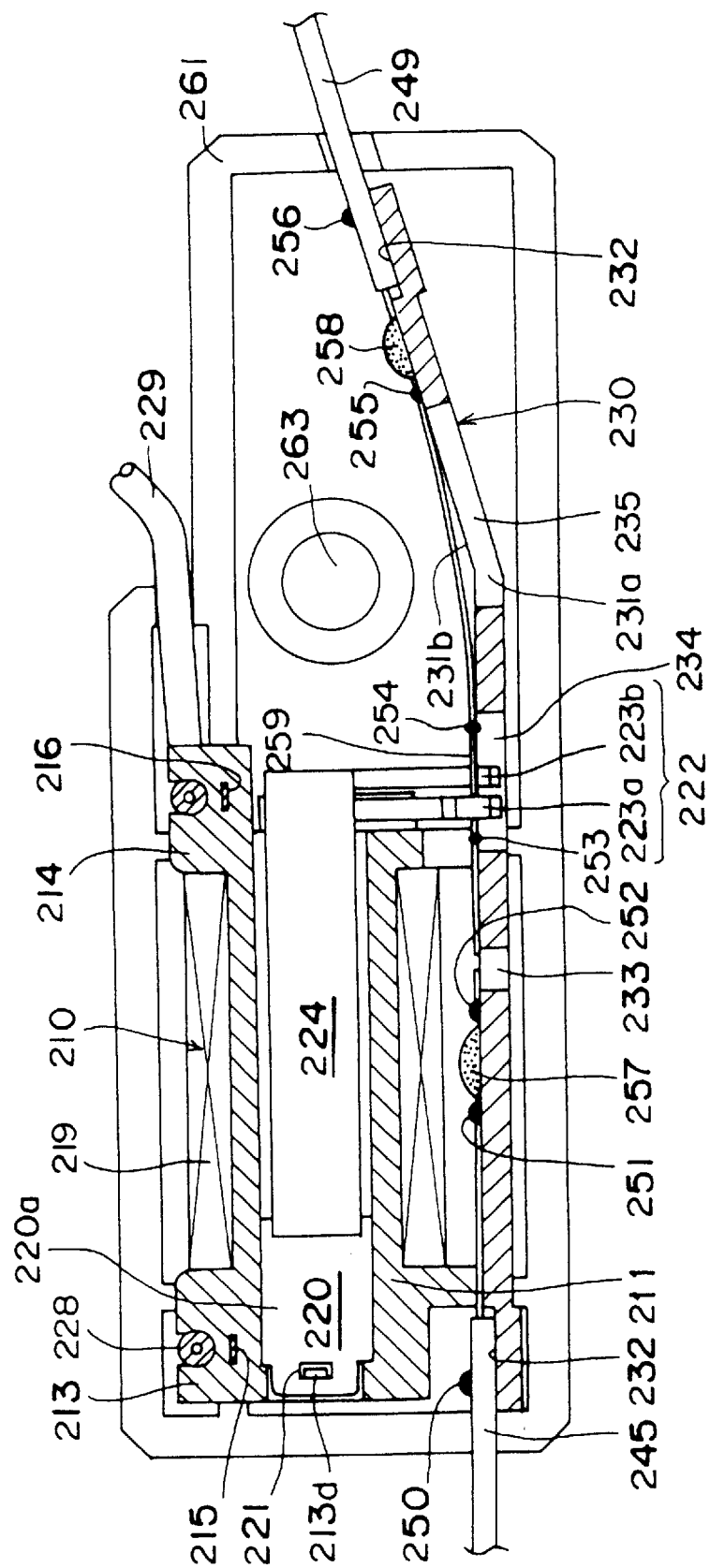
FIG. 53 is a partial sectional view of FIG. 52.

FIG. 51 is a partly broken plan view showing an optical switch 162 according to another embodiment of the present invention. In this embodiment, the movable optical fiber 104 comprises one single-core optical fiber 108, in which the core 106 of the part where the end sheathed portion 107 has been removed is a movable portion. Also, the fixed optical fiber 105 is fixed in the state that the dummy fiber 118 is in close contact with the core 106 in which the sheathed portion 107 at the end of the single-core optical fiber 117 has been removed. Then, the stopper members 132 are positioned by referencing the core 106 of the fixed optical fiber 105 and the dummy fiber 118 and by bringing the stopper members 132 into close contact with their side faces, while the movable optical fiber 104 is positioned by bringing the end portion side face of the core 106 into close contact with any one of the stopper members 132.

As seen above, the movable optical fiber 104 and the fixed optical fiber 105 are not optical fiber arrays but the single-core type, the optical switch 162 may be the ON/OFF type. That is, when the core 106 of the movable optical fiber 104 is displaced in the direction of "c" direction so as to be positioned with its end opposed to the core 106 of the fixed optical fiber 105, then the movable optical fiber 104 and the fixed optical fiber 105 are put into an optical transmission relationship, where the optical switch 162 comes to an ON state. By contrast, the core 106 of the movable optical fiber 104 is displaced in the direction of "d" so as to be positioned with its end opposed to the dummy fiber 118 as shown in FIG. 51, then the movable optical fiber 104 and the fixed optical fiber 105 are put into a non-transmission relationship, where the optical switch 162 comes to an OFF state.

Second Embodiment of Optical Switch

FIGS. 52 to 56 show a second embodiment of the optical switch of the present invention. This optical switch generally comprises an optical fiber unit 230, an electromagnetic unit 210, and a casing 260.

Figure 60:
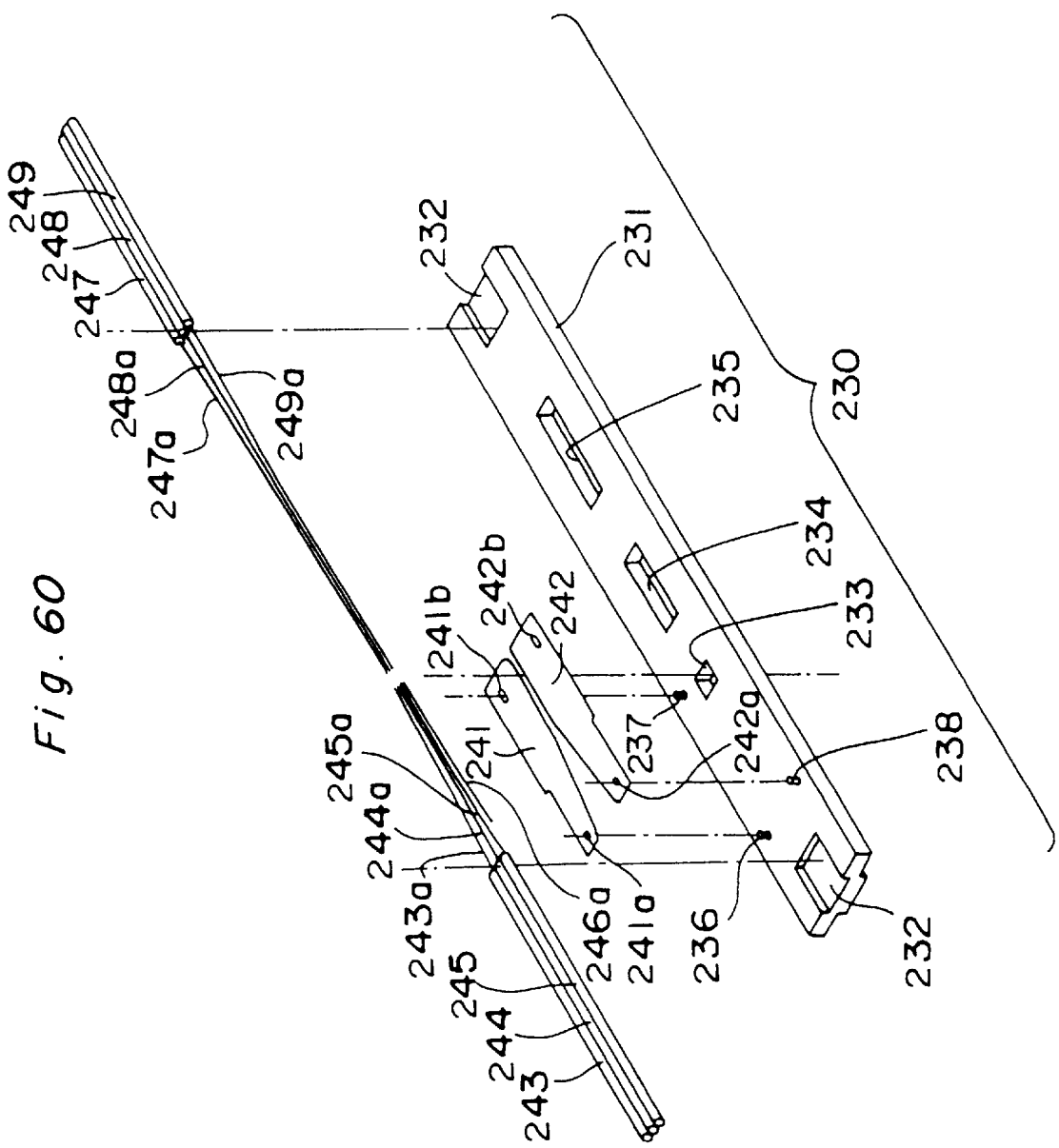
FIG. 60 is an exploded perspective view showing the optical fiber unit of the optical relay shown in FIG. 52.
Figure 61:
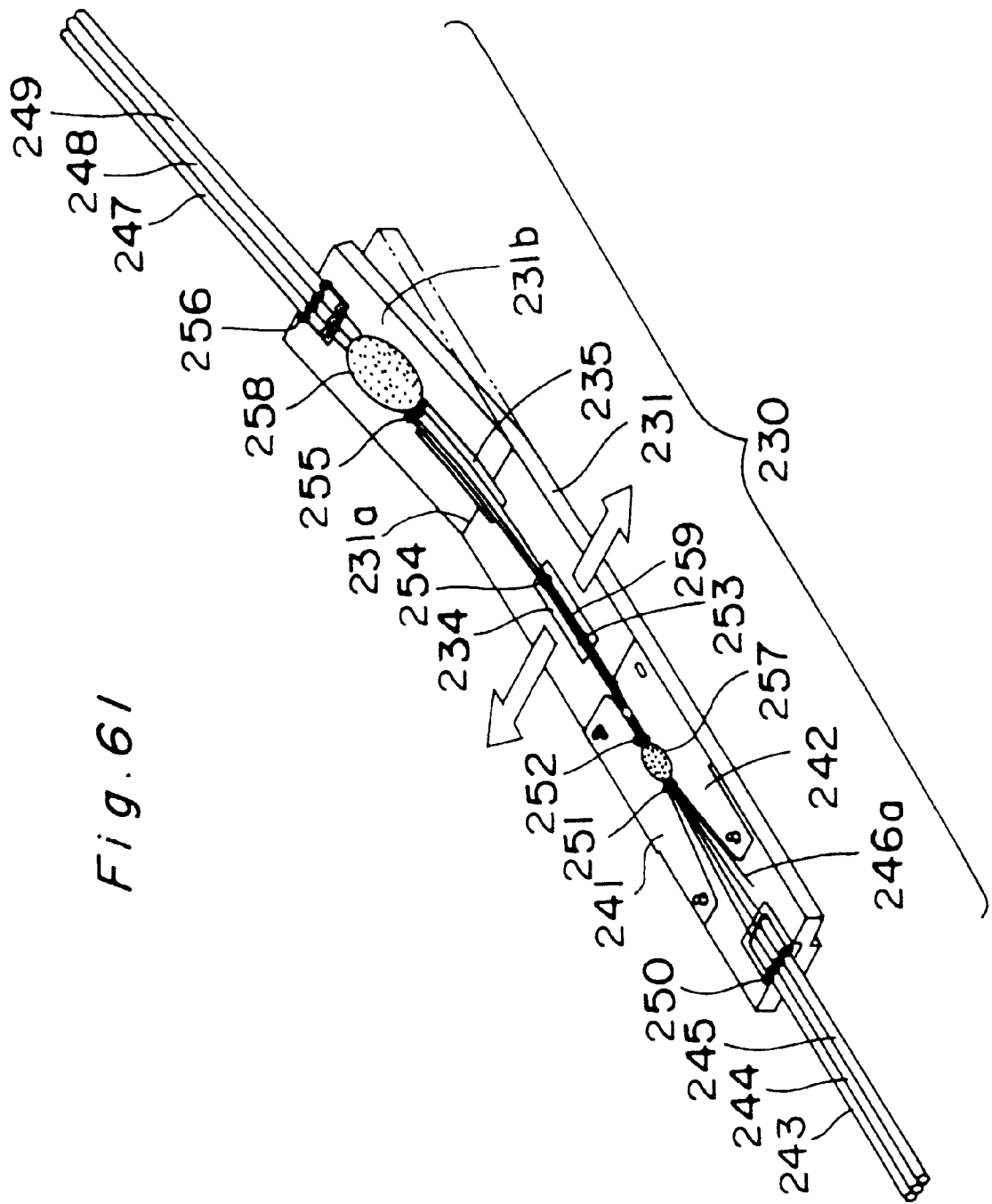
FIG. 61 is a perspective view of the optical fiber unit shown in FIG. 60.

The optical fiber unit 230 is so constructed that a clad portion 246a of fixed optical fibers 243 to 245 and a dummy fixed optical fiber 246 (not shown in FIG. 60) are assembled to a base 231 between a pair of guide plates 241, 242, while movable optical fibers 247 to 249 are assembled to the base 231, as shown in FIG. 60, and that thereafter a slanted surface 231b is formed by bending upward a bending portion 231a of the base 231 as shown in FIG. 61.

The base 231, as shown in FIG. 60, is a strip-shaped plate material which has a thin-film layer with a small coefficient of friction formed on the top surface so that clad portions 247a to 249a with the sheathing material of the movable optical fibers 247 to 249 removed can slidingly move smoothly.

The thin-film layer is formed from gold, silver, molybdenum or alloys of these, or synthetic resin material, by a method of vacuum deposition, plating, coating, or the like. The thin-film layer does not necessarily need to be provided on the entire top surface of the base 231, but may be provided partly at necessary portions.

In addition, the thin-film layer provided at the top surface of the base 231 is not necessarily needed but may be formed as required. However, the thin-film layer, if provided, allows the movable optical fibers 247, 248, 249 to slidingly move more smoothly, so that operating characteristics are enhanced and that the movable optical fibers 247, 248, 249 are less prone to wear, with prolonged life, advantageously.

Also, the base 231 has projective step portions 232, 222 formed at end portions of its top surface by press forming, as well as a through hole 233, a through hole 234, and an adhesive-inflow preventing through hole 235 provided on a center line of the strip-shaped plate material.

Further on the top surface of the base 231, are projected positioning pins 236, 237 for positioning the later-described guide plate 241 as well as a positioning pin 238 for positioning the guide plate 242.

Figure 55:
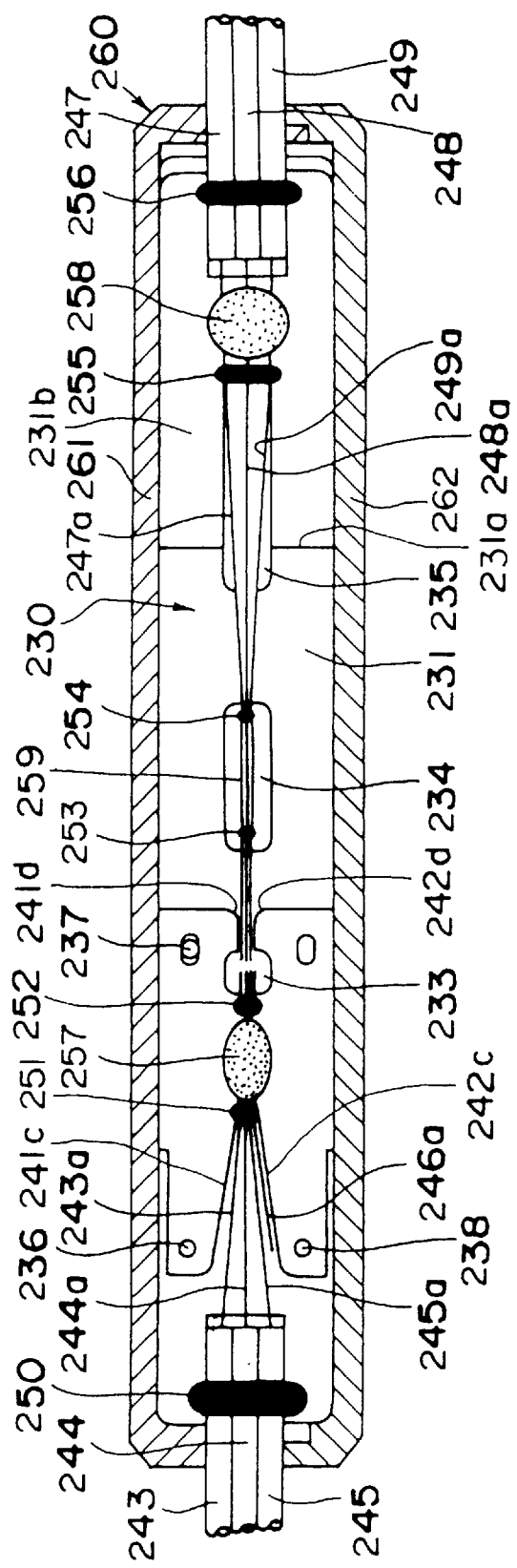
FIG. 55 is a plan view in cross section of the optical relay shown in FIG. 52.
Figure 56:
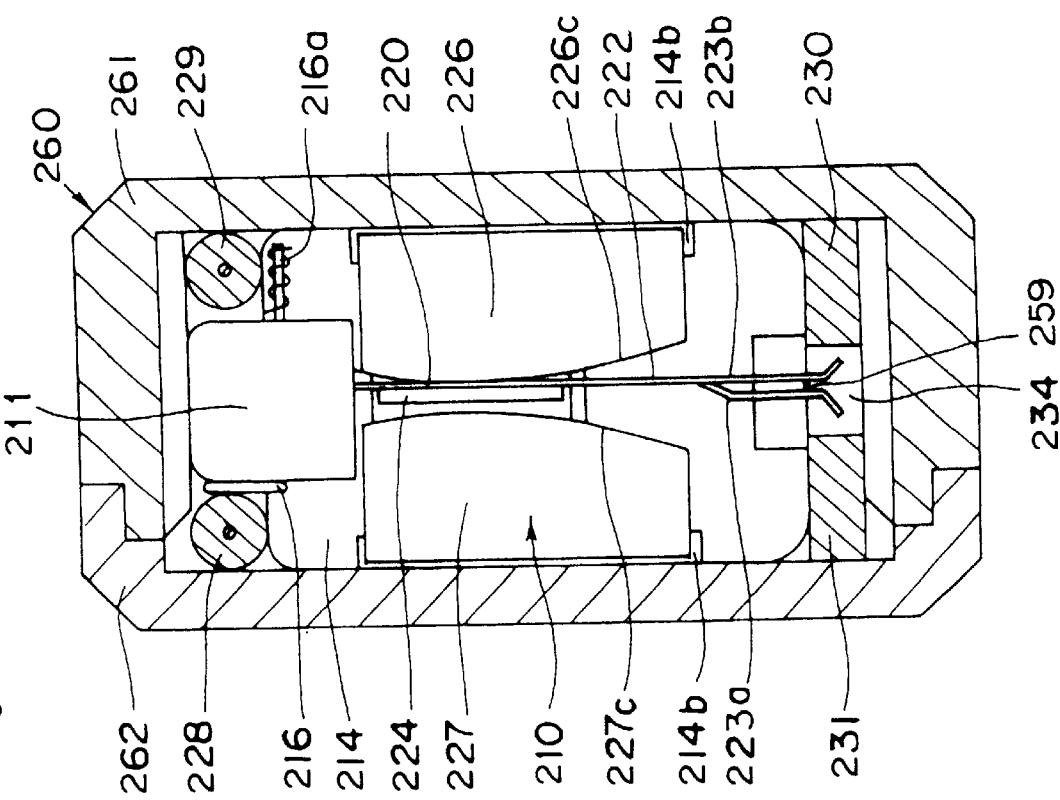
FIG. 56 is a right-side sectional view of the optical relay shown in FIG. 52.

The guide plates 241, 242 are thin plates of the same planar shape, having positioning holes 241a, 241b and 242a, 242b, respectively. The guide plates 241, 242 have tapered portions 241c, 242c formed on side end faces opposite to each other, as shown in FIG. 55. This offers an advantage that clad portions 243a to 246a can be easily converged during the assembling process of the fixed optical fibers 243 to 246.

Also, there are formed rounded portions 241d, 242d at opposing end corner portions of the guide plates 241, 242. This offers an advantage that even if the clad portions 247a, 249a of the movable optical fibers 247, 249 slidingly move to hit against the end corner portions of the guide plates 241, 242, the optical fibers are unlikely to be damaged or broken.

Further, although the thickness of the guide plates 241, 242 may be selected optionally according to the assembling method, it is preferably not less than the radius of the clad portions 243a to 246a of the fixed optical fibers 243 to 246. In this case, the clad portions 243a to 246a can be put into close contact with one another sideways without being floated from the top surface of the base 231, so that a high assembly precision can be achieved.

The fixed optical fibers 243 to 246 have the clad portions 243a to 246a with the sheathing material removed (FIGS. 57 and 58), and the clad portion are brought into close contact with one another between the guide plates 241, 242. Then, in order to join these integrally and fix them integrally to the base 231, joint portions 250 to 252 and a fixing portion 257 are formed with an adhesive. End faces of the clad portions 243a to 246a are located above the through hole 233 of the base 231. It is noted that the fixed optical fiber 246 is a dummy, the diameter of the clad portion 246a of which is the distance over which the clad portions 247a, 249a of the movable optical fibers 247 to 249 are allowed to reciprocatingly move.

The movable optical fibers 247 to 249, like the above-described fixed optical fibers 243 to 246, have the clad portions 247a to 249a with the sheathing material removed (FIGS. 57 and 58), and the clad portions are brought into close contact with one another, and joined integrally with an adhesive. That is, part of the movable optical fibers 247 to 249 are joined integrally and fixed integrally to the base 231 at joint portions 255, 256 and a fixing portion 258. It is noted that free end portions of the clad portions 247a to 249a are held so as to be slidingly movable along the top surface of the base 231, and their end faces can be opposed to the end faces of the clad portions 243a to 246a of the fixed optical fibers 243 to 246, respectively.

Next, a set of jigs to be used for the manufacturing of the optical fiber unit 230 are explained with reference to FIGS. 62 and 63. This set of jigs comprises a receiving jig 270 in which guide blocks 272, 272 are disposed on both sides of a center block 271, and a pressing jig 280 to be assembled to the center block 271 from above.

Figure 63:
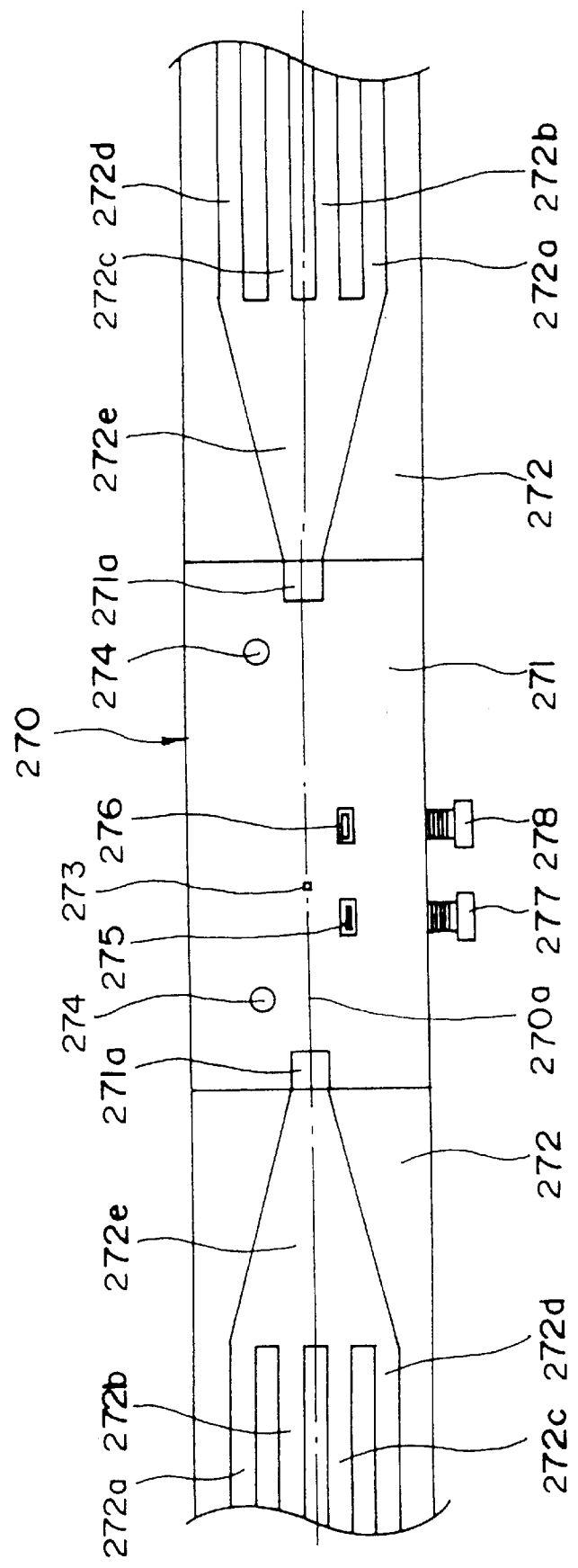
FIG. 63 is a plan view of the receiver jig shown in FIG. 62.

In center block 271 of the receiving jig 270, as shown in FIG. 63, a thickness gauge 273 is projected on a center line 270a of the receiving jig 270. A pair of positioning projections 274, 274 are projected along the center line 270a on one side of the center line 270a, while a positioning claw 275 and a fixing claw 276 are projected along the center line 270a on the other side portion of the center line 270a. These positioning claw 275 and fixing claw 276 are urged outward by their own spring force, and can be positionally adjusted by being reciprocatingly moved widthwise of the center block 271 with adjuting screws 277, 278. Further, the center block 271 has, at both end edge portions of its top surface, fitting receptors 271a, 271a to which the projective step portions 232, 232 of the base 231 can be fitted.

Each of the guide blocks 272 comprises a wide groove 272e having a generally trapezoidal shape in plan view and communicating with four parallel guide grooves 272a, 272b, 272c, 272d provided in the top surface, so that when the base 231 is assembled to the center block 271, the end portion of the wide groove 272e will not produce a step gap to the projective step portion 232 of the base 231.

Figure 62:
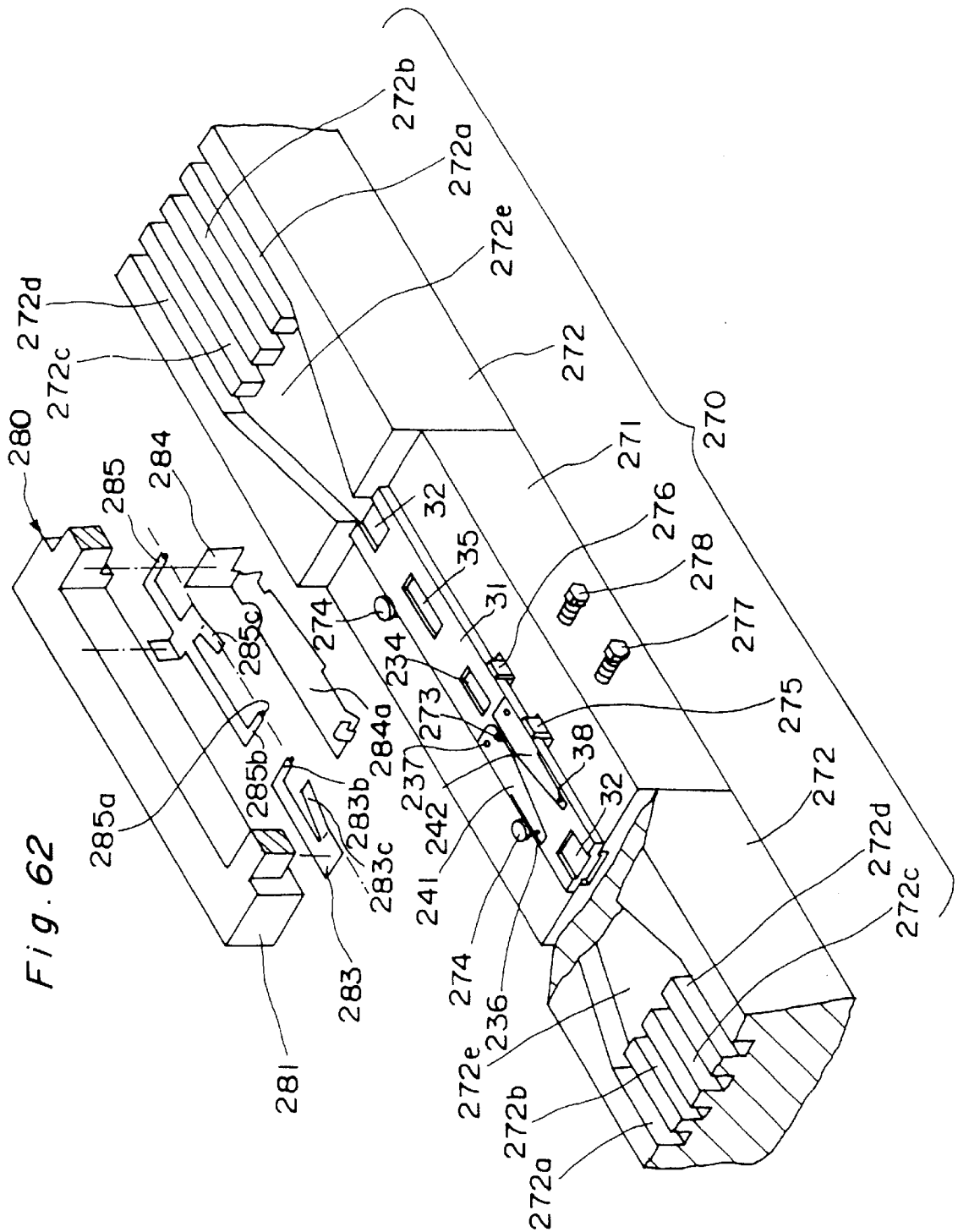
FIG. 62 is an exploded perspective view showing a set of jigs for assembling the optical fiber unit shown in FIG. 60.
Figure 65:
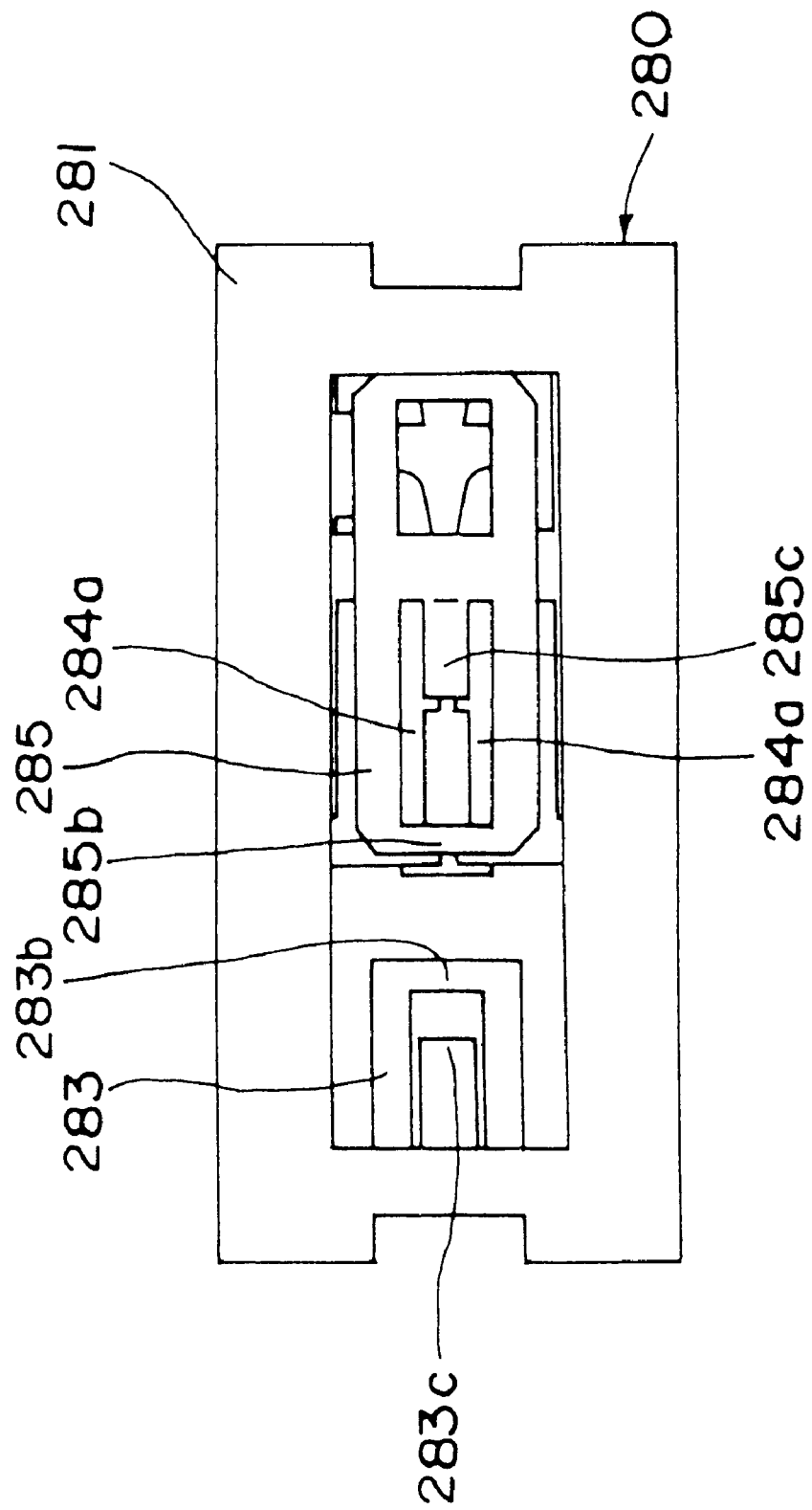
FIG. 65 is a plan view of the pressing jig shown in FIG. 62.
Figure 66:
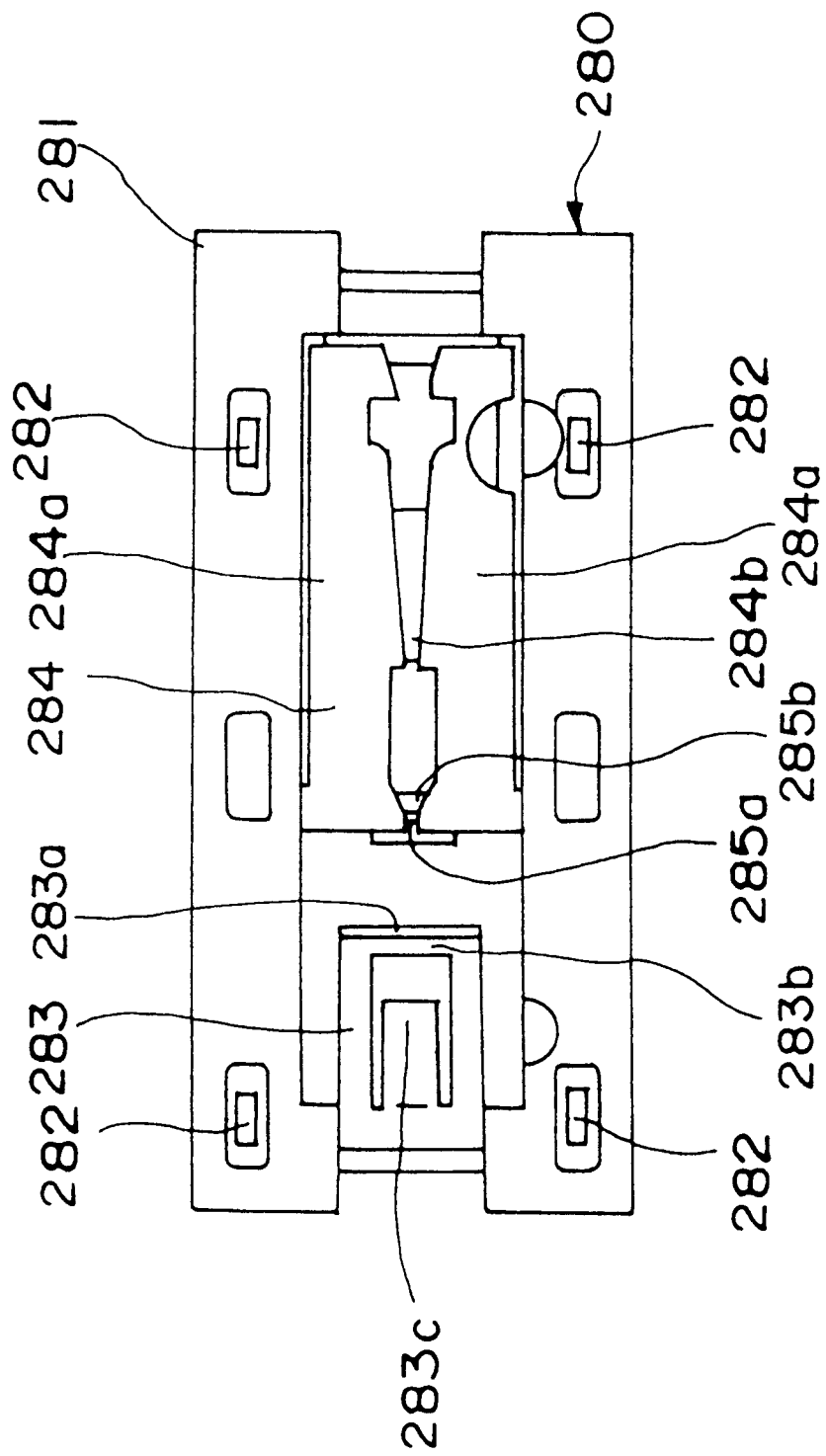
FIG. 66 is a bottom view of the pressing jig shown in FIG. 62.

The pressing jig 280, as shown in FIGS. 62, 65, and 66, is so arranged that first, second, third spring materials 283, 284, 285 are assembled and fixed to a frame 281 having a generally oblong shape in plan view. The first spring material 283 restricts the vertical position of the fixed optical fibers 243 to 246, the second spring material 284 restricts the lateral position of the movable optical fibers 247 to 249, and the third spring material 285 restricts the vertical position of the movable optical fibers 247 to 249. For description's sake, the pressing jig 280 in FIG. 62 shows a view in which it is cut at a center line.

The frame 281, as shown in FIG. 66, has permanent magnets 282 buried in its lower surface, so that the frame 281 can be attracted up and fixed to the center block 271 by their magnetic force.

The first spring material 283, as shown in FIG. 66, has a frame shape formed from a thin-plate spring material of a generally square shape in plan view, where a pressing portion 283b is defined by providing a needle-like member 283a at the edge portion of the lower surface on one side of the first spring material 283, while an elastic tongue piece 283c is provided so as to extend from the opposing other side toward the pressing portion 283b.

The elastic tongue piece 283c prevents the clad portions 243a to 246a of the inserted fixed optical fibers 243 to 246 from floating to such an extent that they reach the pressing portion 283b. This offers an advantage that the assemblability of the fixed optical fibers 243 to 246 can be enhanced.

The second spring material 284, as shown in FIGS. 62 and 66, is formed in one unit through steps of stamping the material by a pressing process and bending it in such a way that the pair of guide plates 284a, 284a are formed side by side with a specified spacing. Then, the clad portions 247a to 249a of the movable optical fibers 247 to 249 are converged so as to be brought into close contact with one another by a tapered guide slit 284b defined by the guide plates 284a, 284a, in which way the lateral positioning is accomplished.

The third spring material 285, as shown in FIG. 65, has a frame shape formed from a thin-plate spring material of a generally oblong shape in plan view, where a pressing portion 285b is defined by providing a needle-like material 285a (FIG. 62) at the edge portion of the lower surface on a shorter side of the third spring material 285, while an elastic tongue piece 285c is provided so as to extend from an intermediately-positioned shorter side stretched across against a longer side adjoining the pressing portion 285b, toward the pressing portion 285b.

The elastic tongue piece 285c prevents the clad portions 247a to 249a of the inserted movable optical fibers 247 to 249 from floating to such an extent that they reach the pressing portion 285b. This offers an advantage that the assemblability of the movable optical fibers 247 to 249 can be enhanced.

Next described is the method of manufacturing the optical fiber unit 230 by using the aforementioned one set of jigs.

Figure 64:
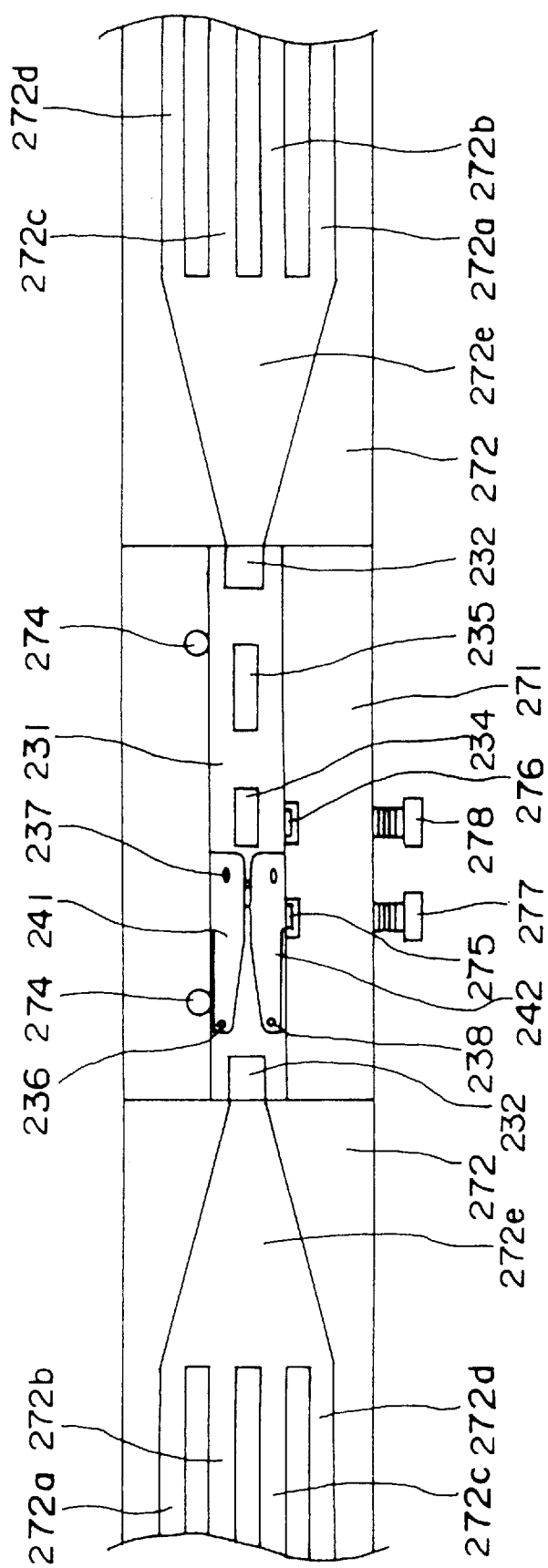
FIG. 64 is a plan view showing a state in which the base of the optical fiber unit is positioned to the receiver jig shown in FIG. 63.

First, as shown in FIG. 64, with the base 231 placed on the center block 271, a one-side edge portion of the base 231 is engaged with unshown cut-out portions provided at the pair of positioning projections 274, 274, while the projective step portions 232, 232 of the base 231 are positioned by being fitted to the fitting receptors 271a of the center block 271. As a result, the thickness gauge 273 is projected from the through hole 233 of the base 231.

Then, the fixing claw 276 is moved by turning the adjusting screw 278 provided to the center block 271, by which the base 231 is pressed and fixed to the positioning projections 274, 274. Subsequently, the positioning holes 241a, 241b of the guide plate 241 are fitted to the positioning pins 236, 237 of the base 231, and thereby the guide plate 241 is positioned, while the positioning hole 242a of the guide plate 242 is fitted to the positioning pin 238 of the base 231, and thereby the guide plate 242 is positioned and held rotatable.

The pressing jig 280 is positioned from above the center block 271, and attracted and fixed to the center block 271 by the magnetic force of its permanent magnets 282. Then, the fixed optical fibers 243 to 246 are slid and inserted into the guide grooves 272a to 272d of one guide block 272 one by one.

Figure 67:
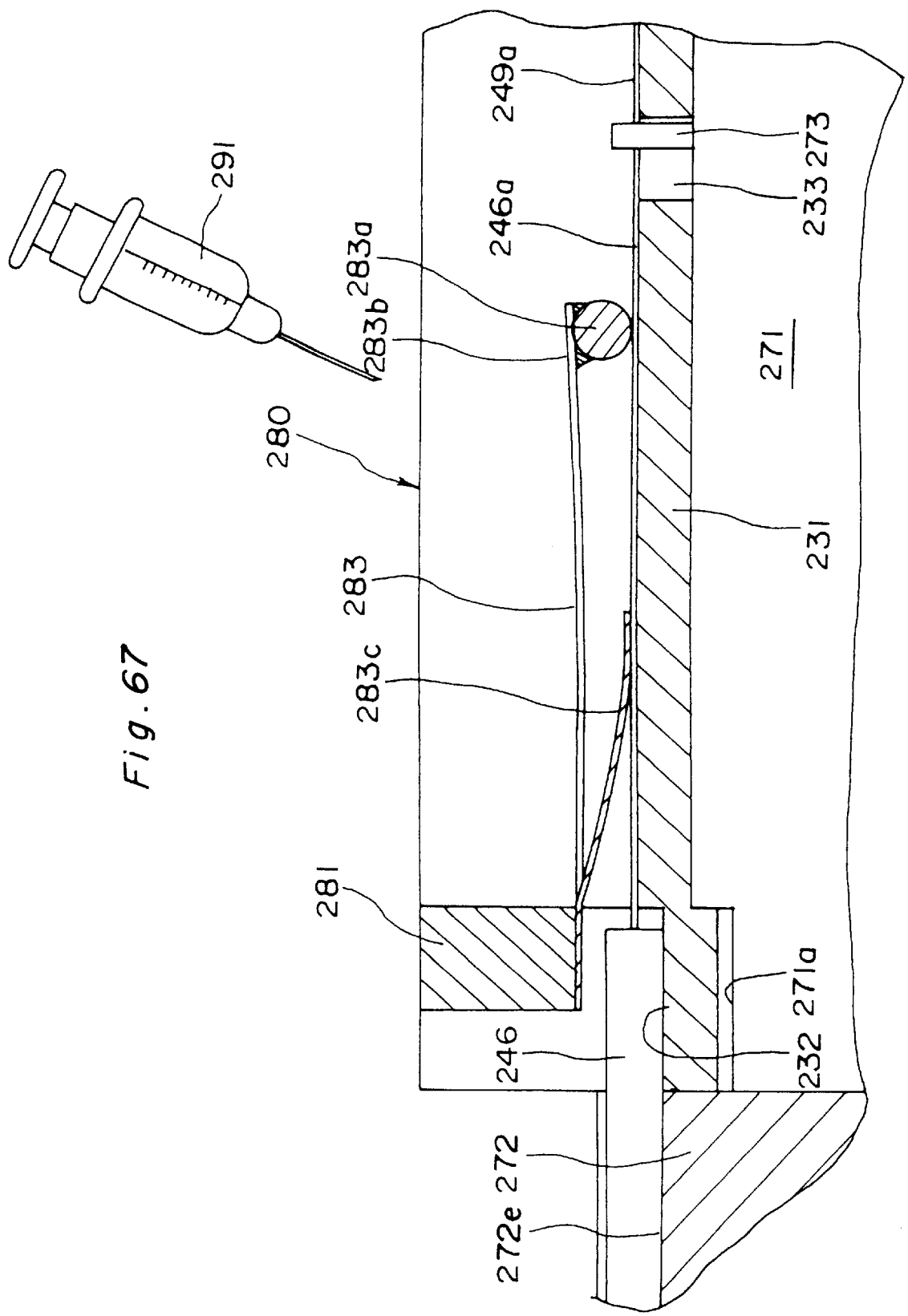
FIG. 67 is a schematic partial sectional view for explaining the method of fixing the fixed optical fiber to the base.

Then, when their clad portions 243a to 246a are inserted between the base 231 and the first spring material 283 of the pressing jig 280 as shown in FIG. 67, the elastic tongue piece 283c of the first spring material 283 prevents the clad portions 243a to 246a from floating up, while the clad portions 243a to 246a are converged along tapered portions 241c, 242c of the guide plates 241, 242. Subsequently, the pressing portion 283b of the first spring material 283 restricts their vertical positions, and then the end faces of the clad portions 243a to 246a are in contact with the thickness gauge 273.

Next, the positioning claw 275 is moved by turning the adjuting screw 277 so as to press the guide plate 242, the guide plate 242 pivots about the positioning pin 238, so that the clad portions 243a to 246a are pressed and put into contact with one another, and thereby positioned laterally. In addition, the guide plate 242 may also be moved parallel to achieve the positional restriction, without being limited to pivoting.

The present embodiment has been described above on a case where the fixed optical fibers 243 to 246 are restricted for their lateral position by pivoting the guide plate 242 out of a pair of guide plates 241, 242. However, without being necessarily limited to this, it is also possible to make both guide plates 241, 242 pivotable or slidingly movable or to make one guide plate previously fixed to the base 231. In addition, the guide plates are not necessarily provided independently of the base 231, but may be provided by cutting them out through grinding process.

Meanwhile, when the movable optical fibers 247 to 249 are inserted into the guide grooves 272a, 272b, 272c of the other guide block 272, the elastic tongue piece 285c of the third spring material 285 prevents the clad portions 247a to 249a from floating up, and then the clad portions 247a to 249a are converged laterally by the guide slit 284b defined by the guide plates 284a, 284a of the second spring material 284.

Figure 68:
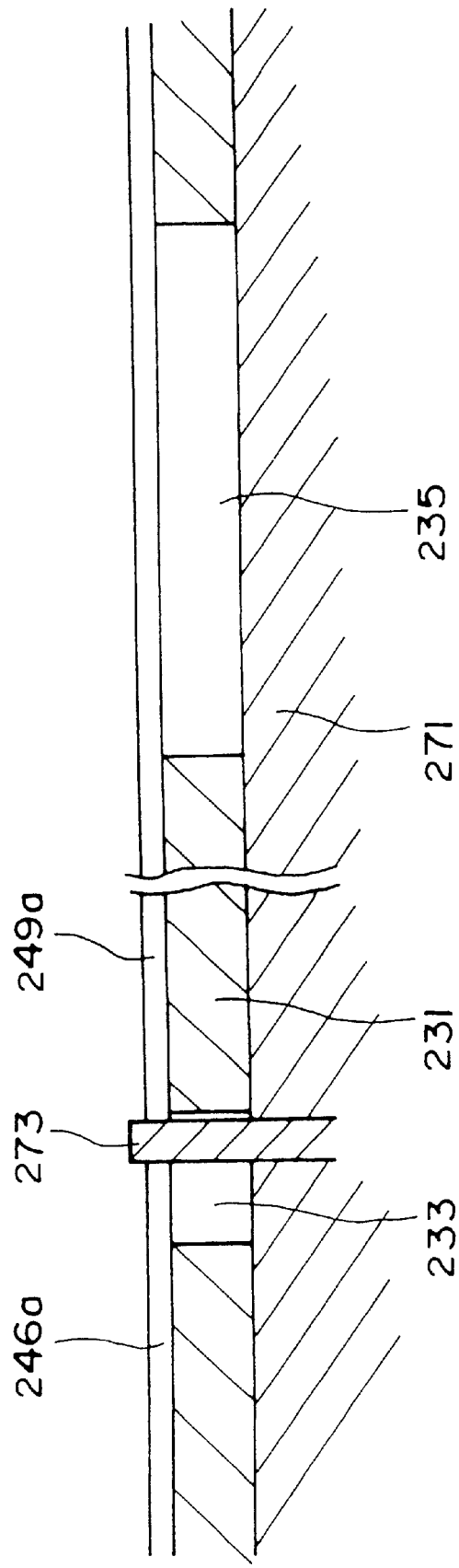
FIG. 68 is a schematic partial sectional view for explaining the method of positioning optical fibers to the base.

With the clad portions 247a to 249a further pushed in, the pressing portion 285b of the third spring material effects the vertical positional restriction, while the three clad portions 247a to 249a are put into close contact with one another, and the end faces of the clad portions 247a to 249a are in contact with the thickness gauge 273 of the center block 271 (FIG. 68).

In addition, the present embodiment has been described on a case where a plurality of movable optical fibers 247 to 249 are assembled to the base 231 one by one. However, it is also possible that a plurality of movable optical fibers or a plurality of fixed optical fibers are previously joined integrally, and then assembled to the base 231.

Next, as shown in FIG. 67, an ultraviolet-curing type adhesive is injected and applied with an injector 291 to specified places of the fixed optical fibers 243 to 246 and the movable optical fibers 247 to 249, which have been positioned on the base 231, by which the joint portions 250, 251, 252 and 253, 254, 255, 256 are formed and temporarily fixed to the base 231 as shown in FIG. 61. In this case, the fixed optical fiber 246, which serves as a dummy fiber, has its clad portion 246a fixed to the base 231 integrally with the other clad portions 243a to 245a at the joint portions 251, 252, but its portion sheathed with the sheathing material is not fixed to the base 231.

Then, epoxy resin is applied to between the joint portions 251, 252 and to a proximity to an outer side of the joint portion 255, by which the fixing portions 257, 258 are formed. Thus, the optical fibers are joined integrally with one another more firmly, and fixed firmly to the base 231.

The joint portions 250 to 256 function to join the optical fibers integrally with one another and to fix them to the base 231. In particular, in this embodiment, with the arrangement that the fixed and movable optical fibers 243 to 245, 247 to 249 have their sheathed portions fixed on the projective step portions 232, 232 of the base 231, even if any external force is loaded, its stress would not transfer to the clad portions 243a to 245a, so that the optical fibers are unlikely to break.

Also in this embodiment, since the clad portions 243a to 246a, 247a to 249a of the fixed and movable optical fibers 243 to 246, 247 to 249 are fixed to the base 231 while in close contact with one another, there will not occur variations or gaps in the positioning height so that a high assembly precision can be achieved.

Further in this embodiment, after the formation of the joint portions 252, 255, the fixing portions 257, 258 are formed with epoxy resin. Therefore, when the joint portions 252, 255 are formed with an adhesive capable of solidifying them in short time, the optical fibers can be temporarily fixed to the base 231 in short time. Also, the fixing portions 257, 258 prevent the epoxy resin for firmly fixing the optical fibers to the base 231 from expanding inward by capillarity. Further, since the joint portions 253, 254 are formed above the through hole 234, the base 231 and the movable optical fibers 247 to 249 will never be fixed by leaked adhesive.

Also since the adhesive-inflow preventing through hole 235 extends inward from the joint portion 255, the ultraviolet-curing type adhesive and epoxy resin adhesive can be prevented from flowing to between the base 231 and the movable optical fibers 247, 248, 249 by capillarity.

In particular, the joint portion 255 serves as the pivoting fulcrum for the movable optical fibers 247 to 249, allowing a stable pivoting operation. Thus, there can be eliminated variations in the stress to the movable optical fibers 247 to 249, so that an optical relay of prolonged life can be obtained.

Out of the fixed optical fibers 243 to 246, the fixed optical fiber 246 has its clad portion 246a cut out into a dummy optical fiber, and thereafter the base 231 is taken out of the receiving jig 270 and the pressing jig 280. In this state, the distance between the end faces of the clad portions 243a to 246a of the fixed optical fibers 243 to 246 and the end faces of the clad portions 247a to 249a of the movable optical fibers 247 to 249 is the thickness of the thickness gauge 273.

In this embodiment, the fixed optical fiber 246 is assembled to the base 231 in the same manner as the fixed optical fibers 243 to 245, and thereafter cut into a dummy optical fiber. Therefore, the fabrication process special to the making of the dummy optical fiber is no longer necessitated, making the assembly process easier than when only the clad portion 246a is assembled from the beginning.

Figure 57:
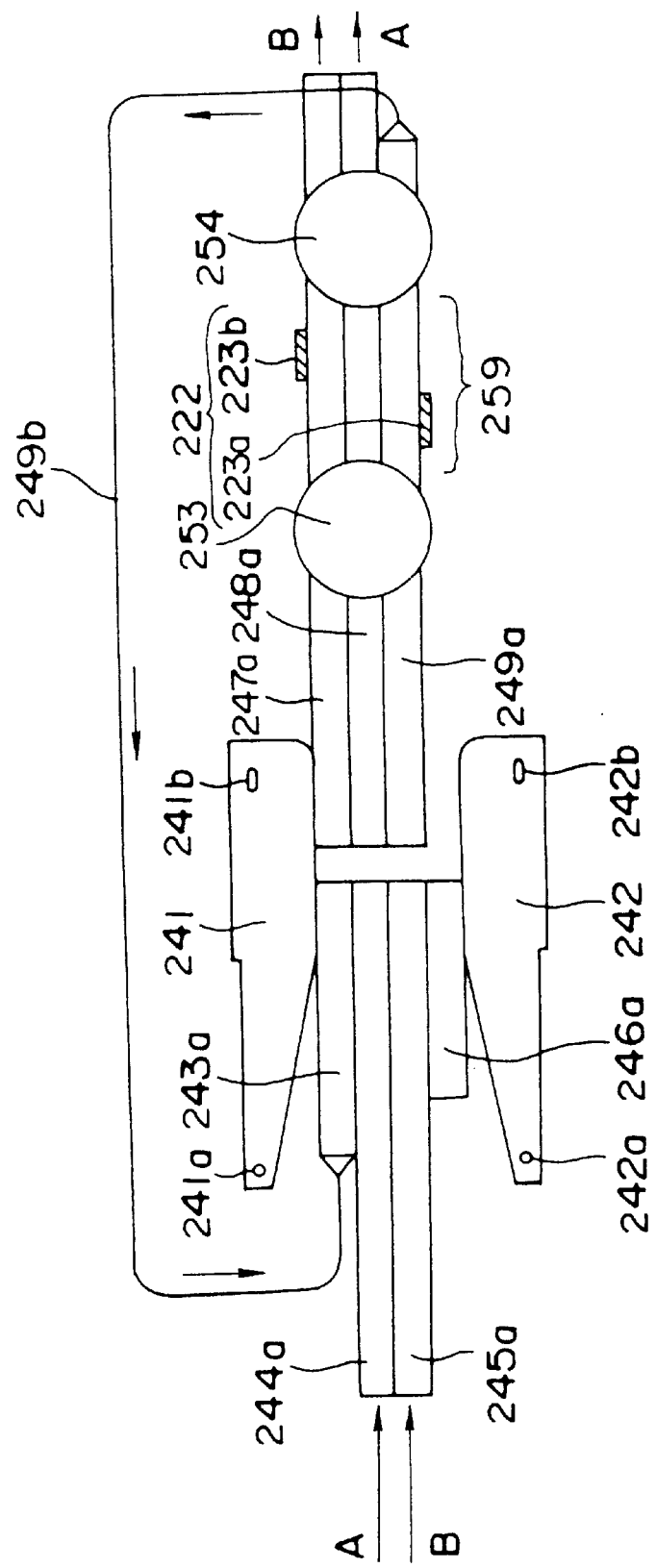
FIG. 57 is a schematic plan view prior to operation for explaining the operation of the optical relay shown in FIG. 52.
Figure 58:
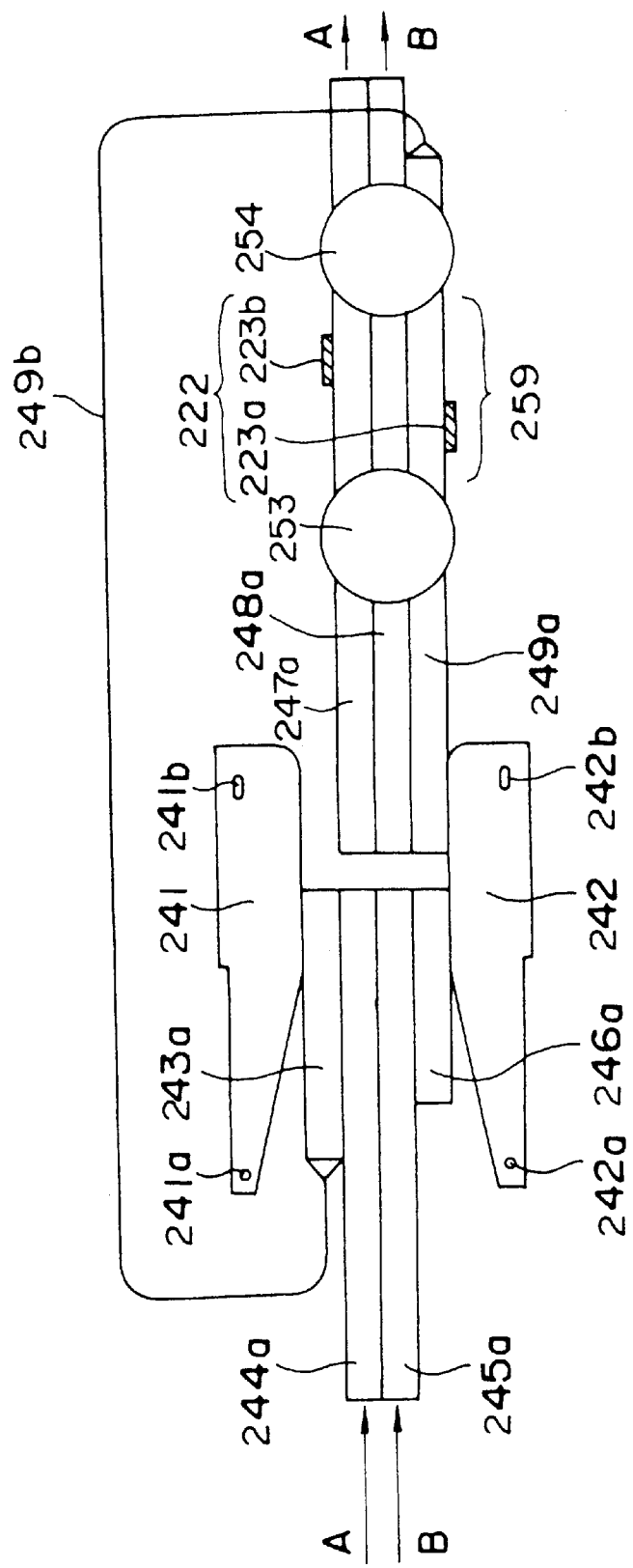
FIG. 58 is a schematic plan view after operation for explaining the operation of the optical relay shown in FIG. 52.

Also, as shown in FIGS. 57 and 58, the clad portions 243a to 245a of the fixed optical fibers 243 to 245 and the clad portion 246a of the fixed optical fiber 246, which is a dummy, are brought into close contact with each other. Therefore, the distance between the guide plates 241, 242 becomes uniform, offering an advantage of high assembly precision, especially, high parallelism.

In addition, the above embodiment has been described on a case where one optical fiber 246 is assembled outside the fixed optical fiber 245 as a dummy. However, without being limited to this, a plurality of dummy optical fibers may be assembled, and otherwise a dummy optical fiber may be disposed between fixed optical fibers, of course.

Figure 70:
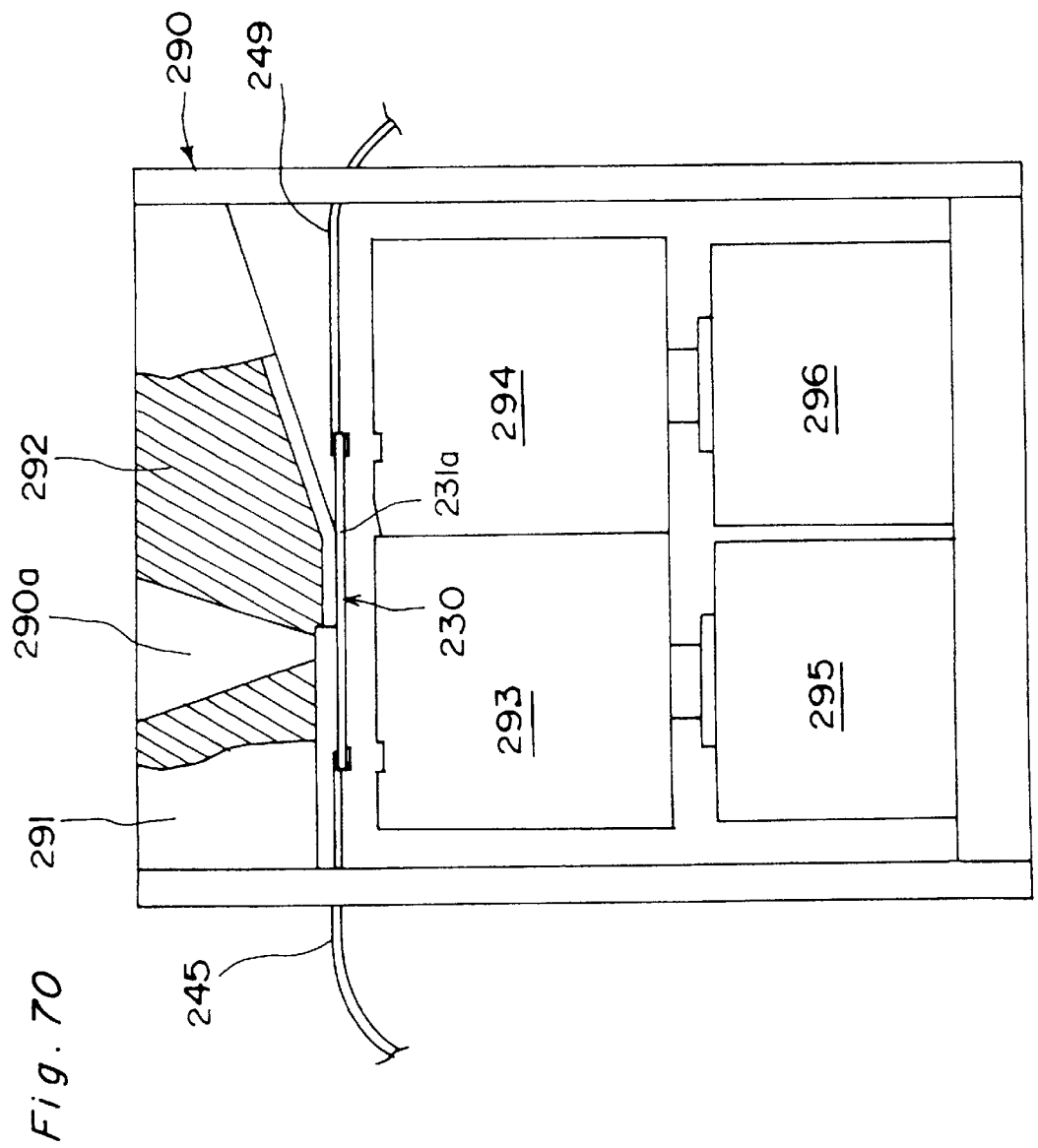
FIG. 70 is a front of the press showing a state prior to bending for explaining the method of bending the base of the optical fiber unit.
Figure 71:
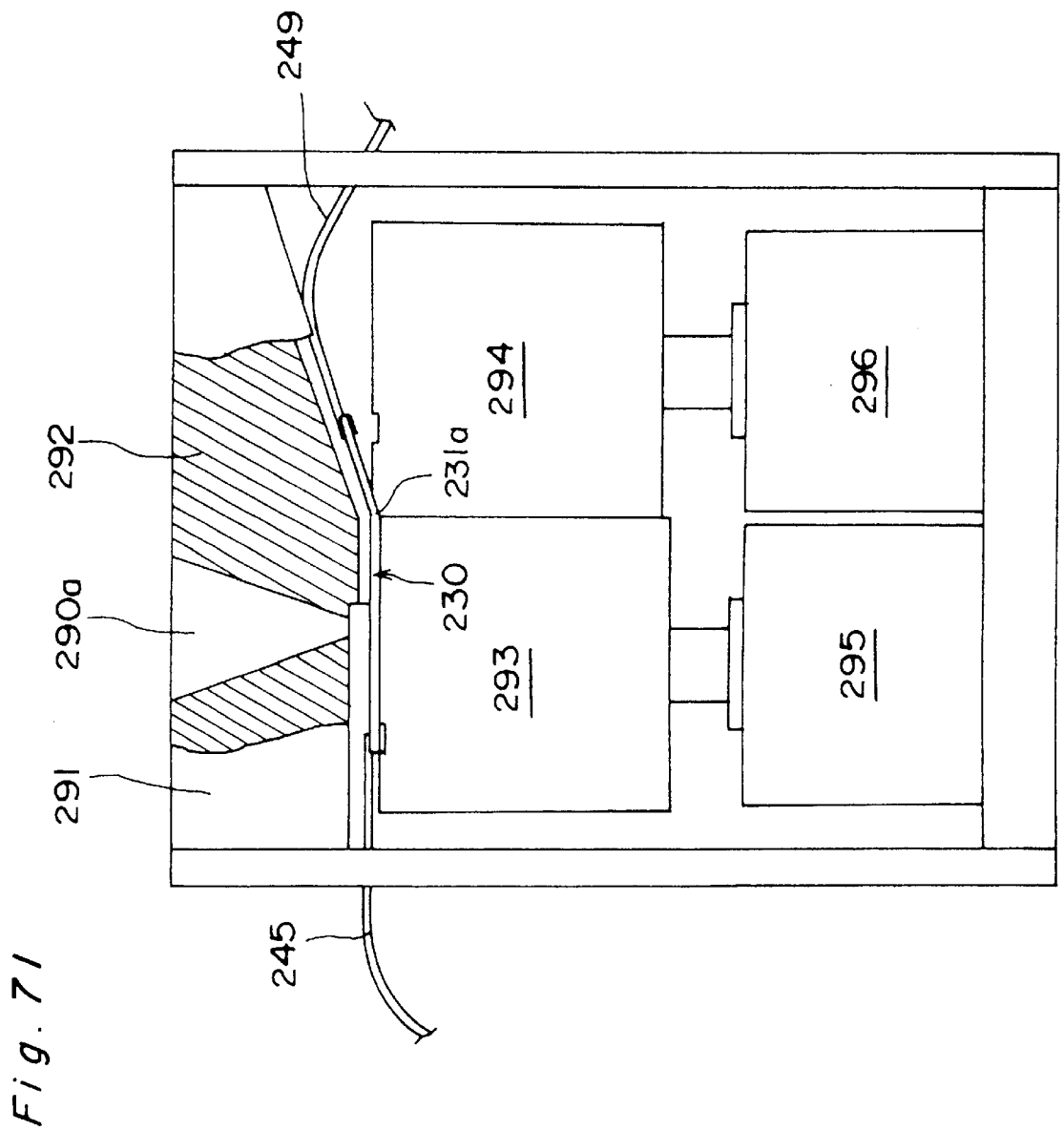
FIG. 71 is a front of the press showing a state after bending for explaining the method of bending the base of the optical fiber unit.
Figure 72:
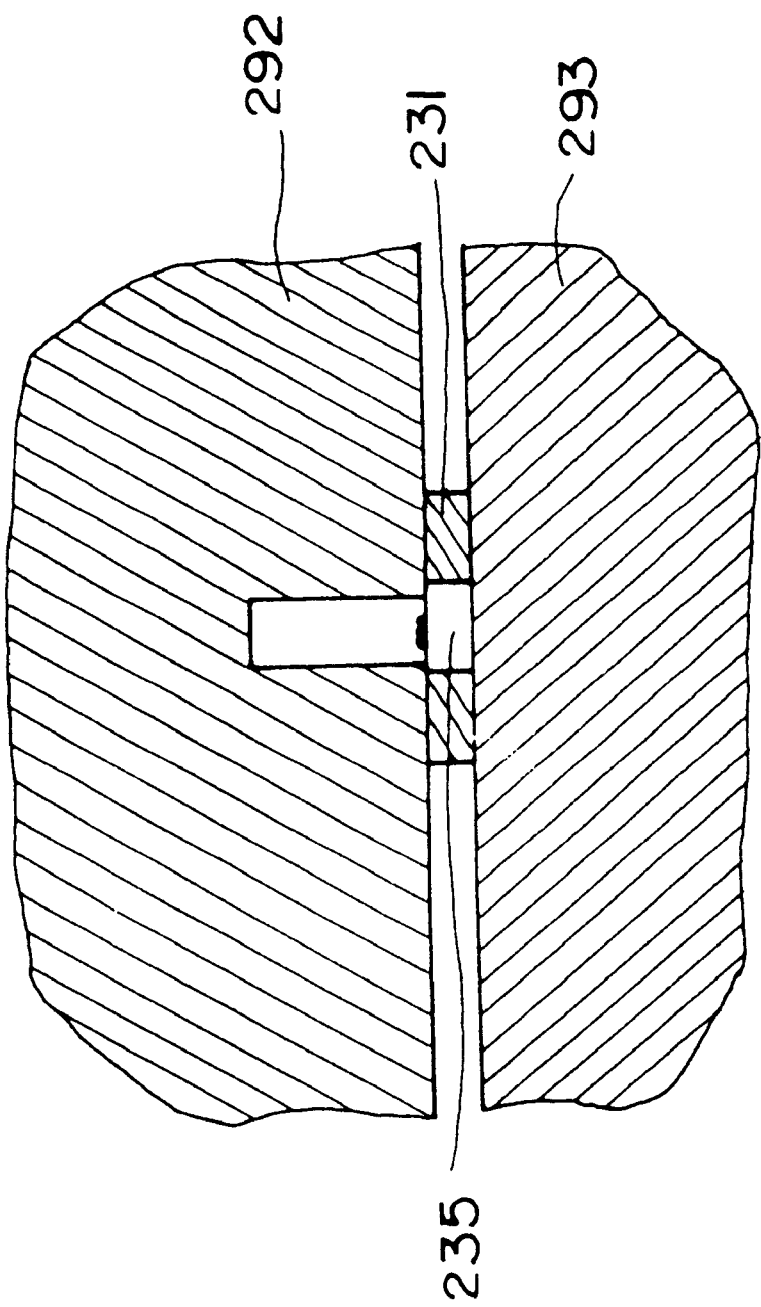
FIG. 72 is a sectional view showing the support structure for explaining the method of bending the base of the optical fiber unit.
Figure 73:
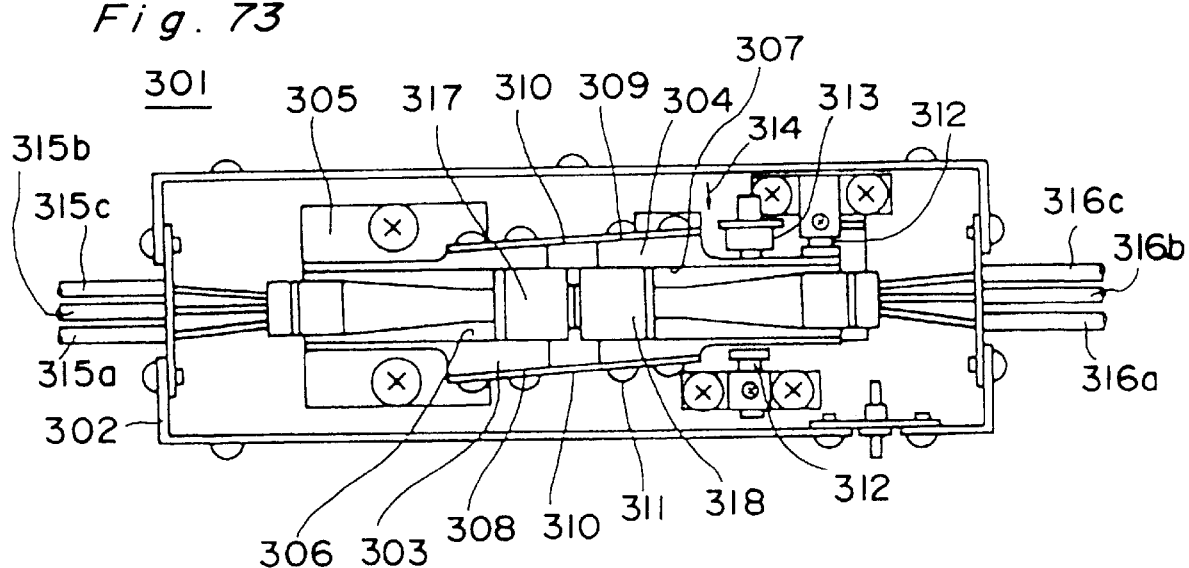
FIG. 73 is a plan view showing a conventional optical switch.
Figure 74:
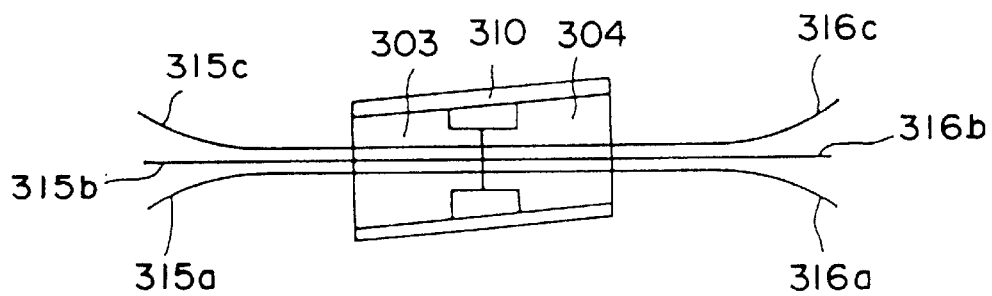
FIGS. 74A and 74B are operation explanatory views of the optical switch shown in FIG. 73.
Figure 74:
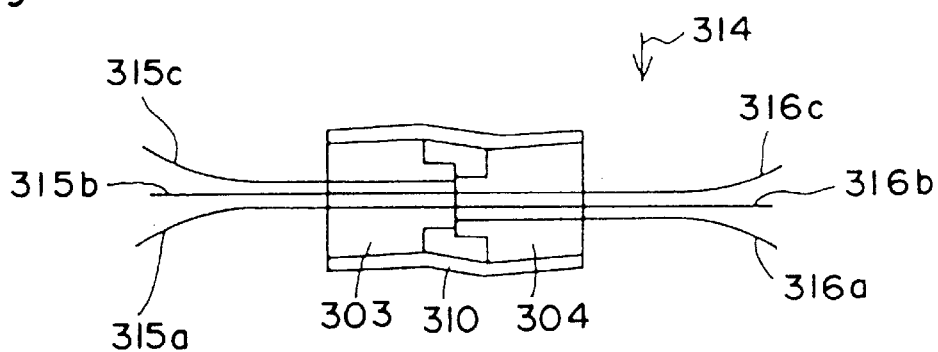

Then, as shown in FIG. 61, the slanted surface 231b is formed by bending upward the bending portion 231a of the base 231. The method of bending the base 231 is, for example, positioning the base 231 of the optical fiber unit 230 prior to bending to a first receiving mold 291 and a second receiving mold 292 of a press machine 290 via unshown positioning pins and springs, as shown in FIG. 70.

Figure 69:
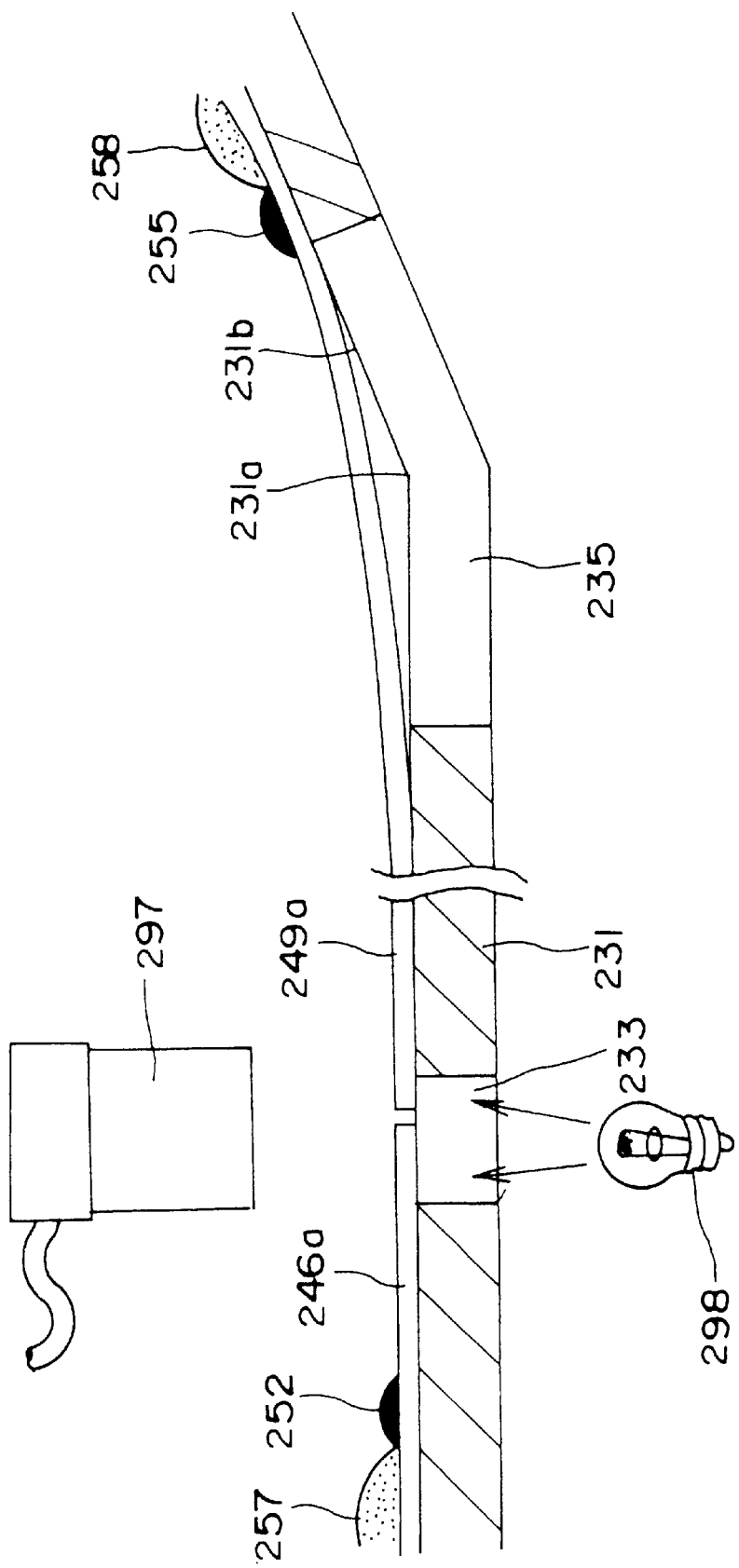
FIG. 69 is a schematic partial sectional view for explaining the method of adjusting opposing end faces of optical fibers to a specified distance.

Meanwhile, as shown in FIG. 69, a CCD camera 297 is disposed at a spaced portion 290a between the receiving mold 291 and the second receiving mold 292. Further, a light source 298 is disposed below the through hole 233 located just under the CCD camera 297.

Then, after the base 231 is held by driving a holding mold 293 of the press machine 290 with a hydraulic cylinder 295, one-side half of the base 231 is bent up by driving a bending mold 294 with a hydraulic cylinder 296. In this state, it is examined by the CCD camera 297 whether or not the opposing distance between the end faces of the clad portions 243a to 246a and the end faces of the clad portions 247a to 249a is a desired distance.

Then, if it is not the desired distance, the bending mold 294 is driven once again so that the opposing distance is adjusted to the desired distance. After the adjustment process is completed, the optical fiber unit 230 is removed from the press machine 290.

According to this embodiment, when the base 231 is bent, the clad portions 247a to 249a of the movable optical fibers 247, 248, 249 located above them are thereby flexed so that the end portions of the clad portions 247a to 249a are pressed against the top surface of the top surface of the base 231 in a press contact state. Therefore, the end portions of the clad portions 247a to 249a are prevented from being floated up, so that the vertical positioning precision is enhanced while the end portions are less likely to be shifted in position laterally.

Also, according to this embodiment, the adjustment of the opposing distance between the fixed optical fibers 243 to 245 and the movable optical fibers 247 to 249 and the prevention of the end portions of the movable optical fibers 247 to 249 are performed concurrently by the bending work of the base 231. Thus, there can be provided an advantage of high productivity.

In addition, the present embodiment has been described on a case in which, after the movable optical fibers 247 to 249 are fixed to the base 231 formed from a straight strip-shaped material, the base 231 is bent so that the movable optical fibers 247 to 249 are flexed. However, without being limited to this, it is also possible that the optical fibers are fixed to the base that has previously been bent, or that the optical fibers are fixed to the base that has been formed by cutting out horizontal and slanted surfaces from a block material.

Figure 59:
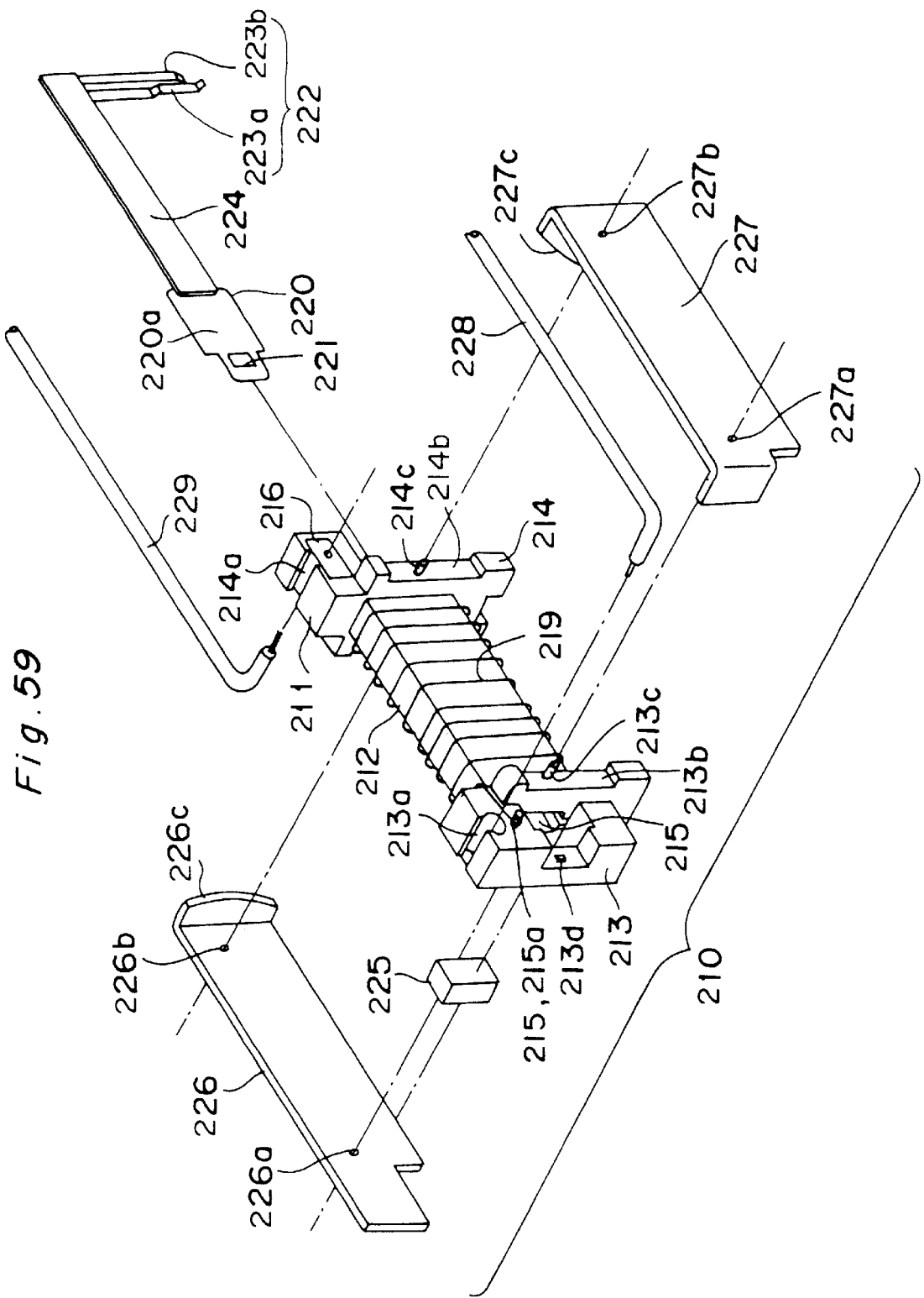
FIG. 59 is an exploded perspective view showing the electromagnetic unit of the optical relay shown in FIG. 52.

The electromagnetic unit 210, as shown in FIG. 59, is so constructed that a lead piece 220, a permanent magnet 225, and first, second yokes 226, 227 are assembled to a spool 211, with lead wires 228, 229 connected thereto.

The spool 211 is so constructed that flanges 213, 214 are provided at both ends of a body 212 around which a coil 219 is wound, while a through hole 215 having a rectangular cross section is formed so as to pass through the body 212 and the flanges 213, 214 along the axis.

At the top end faces of the flanges 213, 214, are formed press-fit grooves 213a, 214a for press-fitting the later-described lead wires 228, 229. Below the press-fit grooves 213a, 214a, relay terminals 215, 216 are inserted into a mold to be integrally fixed to the spool.

Also, positioning recesses 213b, 214b are formed on both side faces of the flanges 213, 214, respectively (the positioning recess on the deep side of the flange 213 is not shown), while engaging protrusions 213c, 214c are protruded from the positioning recesses 213b, 214b, respectively. Further, an engaging claw 213d is protruded on one side face of the flange 213.

The lead piece 220, which is made from a thin-plate shaped magnetic material, has an engaging hole 221 formed in a wide portion 220a located at one end portion of the lead piece 220, while an elastic long tongue piece 222 extends downward generally vertically from a free end of a narrow portion 220b (FIG. 54) of the lead piece 220. Then, the lower end portion of the elastic long tongue piece 222 is divided into two widthwise, by which divisional pieces 223a, 223b are formed. An end portion of the divisional piece 223a out of the divisional pieces 223a, 223b is bent in the direction of plate thickness, so that the later-described optical fiber can be pinched in cooperation with the divisional piece 223b.

Also, the lead piece 220 is increased in its cross sectional area by adhesively integrating a separate strip-shaped magnetic material 224 to its narrow portion 220b, so that the magnetic resistance is reduced while the magnetic efficiency is enhanced.

In addition, the elastic long tongue piece 222 may also be formed by additionally assembling a separate thin-plate material to the end portion of the lead piece 220.

The first yoke 226, which is made from a plate-shaped magnetic material bent into a generally L-shape in plan view, has engaging holes 226a, 226b to be engaged with engaging protrusions (not shown) of the spool 211. The second yoke 227, which is made from a plate-shaped magnetic material bent into a generally U-shape in plan view, has engaging holes 227a, 227b to be engaged with the engaging protrusions 213c, 214c of the spool 211, respectively.

Next, the assembling method of the electromagnetic unit 210 is explained.

First, the coil 219 is wound around the body 212 of the spool 211, and its lead wires are tied up and soldered to tie-up portions 215a (see FIG. 59), 216a (see FIG. 56) of the relay terminals 215, 216, while the lead wires 228, 229 are tied up and soldered to the relay terminals 215, 216. Thereafter, the lead wires 228, 229 are press-fitted into the press-fit grooves 213a, 214a of the flanges 213, 214.

Figure 54:
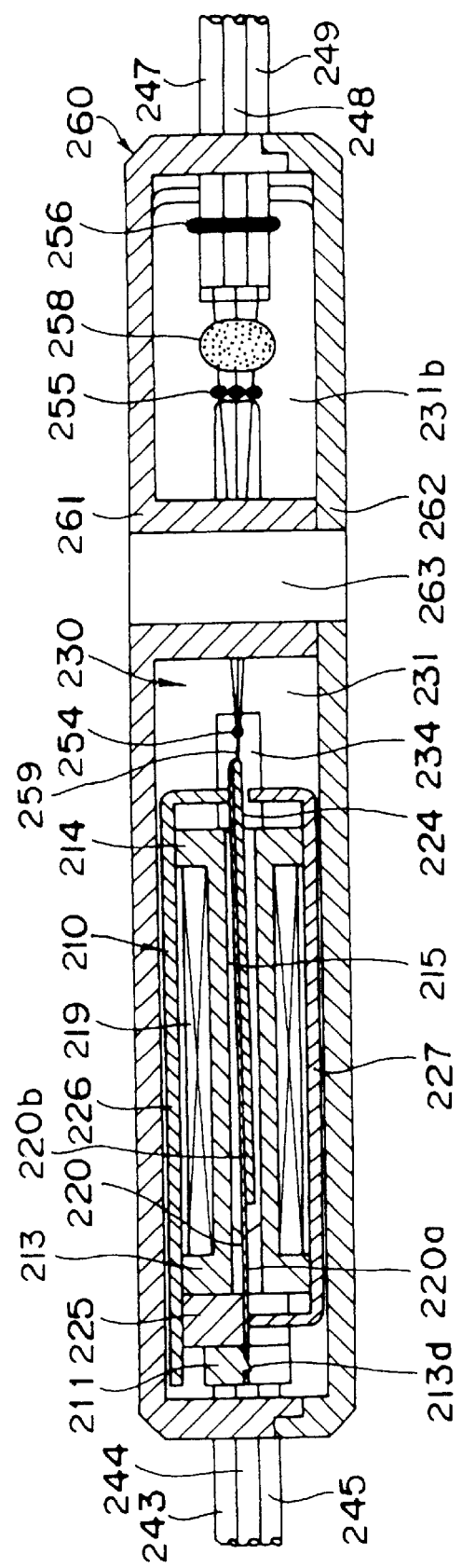
FIG. 54 is a plan view in cross section of the optical relay shown in FIG. 52.

Then, the lead piece 220 is inserted into the through hole 215 provided in the spool 211, and its engaging hole 221 is engaged with the engaging claw 213d of the flange 213 (see FIG. 54). Further, the permanent magnet 225 is assembled to the flange 213 of the spool 211, and brought into contact with the rear face of the wide portion 220a of the lead piece 220.

Subsequently, the first yoke 226 of a generally L-shape in plan view is fitted to the positioning recesses of the flanges 213, 214 (the positioning recess on the deep side of the flange 213 is not shown), and its engaging holes 226a, 226b are engaged with engaging protrusions (not shown) of the flanges 213, 214. Meanwhile, the second yoke 227 of a generally U-shape in plan view is fitted to the positioning recesses 213b, 214b of the flanges 213, 214, respectively, and its engaging holes 227a, 227b are engaged with the engaging protrusions 213c, 214c of the flanges 213, 214.

Then, by cold crimping or hot crimping to the engaging protrusions 213c, 214c, the first, second yokes 226, 227 are secured to the spool 211. Thus, as shown in FIG. 54, the wide portion 220a of the lead piece 220 is pinched by and fixed to the first, second yokes 226, 227 via the permanent magnet 225, while its free end portion becomes contactable with and separable from magnetic-pole portions 226c, 227c of the first, second yokes 226, 227, alternately.

In this embodiment, since the first, second yokes 226, 227 are assembled so as to directly pinch the spool 211, the first, second yokes 226, 227 can be assembled to each other with a high assembling precision.

Also, since the magnetic-pole portions 226c, 227c are formed into curved surfaces, respectively, the pivoting fulcrum of the elastic long tongue piece 222 is higher than that in the case where the magnetic-pole portions 226c, 227c are simple flat surfaces, so that the distance to the movable optical fibers 247 to 249 become longer. Therefore, the elastic long tongue piece 222 has a longer support span so that it will easily be elastically deformed. As a result, even if any excessive operation has occurred to the whole lead piece 220, the elastic long tongue piece 222 is elastically deformed so as to absorb and relax it. Thus, there can be provided an advantage that the movable optical fibers 247, 248, 249 can be prevented from being loaded with excessive external force.

The casing 260 comprises a casing body 261 of a generally box shape, and a cover 262 that covers the opening portion of the casing body 261.

Then, the optical fiber unit 230 manufactured in the above-described manner is assembled to the electromagnetic unit 210, and a pinch portion 259 located between the joint portions 253, 254 of the movable optical fibers 247 to 249 is assembled by being pinched by the elastic long tongue pieces 222, 223 of the lead piece 220. Thereafter, the assembly is further assembled to the casing body 261, and then covered with the cover 262, by which an optical relay is completed. It is noted that reference numeral 263 denotes a through hole 263 to which the casing 260 is fitted.

Therefore, according to this embodiment, lower end portions of the divisional pieces 223a, 223b of the elastic long tongue piece 222, which extend from end portion to lower side of the lead piece 220, pinch the pinch portions 259 of the movable optical fibers 247 to 249. Thus, the elastic long tongue piece 222 assembled generally vertically to the base 231 is enabled to slidingly move the movable optical fibers 247 to 249 along the top surface of the base 231.

Therefore, according to this embodiment, the movable optical fibers 247 to 249 are not moved directly by the lead piece 220 but moved via the elastic long tongue piece 222, so that any excessive movement and impactive force of the lead piece 220 are absorbed and relaxed by the elastic long tongue piece 222. As a result, the movable optical fibers 247 to 249 become less likely to break.

Also, the elastic long tongue piece 222 is good at assemblability because it is easy to deform and easy to assemble to the pinch portions 259 of the movable optical fibers 247 to 249.

Further, since the through hole 234 is located just under the cover plate 22, the pinch portions 259 of the movable optical fibers 247 to 249 can be easily pinched by the divisional pieces 223a, 223b, so that a good assemblability is offered.

Then, even with an excessive movement of the elastic long tongue piece 222, the lower end portion of the elastic long tongue piece 222 engages an opening edge portion of the through hole 234, thereby being positionally restricted. Thus, the movable optical fibers 247 to 249 can be prevented from damage, so that the durability is enhanced.

Furthermore, thanks to the arrangement that the through hole 234 is provided in the base 231, when the joint portions 253, 254 are formed by dripping adhesive to the movable optical fibers 247 to 249 above the through hole 234, not only the base 231 and the movable optical fibers 247 to 249 can be prevented from sticking to each other due to leakage of the adhesive, but also the through hole 234 makes a run-off for the joint portions 253, 254 so that they will not make contact with the movable optical fibers 247 to 249 during the assembly process of the movable optical fibers 247 to 249 that have the joint portions 253, 254 previously formed therein, advantageously. In addition, a simple recessed portion may be formed at the place where the through hole 234 is provided.

Next, the operation of the optical relay having the above construction is explained. It is noted that the movable optical fiber 249 is connected to the fixed optical fiber 243 via a bypass optical fiber 249b, as shown in FIGS. 57 and 58.

When the electromagnetic unit 210 is unexcited, the free end of the lead piece 220 is attracted to the magnetic-pole portion 226c in the aspect of the first yoke 226 by the magnetic force of the permanent magnet 225, where a magnetic circuit is closed by the permanent magnet 225, the first yoke 226, and the lead piece 220.

Due to this, the clad portions 247a to 249a pinched by the divisional pieces 223a, 223b of the elastic long tongue piece 222 provided at the free end of the lead piece 220 are urged toward the guide plate 241, so that the clad portions 243a, 244a, 245a are opposed to the clad portions 247a, 248a, 249a, respectively (FIG. 57).

As a result of this, optical signals A, B outgoing from the clad portions 244a, 245a are received by their opposing clad portions 248a, 249a, where the optical signal A received by the clad portion 248a is outputted as it is, while the optical signal B received by the clad portion 249a is emitted again from the clad portion 243a via the bypass optical fiber 249b, and after received by the clad portion 247a, outputted.

Next, when a voltage is applied to the coil 219 in such a direction as to cancel the magnetic flux of the permanent magnet 225, the free end of the lead piece 220 is separated from the magnetic-pole portion 226c of the first yoke 226 and attracted to the magnetic-pole portion 227c of the second yoke 227.

Due to this, as shown in FIG. 58, the clad portions 247a to 249a of the movable optical fibers 247 to 249 pinched by the divisional pieces 223a, 223b are brought into contact with the guide plate 242, where the clad portions 244a, 245a are opposed to the clad portions 247a, 248a, respectively.

As a result of this, optical signals A, B incoming from the clad portion 244a are received by their opposing clad portions 247a, 248a, respectively, and outputted.

Then, with the coil 219 de-excited, the lead piece 220 is separated from the magnetic-pole portion 227c and attracted to the magnetic-pole portion 226c by the magnetic force of the permanent magnet 225. Thus, the clad portions 247a to 249a of the movable optical fibers 247 to 249 pinched by the divisional pieces 223a, 223b are brought into contact with the guide plate 241, restoring the original state.

In this embodiment, since the end portions of the clad portions 243a to 246a and the clad portions 247a to 249a are located just above the through hole 233, the end face edge portions of the clad portions 243a to 249a will not make contact with the base, and therefore are less prone to wear.

Also, since the end faces of the clad portions 243a to 246a and the opening edge portion of the through hole 233 are kept away from each other, wear-powder due to the sliding contact between the clad portions 247a to 249a and the base 231 will not adhere to the end faces of both, so that increase in transfer loss can be prevented.

As a further advantage, any shift in the optical axis of the optical fibers can be checked by a CCD camera or the like with transmitted light from the through hole 233, so that the inspection work can be facilitated.

The through hole is not limitative to a through hole, but may be substituted by a recessed portion. However, a through hole, if provided, allows a positioning jig such as a thickness gauge to be utilized, so that the assembly precision is enhanced.

The above embodiment has been described on a case in which the present invention is applied to a self-restoring type optical relay. Otherwise, the invention may also be applied to self-holding type optical relays by providing a pair of permanent magnets.

Also, whereas the above embodiment has been described on the only case of application to the optical relay, the invention is not limited to this but may also be applied to optical switches, of course.

Further, whereas the above embodiment has been described on a case where the drive means is an electromagnetic unit, the drive means is not limited to this but may also be implemented by other drive means, such as bimorph cell, of course.

Further, the pair of optical fibers opposed to each other are not limited to each some plurality of optical fibers, but may also be each one optical fiber or a combination of one optical fiber and some plurality of optical fibers.

We claim:

1. An optical fiber connecting structure in which optical fibers are connected to each other with their optical axes coincident with each other, comprising:

a first optical fiber array formed with peripheral surfaces of end portions of individual optical fibers in close contact with an optical fiber fitting surface of a base, while the peripheral surfaces of the end portions of the individual optical fibers are in close contact with one another;

peripheral surfaces of end portions of optical fibers on both sides out of the individual optical fibers constituting the first optical fiber array being in close contact with a pair of stopper members, respectively, disposed on both sides of an end portion of the first optical fiber array; and a second optical fiber or optical fiber array opposed to an end face of the end surface of the first optical fiber array; and wherein between projecting portions of the pair of stopper members projected from the end face of the first optical fiber array, peripheral surfaces of end portions of the individual optical fibers constituting the second optical fiber or optical fiber array are in close contact with the optical fiber fitting surface of the base.

2. The structure according to claim 1, wherein at least any one of the first optical fiber array and the second optical fiber or optical fiber array is put into close contact with the fitting surface of the base by urging force of its own flexure.

3. The structure according to claim 1, wherein the optical fibers are given a flexure so that the peripheral surfaces of the end portions of the optical fibers are put into close line contact with the fitting surface of the base.

4. The structure according to claim 2 or 3, wherein:

the structure includes one or more fixing portions of the optical fibers to the base; and at at least one of the fixing portions, an optical fiber is fitted to the base directly or via another member in a state that a spacing is provided between the fitting surface of the base or an imaginary plane extended from the fitting surface and the optical fiber.

5. The structure according to claim 2 or 3, wherein:

the structure includes one or more fixing portions of the optical fibers to the base;

at at least one of the fixing portions, an optical fiber is fitted to the base directly or via another member in a state that a spacing is provided between the fitting surface of the base or an imaginary plane extended from the fitting surface and the optical fiber; and the optical fiber has such a second flexure that the optical fiber becomes generally parallel to the fitting surface of the base from the fixing portion toward a draw-out side of the optical fiber.

6. The structure according to claim 2 or 3, wherein:

the base has a slanted surface slanted with respect to its fitting surface; and at least any one of the first optical fiber array and the second optical fiber or optical fiber array is fixed to the slanted surface and flexed in a direction from the fixing portion of the optical fiber toward the end side.

7. The structure according to claim 1, wherein at least any one of the first optical fiber array and the second optical fiber array has such a flexure on the fitting surface of the base that individual optical fibers constituting the optical fiber array are put into close contact with their adjacent optical fibers.

8. The structure according to claim 7, wherein the flexure is given so that peripheral surfaces of end portions of adjacent optical fibers of the individual optical fibers constituting the first or second optical fiber array are put into close line contact with one another.

9. The structure according to claim 8, wherein the flexure of the optical fiber array has a shape which is line symmetrical with respect to a center line of the array.

10. The structure according to claim 7 or 8, wherein:

the optical fibers are fixed at at least one place or more; and the optical fibers have a spacing to their adjacent optical fibers, at at least one fixing portion of the fixing portions or in its proximity on the end side.

11. The structure according to claim 7 or 8, wherein:

the optical fibers are fixed to the base at at least one place or more;

the optical fibers have a spacing to their adjacent optical fibers, at at least one fixing portion of the fixing portions or in its proximity on the end side; and the optical fibers have a second flexure so that the individual optical fibers become generally parallel to one another increasingly in a direction from the fixing portion toward the draw-out side.

12. The structure according to claim 1, wherein:

at least any one of the first optical fiber array and the second optical fiber array is in close contact with the fitting surface of the base by urging force of its own flexure; and the individual optical fibers constituting the optical fiber array have such a flexure on the fitting surface of the base that the optical fibers are put into close contact with their adjacent optical fibers.

13. The structure according to claim 1, 2, 7, or 12, wherein the stopper members pinch at least the first optical fiber array, such that peripheral surfaces of the end portions of the individual optical fibers constituting the optical fiber array are put into close contact with one another, and wherein peripheral surfaces of the end portions of optical fibers located on both sides out of the individual optical fibers are put into close contact with the stoppers.

14. The structure according to claim 13, wherein:

the stopper members are plate shaped; and the stopper members pinch the optical fiber array by side end faces of the stopper members.

15. The structure according to claim 13, wherein:

at least any one of the pair of stopper members has spacing adjusting means for adjusting a spacing between the pair of stopper members; and the spacing with which the optical fiber array is pinched is adjusted by the spacing adjusting means, so that the peripheral surfaces of the end portions of the individual optical fibers constituting the optical fiber array are put into close contact with one another, and that peripheral surfaces of the end portions of optical fibers located on both sides out of the individual optical fibers are put into close contact with the stopper members.

16. The structure according to claim 13, wherein:

at least any one of the pair of stopper members has spacing adjusting means for adjusting a spacing between the pair of stopper members; and the other is fixed to the base or formed integrally with the base.

17. The structure according to claim 13, wherein the pair of stopper members have respectively a tapered portion contiguous to the side end face with which the optical fiber array is pinched, and that the spacing between the tapered portions increases toward the draw-out side of the first optical fiber array.

18. The structure according to claim 13, wherein the pair of stopper members have respectively a rounded corner portion at an end of the side end face of a projecting portion extended from the end face of the first optical fiber array.

19. The structure according to claim 13, wherein the pair of stopper members have respectively a thickness not less than radius of cross section of the optical fibers.

20. The structure according to claim 1, 2, 7, or 12, wherein:

at least any one of the pair of stopper members has a spring property; and the optical fibers are pressed by spring force of the stopper member.

21. The structure according to claim 20, wherein:

the stopper member having the spring property is fixed to the base directly or via another member at at least one or more fixing portion; and the stopper member has a spacing to an adjacent optical fiber, at at least one fixing portion of the fixing portions or in its proximity on the end side.

22. The structure according to claim 20, wherein:

the stopper member having the spring property is fixed to the base directly or via another member at at least one or more fixing portion;

the stopper member having the spring property has a spacing to adjacent optical fiber, at at least one fixing portion of the fixing portions or in its proximity on the end side; and the stopper member having the spring property has a second flexure so as to become generally parallel to an extension line of the end portion of the optical fiber array increasingly in a direction from the fixing portion toward the draw-out side.

23. The structure according to claim 20, wherein the stopper member having spring property is an optical fiber.

24. The structure according to claim 20, wherein the stopper member having the spring property has a circular cross section, whose diameter is not less than that of the optical fibers.

25. The structure according to claim 20, wherein the stopper member having the spring property is made of a metal.

26. The structure according to claim 20, wherein the stopper member having the spring property is made of a metal wire.

27. The structure according to claim 20, wherein the stopper member having the spring property is made of a metal wire, and an end of a portion of the metal wire projecting from the end face of the first optical fiber array is bent in a direction of increasing distance from the second optical fiber or optical fiber array.

28. The structure according to claim 20, wherein the stopper member having the spring property is made of a metal wire having a rectangular cross section, whose height is not less than the radius of the optical fibers.

29. The structure according to claim 1, wherein the optical fiber array is fixed to the base directly or via another member.

30. The structure according to claim 1, wherein:

the optical fiber array and the second optical fiber or optical fiber array are fixed to the base directly or via another member; and end portions of the first optical fiber array and the second optical fiber or optical fiber array located between the pair of stopper members are not fixed to the base.

31. The structure according to claim 29 or 30, wherein the first optical fiber array is fixed integrally with the stopper members that are in close contact with the first optical fiber array on both sides.

32. The structure according to claim 31 wherein out of the plurality of fixing portions, at least one fixing portion is provided in the unsheathed portion of the optical fiber, while other at least one fixing portion is provided in the sheathed portion of the optical fiber.

33. The structure according to claim 29 or 30, wherein the first optical fiber array and the second optical fiber or optical fiber array are temporarily fixed by being fixed to the base with a first adhesive at an endmost place of the optical fiber, and finally fixed by being fixed to the base with a second adhesive at a place of the optical fiber on its draw-out side more than the temporary fixing portion.

34. The structure according to claim 33, wherein out of the plurality of fixing portions, at least one fixing portion is provided in the unsheathed portion of the optical fiber, while other at least one fixing portion is provided in the sheathed portion of the optical fiber.

35. The structure according to claim 29 or 30, wherein the optical fibers are adhesively bonded to end faces of their sheathed portions.

36. The structure according to claim 1, wherein a refractive index matching agent is retained at a place where an end face of the first optical fiber array and an end face of the second optical fiber or optical fiber array are opposed to each other.

37. The structure according to claim 1, wherein:

above an end portion of at least any one of the first optical fiber array and the second optical fiber or optical fiber array, a pop-out preventing member is provided so as to be in close contact with the optical fiber or separate from the optical fiber with a spacing not more than the diameter of the optical fiber; and the pop-out preventing member is fixed to the base or the stopper members.

38. A method for bringing end portions of individual optical fibers constituting an optical fiber array into close contact with one another on an optical fiber fitting surface of a base, the method comprising steps of:

holding the optical fiber array and a pair of stopper members having spring property and located on both sides of the optical fiber array so that the end portions of its individual optical fibers and the stopper members are arrayed in generally parallel with one another and in close contact with the fitting surface of the base;

sandwiching the stopper members from both sides between holding portion and end portion of the optical fiber array and the stopper members so that spacings between the optical fibers constituting the optical fiber array and the stopper members are narrowed stepwise, and maintaining the spacings in a state that the end portions of the individual optical fibers are in close contact with one another and that the end portions of the optical fibers located on both sides are in close contact with the stopper members; and bonding the individual optical fibers constituting the optical fiber array with one another as well as the stopper members, at at least one place between the holding portion and the end portion of the optical fiber array.

39. A method for bringing end portions of individual optical fibers constituting an optical fiber array into close contact with one another on an optical fiber fitting surface of a base, the method comprising steps of:

holding the optical fiber array and a pair of stopper members having spring property and located on both sides of the optical fiber array so that the individual optical fibers and the stopper members are arrayed in generally parallel with one another and in close contact with the fitting surface of the base;

pivoting the stopper members so that end portions of the stopper members approach their adjacent optical fibers;

stopping the pivoting of the stopper members in a state that the end portions of the individual optical fibers constituting the optical fiber array are in close contact with one another and that the end portions of the optical fibers on both sides are in close contact with the stopper members; and bonding the individual optical fibers constituting the optical fiber array with one another as well as the stopper members, at at least one place between the holding portion and the end portion of the optical fiber array and the stopper members.

40. A method for bringing end portions of individual optical fibers constituting an optical fiber array into close contact with an optical fiber fitting surface of a base as well as into close contact with one another, the method comprising the steps of:

holding the optical fiber array and a pair of stopper members having spring property and located on both sides of the optical fiber array so that end portions of the individual optical fibers and the stopper members are arrayed in generally parallel with one another and positioned away from the fitting surface of the base;

depressing the optical fiber array toward the fitting surface of the base by using a depressing member, between holding portion and end portion of the optical fiber array, so that the optical fiber array is flexed;

stopping the depressing member in a state that the end portion of the optical fiber array is in close contact with the fitting surface of the base;

sandwiching the optical fiber array from both sides between holding portion and end portion of the optical fiber array so that spacings between the optical fibers constituting the optical fiber array are narrowed stepwise, and maintaining the spacings with the end portions of the individual optical fibers kept in close contact with one another; and bonding the individual optical fibers constituting the optical fiber array with one another, at at least one place between the holding portion and the end portion of the optical fiber array, and fixing the optical fiber array and the base to each other.

41. A method for bringing end portions of individual optical fibers constituting an optical fiber array into close contact with an optical fiber fitting surface of a base as well as into close contact with one another, the method comprising the steps of:

holding the optical fiber array and a pair of stopper members having spring property and located on both sides of the optical fiber array so that end portions of the individual optical fibers and the stopper members are arrayed in generally parallel with one another and positioned away from the fitting surface of the base;

depressing the optical fiber array and the stopper members toward the fitting surface of the base by using a depressing member, between holding portion and end portion of the optical fiber array and the stopper members, so that the optical fiber array and the stopper members are flexed;

stopping the depressing member in a state that the end portions of the optical fiber array and the stopper members are in close contact with the fitting surface of the base;

sandwiching the stopper members from both sides between holding portion and end portion of the optical fiber array and the stopper members so that spacings between the optical fibers constituting the optical fiber array and the stopper members are narrowed stepwise, and maintaining the spacings in a state that the end portions of the individual optical fibers are in close contact with one another and that the end portions of the optical fibers located on both sides are in close contact with the stopper members; and bonding the individual optical fibers constituting the optical fiber array with one another as well as the stopper members, at at least one place between the holding portions and the end portions of the optical fiber array and the stopper members, and fixing the optical fiber array and the stopper members to the base.

42. An optical switch, comprising:

a base having a planar-shaped optical fiber fitting surface;

a fixed optical fiber composed of a plurality of optical fibers, peripheral surfaces of end portions of the optical fibers being in close contact with the fitting surface of the base and in close contact with one another;

a pair of stopper members which are in close contact with peripheral surfaces of end portions of optical fibers located on both sides, respectively, out of the individual optical fibers constituting the fixed optical fiber;

a movable optical fiber composed of optical fiber with the number smaller than that of the fixed optical fiber, peripheral surface of end portion of the movable optical fiber being in close contact with the fitting surface of the base, end face of the end portion of the movable optical fiber being opposed to an end face of an end portion of the fixed optical fiber with a minute spacing; and drive means for reciprocatingly moving the movable optical fiber along a direction perpendicular to its optical axis within a range restricted by projecting portions of the pair of stopper members that are projected from the end face of the fixed optical fiber.

43. The optical switch according to claim 42, wherein at least one of the individual optical fibers constituting at least either one of the fixed optical fiber or the movable optical fiber is a dummy fiber.

44. The optical switch according to claim 42, wherein:

the movable optical fiber is fixed to the base, and a portion of the movable optical fiber ranging from the fixing portion to the end portion is flexed so that the end portion presses the fixing surface of the base.

45. The optical switch according to claim 42, wherein the optical switch further comprises a pressing member which is fitted to the base and which holds at least one of the fixed optical fiber and the movable optical fiber and presses it to the base, and the pressing member comprising:

a holding portion for holding an optical fiber by sandwiching it against the base;

a first pressing portion which extends from the holding portion and which presses the optical fiber between the holding portion and an end portion of the optical fibers so that a peripheral surface of the end portion of the optical fiber is brought into close contact with the fitting surface of the base; and a second pressing portion which extends from the holding portion and which presses optical fibers located on both sides in the optical fiber, between the holding portion and the end portion of the optical fiber so that peripheral surfaces of the end portion of the optical fiber are brought into close contact with one another.

46. The optical switch according to claim 45, wherein the pressing member has a pop-out preventing member which extends from the first pressing portion and is disposed so as to be in close contact with the end portion of the optical fiber from above or separated away therefrom with a spacing not more than the diameter of the optical fiber.

47. The optical switch according to claim 42, wherein a bonding portion where the individual optical fibers constituting the movable optical fiber are adhesively bonded to one another is provided between the end portion of the movable optical fiber and the fixing portion where the optical fiber is first fixed to the base at a place on the draw-out side more than the end portion, and that the base has a recessed portion or hole facing the bonding portion.

48. The optical switch according to claim 42, wherein a fixing portion where the optical fiber is first fixed to the base with an adhesive on the draw-out side more than the end portion is provided, and that the base at a near end of the fixing portion has a recessed portion or hole extending toward the end side.

49. The optical switch according to claim 42, wherein the base at opposing portions opposed to an end face of the fixed optical fiber as well as an end face of the movable optical fiber has a recessed portion or hole of a size larger than including the opposing portions.

50. The optical switch according to claim 42, wherein the drive means reciprocatingly moves the movable optical fiber via an elastic member that engages the movable optical fiber.

51. The optical switch according to claim 50, wherein:

the elastic member comprises a long plate-like piece which is supported generally vertically to the fitting surface of the base with its lower end engaged with the movable optical fiber and with the surface parallel to the movable optical fiber; and the drive means reciprocatingly moves the elastic member in a direction perpendicular to the surface of the elastic member.

52. The optical switch according to claim 51, wherein the drive means comprises an electromagnetic unit, and is so designed as to move and reciprocate the elastic member in a direction perpendicular to the surface of the elastic member by making the elastic member attracted to and separated from a pair of magnetic poles of the electromagnetic unit.

53. The optical switch according to claim 52, wherein at least one of the pair of magnetic poles of the electromagnetic unit is made of a curved surface.

54. The optical switch according to claim 42, wherein the drive means comprises magnetic field control means, and a magnetic material provided to the movable optical fiber.

55. The optical switch according to claim 54, wherein the magnetic material is contained in a resin material that bonds the movable optical fiber integrally.

* * * * *